US012803257B2

(12) United States Patent
Kwon

(10) Patent No.: US 12,803,257 B2
(45) Date of Patent: Nov. 17, 2026

(54) AUTOMATIC DIRECTION SWITCHING PENDULUM-TYPE ROTARY DRIVE RATCHET WIRE GRIP FOR INDIRECT LIVE WIRE AND METHOD FOR WIRING INDIRECT LIVE WIRE USING SAME

(71) Applicants: DAEWON ELECTRIC CO., LTD., Cheongju-si (KR); DAEWON INDUSTRY COMPANY, Jeungpyeong-gun Chungcheongbuk-do (KR)

(72) Inventor: Sae Won Kwon, Jeungpyeong-gun Chungcheongbuk-do (KR)

(73) Assignees: DAEWON ELECTRIC CO., LTD., Cheongju-si (KR); DAEWON INDUSTRY COMPANY, Jeungpyeong-gun (KR)

( * ) Notice: Subject to any disclaimer, the term of this patent is extended or adjusted under 35 U.S.C. 154(b) by 191 days.

(21) Appl. No.: 18/884,033

(22) Filed: Sep. 12, 2024

(65) Prior Publication Data

US 2025/0007268 A1 Jan. 2, 2025

Related U.S. Application Data

(63) Continuation of application No. PCT/KR2023/002112, filed on Feb. 14, 2023.

(30) Foreign Application Priority Data

Apr. 15, 2022 (KR) ........................ 10-2022-0046793

(51) Int. Cl.
*H02G 1/08* (2006.01)
*H02G 1/04* (2006.01)
*H02G 7/02* (2006.01)

(52) U.S. Cl.
CPC ................. *H02G 7/02* (2013.01); *H02G 1/04* (2013.01)

(58) Field of Classification Search
CPC ... H02G 1/00; H02G 1/04; H02G 1/08; F16D 43/20; F16D 43/208
See application file for complete search history.

(56) References Cited

U.S. PATENT DOCUMENTS 12,297,876 B2 * 5/2025 Kwon ..................... F16D 41/18
12,388,243 B2 * 8/2025 Kwon ..................... E04H 12/00
(Continued)

FOREIGN PATENT DOCUMENTS

KR 10-2011-0047784 A 5/2011
KR 10-1179056 B1 9/2012
(Continued)

*Primary Examiner* — Lee D Wilson
(74) *Attorney, Agent, or Firm* — NKL Law; Jae Youn Kim

(57) ABSTRACT

Provided are a wire grip for indirect live wire and a method for wiring indirect live wire and, more specifically, to an automatic direction switching pendulum-type rotary drive ratchet wire grip for indirect live wire and a method for wiring indirect live wire using same, wherein automatic forward or reverse rotation of the drum shaft can be operated by simply operating a rotary lever using a stick for indirect live wire without separate rotational direction switching operation, accordingly, indirect live wire work from a distance from the wire in the live wire condition enables stable wiring work including wire reversal adjustment work, elongated wire installation work, and suspension insulator replacement work, and a drum shaft is driven by a backstop ratchet ring operated by a multi-angle bundle pearl to prevent a backlash phenomenon during a strong anti-reverse driving process and a contrary reverse rotation driving process.

16 Claims, 39 Drawing Sheets

(56) References Cited

U.S. PATENT DOCUMENTS

| | | | | |
|---|---|---|---|---|
| 2024/0162695 A1* | 5/2024 | Kwon | ..................... | E04H 12/00 |
| 2025/0007268 A1* | 1/2025 | Kwon | ..................... | B25G 3/38 |
| 2025/0012330 A1* | 1/2025 | Kwon | ..................... | F16D 41/18 |
| 2025/0062601 A1* | 2/2025 | Kwon | ................... | F16D 43/208 |
| 2025/0144776 A1* | 5/2025 | Kwon | ..................... | B25B 25/00 |

FOREIGN PATENT DOCUMENTS

| | | | |
|---|---|---|---|
| KR | 10-1693146 | B1 | 1/2017 |
| KR | 10-2020-0068339 | A | 6/2020 |
| KR | 10-2161405 | B1 | 10/2020 |

* cited by examiner

AUTOMATIC DIRECTION SWITCHING PENDULUM-TYPE ROTARY DRIVE RATCHET WIRE GRIP FOR INDIRECT LIVE WIRE AND METHOD FOR WIRING INDIRECT LIVE WIRE USING SAME

TECHNICAL FIELD

The present invention relates to a wire grip for indirect live wire work and a method of performing indirect live wiring, and more particularly, to an automatic direction switching pendulum-type rotary drive ratchet wire grip for indirect live wire work and a method of performing indirect live wiring using the same, configured to automatically adjust, without a separate rotational direction switching operation, a rotation direction by simply operating a rotary lever using a stick for indirect live wire work so as to wind a belt around a drum or unwind the belt therefrom and to prevent reverse rotation, wherein the wire grip is used to install or remove a suspension insulator through the indirect live wire work, thereby conveniently performing wiring work.

BACKGROUND ART

In general, live wire work refers to line work conducted in a state in which power transmission is continuously performed through a line without a power outage on the line. Meanwhile, since the risk of safety incidents is very high during live wire work, live wire work is conducted by a trained worker with strict adherence to specific safety and insulation standards only when it is difficult to cut off power. More specifically, when it is difficult to stop operation of transmission and distribution facilities and the like, live wire work is conducted by a trained worker. Here, the trained worker is required to use insulating protective equipment or protective equipment.

Live wire work on the electric line is divided into direct live wire work and indirect live wire work. Indirect live wire work is a method of conducting live wire work indirectly using an insulating tool such as a hot stick. Although indirect live wire work is safe, there is a disadvantage of being labor intensive.

In addition, direct live wire work is a method in which a worker wears an insulated glove in an insulated bucket and works in direct contact with an electric wire in a live wire state. While direct live wire work is simple and saves working time, there is a disadvantage in that the worker is exposed to a high risk of electric shock, which often causes serious causalities. Live wire work includes inspection, repair, replacement, and cleaning of a wire component such as a suspension insulator. Depending on the types of live wire work, either a direct live wire work method or an indirect live wire work method may be appropriately used.

Meanwhile, utilization of a wire grip is high in various types of live wire work. The wire grip is a device configured to pull or release, during live wire work, a wire in order to obtain an appropriate dip of the wire at the time of performing a dip adjustment process of the wire and wiring work. Here, the wire grip has a drum configured for a belt to be wound therearound or for the belt to be unwound therefrom by forward and reverse rotation of the drum. An appropriate dip of a wire may be obtained through operation of the drum.

An example of such a wire grip is disclosed in Korean Patent No. 10-1179056. Specifically, the wire grip disclosed in Korean Patent No. 10-1179056 includes a wire grip fixing member having a hook, a wire winding member connected to the lower side of the wire grip fixing member and provided with a drum, a wire belt wound around the drum, a ratchet wheel disposed on one side of the wire winding member and coaxially connected to the drum so as to rotate the drum in only one direction, a ratchet rotatably installed on one side of the wire winding member having the ratchet wheel disposed thereon, the ratchet having one end engaged with the ratchet wheel, a handle coaxially connected to the ratchet wheel and configured to rotate the ratchet wheel and the drum, and a wire fixing member connected to the free end side of the wire belt and configured to fixedly hold the wire.

However, in the case of a conventional ratchet wheel type wire grip, when a worker presses and pulls the handle, the wire belt is wound around the drum. Therefore, there is a significant problem in that the wire grip is not usable for indirect live wire work using an insulating stick.

Accordingly, in order to solve the above-described problem, the applicant of the present invention has proposed a ratchet wheel type wire grip 10 disclosed in Korean Patent No. 10-2161405. Referring to FIGS. 1 and 2, forward or reverse rotation of the ratchet wheel type wire grip 10 is performed by adjusting forward or reverse rotation of a ratchet wheel 12 having a drum 11 coupled thereto. Ratchets 13 and 13' are respectively formed on opposite sides of the ratchet wheel 12 for forward or reverse rotation of the ratchet wheel 12. The ratchets 13 and 13' are configured to be connected to a direction switching lever 15 connected through a link member 14. Here, by changing the direction of the direction switching lever 15, any one of the ratchets 13 and 13' is engaged with the ratchet wheel 12, thereby allowing the ratchet wheel 12 to be rotated in the forward direction or the reverse direction.

However, in the case of a conventional wire grip as described above, when the forward or reverse rotation of the wire grip is performed to wind a wire around the drum or unwind the wire therefrom, it is required to operate the direction switching lever so as to adjust forward rotation or reverse rotation of the wire grip. Accordingly, operation of the wire grip is significantly inconvenient, and a worker needs to perform operation in close proximity to the wire. In consideration of these circumstances, there is a problem in that a worker is exposed to safety hazards.

RELATED ART DOCUMENT

Patent Document (Patent Document 1) Korean Patent No. 10-1179056
(Patent Document 2) Korean Patent No. 10-2161405

DISCLOSURE

Technical Problem

Therefore, the present invention has been made in view of the above problems, and it is an object of the present invention to provide an automatic direction switching pendulum-type rotary drive ratchet wire grip for indirect live wire work and a method of performing indirect live wiring using the same, configured to adjust, when winding or unwinding a belt of the wire grip, forward or reverse rotation of a drum shaft configured to wind or unwind the belt by operating an automatic reversing pawl and a drive shaft operating plate in accordance with reciprocating pendulum motion of a pendulum without operation of a direction switching control lever, thereby enabling forward or reverse rotation of the drum shaft to be automatically performed by means of operating a rotary lever using a stick for indirect live wire work without a separate rotational direction switching operation. In this manner, while the indirect live wire work is conducted from a long distance from a wire in a state in which power transmission is continuously performed through the wire, a dip of the wire may be appropriately adjusted, the wire may be pulled using the wire grip so as to obtain an appropriate dip of the wire and may be installed on an electric pole, and suspension insulator replacement work may be reliably performed, thereby making it possible to stably perform wiring work using the automatic direction switching pendulum-type rotary drive ratchet wire grip according to the present invention.

It is another object of the present invention to provide an automatic direction switching pendulum-type rotary drive ratchet wire grip for indirect live wire work and a method of performing indirect live wiring using the same, configured to provide a drum shaft driven by a backstop ratchet ring operated by a multi-angle bundle pawl, thereby making it possible not only to reliably prevent reverse rotation, but also to perform stable rotational driving by preventing backlash occurrence during reverse rotational driving.

Technical Solution

In accordance with an aspect of the present invention, the above and other objects can be accomplished by the provision of an automatic direction switching pendulum-type rotary drive ratchet wire grip for indirect live wire work, the automatic direction switching pendulum-type rotary drive ratchet wire grip including a body having a hook formed on one side thereof and a belt fixing pin formed on the other side thereof, wherein the other side is open, and the one side has a lever installation part formed on a front side thereof, a rotary operating lever including a rotary operating shaft, a cam, a rotary operating mechanism, and a buffer key, wherein the rotary operating shaft is axially installed in the lever installation part and has a rotating ring, wherein the cam is disposed at a tip portion of the rotary operating shaft and is formed at a location eccentric from a central portion of the tip portion, wherein the rotary operating mechanism is rotatably coupled to the rotary operating shaft at a rear side of the cam, has a movable long hole formed in a circumferential direction thereof, and has a locking protrusion formed to protrude from a circumference thereof, and wherein the buffer key connects the rotary operating shaft to the rotary operating mechanism, a drum having a drum shaft formed to penetrate a front side and a rear side of the body and axially installed in the body, wherein the drum shaft protrudes forwards from the body, a clutch part disposed on the front side of the body and coupled to a circumference of the drum shaft, wherein the clutch part prevents reverse rotation of an inner ring and conducts forward or reverse rotation of the drum shaft through simultaneous reverse rotation of the inner ring and an outer ring, a drum shaft operating plate disposed on a front side of the clutch part and coupled to the circumference of the drum shaft, wherein the drum shaft operating plate has saw teeth formed on a circumference of a middle portion thereof, a pendulum coupled to a rear side of the drum shaft operating plate and formed to protrude toward one side thereof so as to have a horizontal long hole configured to accommodate the cam therein, wherein the pendulum performs reciprocating pendulum motion relative to the drum shaft by operation of the cam and has an automatic revering pawl mounting groove formed in a front surface thereof and disposed between the rotary operating shaft and the drum shaft operating plate, a drum shaft support plate formed to penetrate a front circumference of the drum shaft operating plate and coupled to the pendulum, wherein the drum shaft support plate is formed to protrude toward one side thereof, an automatic reversing pawl having a pawl shaft coupled to the automatic revering pawl mounting groove, wherein the automatic reversing pawl interferes with the drum shaft operating plate and performs reciprocating motion thereof so as to provide forward or reverse rotational force of the drum shaft operating plate, a pawl reversing key coupled to the pawl shaft with the automatic reversing pawl and formed to protrude from the drum shaft support plate toward one side thereof, wherein the pawl reversing key interferes with the locking protrusion during rotation of the rotary operating mechanism so as to provide reciprocating rotational force of the automatic reversing pawl, and wherein the pawl reversing key has first and second reversing key spring balls and installed thereon so as to constantly maintain horizontality thereof, wherein the first and second reversing key spring balls and are formed to be symmetrical relative to the pawl shaft, a drum shaft rotary lever disposed on a front side of the drum shaft operating plate and coupled to the drum shaft and the drum shaft operating plate, a belt having one side fixedly wound around the drum inside the body, the belt having the other side fixed to the belt fixing pin, and a wire clip formed to allow the belt to pass therethrough and configured to grip a wire.

In accordance with another aspect of the present invention, there is provided a method of performing indirect live wiring using an automatic direction switching pendulum-type rotary drive ratchet wire grip for indirect live wire work, wherein the automatic direction switching pendulum-type rotary drive ratchet wire grip is used to adjust a dip of a previously installed wire, the method including the steps of installing the wire grip using a hook of the automatic direction switching pendulum-type rotary drive ratchet wire grip for indirect live wire work, wherein the hook is hooked on an installation member such as a rope installed on an arm-shaped support member or a deadend clamp, fixing the wire by fixedly holding the previously installed wire using a wire clip of the automatic direction switching pendulum-type rotary drive ratchet wire grip for indirect live wire work, adjusting the dip by winding a belt around a drum or unwinding the belt therefrom so as to adjust tension of the wire, wherein the belt is wound around or unwound from the drum through an operation of rotating a rotary operating lever in a forward or reverse direction to cause a pendulum to perform pendulum motion, an operation of rotating an automatic reversing pawl, and an operation of rotating a drum shaft connected to a drum shaft operating plate in the forward or reverse direction, fixedly installing the wire having the adjusted dip, wherein the dip of the wire is adjusted by separating the wire from the deadend clamp and reinstalling the deadend clamp at a location allowing the wire to obtain the adjusted dip, and separating and removing, from the wire having the adjusted dip and the installation member, the automatic direction switching pendulum-type rotary drive ratchet wire grip for indirect live wire work.

In accordance with a further aspect of the present invention, there is provided a method of performing indirect live wiring using an automatic direction switching pendulum-type rotary drive ratchet wire grip for indirect live wire work, wherein the automatic direction switching pendulum-type rotary drive ratchet wire grip is used to pull a wire installed on opposite electric poles so as to adjust a dip of the wire and to install the wire having the adjusted dip on the opposite electric poles, the method including the steps of stretching the wire using the electric poles each allowing the wire to be installed thereon, installing the wire grip using a hook of the automatic direction switching pendulum-type rotary drive ratchet wire grip for indirect live wire work, wherein the hook is hooked on an installation member such as a rope installed on an arm-shaped support member or a deadend clamp, fixing the wire by fixedly holding the stretched wire using a wire clip of the automatic direction switching pendulum-type rotary drive ratchet wire grip for indirect live wire work, installing the wire in the deadend clamp while adjusting tension of the wire by winding a belt around a drum or unwinding the belt therefrom, wherein the belt is wound around or unwound from the drum through an operation of rotating a rotary operating lever in a forward or reverse direction to cause a pendulum to perform pendulum motion, an operation of rotating an automatic reversing pawl, and an operation of rotating a drum shaft connected to a drum shaft operating plate in the forward or reverse direction, and separating and removing, from the completely installed wire and the installation member, the automatic direction switching pendulum-type rotary drive ratchet wire grip for indirect live wire work.

In accordance with a still further aspect of the present invention, there is provided a method of performing indirect live wiring using an automatic direction switching pendulum-type rotary drive ratchet wire grip for indirect live wire work, wherein the automatic direction switching pendulum-type rotary drive ratchet wire grip is used to replace a previously installed suspension insulator, the method including the steps of installing the wire grip using a hook of the automatic direction switching pendulum-type rotary drive ratchet wire grip for indirect live wire work, wherein the hook is hooked on an installation member such as a rope installed on an arm-shaped support member, fixing a wire by fixedly holding the previously installed wire using a wire clip of the automatic direction switching pendulum-type rotary drive ratchet wire grip for indirect live wire work, pulling the wire to put the suspension insulator in a tension-free state by winding a belt around a drum so as to pull the wire and apply tension to the wire, wherein the belt is wound around the drum through an operation of rotating a rotary operating lever to cause a pendulum to perform pendulum motion, an operation of rotating an automatic reversing pawl, and an operation of rotating a drum shaft connected to a drum shaft operating plate, replacing the suspension insulator by separating, in a state of pulling the wire, the suspension insulator and the deadend clamp of the wire, removing the suspension insulator and installing a new suspension insulator, re-installing the separated deadend clamp on the wire, and fixing the pulled wire to the new suspension insulator, releasing the wire to release a pulled state of the wire and the tension of the wire by unwinding the belt from the drum, wherein the belt is unwound from the drum through an operation of rotating the rotary operating lever in a reverse direction to cause the pendulum to perform the pendulum motion, an operation of rotating the automatic reversing pawl, and an operation of rotating the drum shaft connected to the drum shaft operating plate, and separating and removing, from the wire fixed to the newly replaced suspension insulator and the installation member, the automatic direction switching pendulum-type rotary drive ratchet wire grip for indirect live wire work.

In accordance with still another aspect of the present invention, there is provided a method of performing indirect live wiring using an automatic direction switching pendulum-type rotary drive ratchet wire grip for indirect live wire work, wherein the automatic direction switching pendulum-type rotary drive ratchet wire grip is used to remove a previously installed wire, the method including the steps of installing the wire grip using a hook of the automatic direction switching pendulum-type rotary drive ratchet wire grip for indirect live wire work, wherein the hook is hooked on an installation member such as a rope installed on an arm-shaped support member or a deadend clamp, fixing the wire grip by fixedly holding the previously installed wire using a wire clip of the automatic direction switching pendulum-type rotary drive ratchet wire grip for indirect live wire work, pulling the wire by winding a belt around a drum so as to pull the wire and apply tension to the wire, wherein the belt is wound around or unwound from the drum through an operation of rotating a rotary operating lever to cause a pendulum to perform pendulum motion, an operation of rotating an automatic reversing pawl, and an operation of rotating a drum shaft connected to a drum shaft operating plate, separating the wire in a pulled state from the arm-shaped support member or a suspension insulator, removing the wire by slowly lowering and placing the wire on a ground while releasing the tension of the wire by unwinding the belt from the drum, wherein the belt is unwound from the drum through an operation of rotating the rotary operating lever in a reverse direction to cause the pendulum to perform the pendulum motion, an operation of rotating the automatic reversing pawl, and an operation of rotating the drum shaft connected to the drum shaft operating plate, and separating and removing, from the wire and the installation member, the automatic direction switching pendulum-type rotary drive ratchet wire grip for indirect live wire work.

Advantageous Effects

As described above, the present invention provides an automatic direction switching pendulum-type rotary drive ratchet wire grip for indirect live wire work and a method of performing indirect live wiring using the same, configured to automatically perform, using a stick for live wire work, forward or reverse rotation of a drum shaft operating plate through reciprocating pendulum motion of a pendulum in accordance with rotation direction adjustment of a rotary operating shaft, thereby having an effect of automatically winding a belt around a drum or unwinding the belt from the drum through forward rotation or reverse rotation of a drum shaft by simply conducting the indirect live wire work without performing a separate rotation direction switching operation. Accordingly, while the indirect live wire work is conducted from a long distance from a wire in a state in which power transmission is continuously performed through the wire, a dip of the wire may be appropriately adjusted, the wire may be pulled to obtain an appropriate dip of the wire and may be fixedly installed on an electric pole, the wire may be removed from the electric pole, and suspension insulator replacement work may be reliably performed, thereby having an effect of stably performing wiring work.

Additionally, a backstop ratchet ring is capable of preventing reverse rotation of the drum shaft, preventing backlash occurrence when the drum shaft is driven in the reverse direction, and constantly performing bidirectional rotation in a reliable manner, thereby having an effect of securing stability and durability of a device.

DESCRIPTION OF DRAWINGS

The above and other objects, features and other advantages of the present invention will be more clearly understood from the following detailed description taken in conjunction with the accompanying drawings, in which:

FIGS. 18 to 23A and 23B are views each showing a step of adjusting a dip of a wire in a method of performing indirect live wiring using the automatic direction switching pendulum-type rotary drive ratchet wire grip for indirect live wire work according to the present invention;

FIGS. 30 to 36A and 36B are views each showing a step of performing suspension insulator replacement work in the method of performing indirect live wiring using the automatic direction switching pendulum-type rotary drive ratchet wire grip for indirect live wire work according to the present invention.

DESCRIPTION OF REFERENCE NUMERALS

Figure 1:
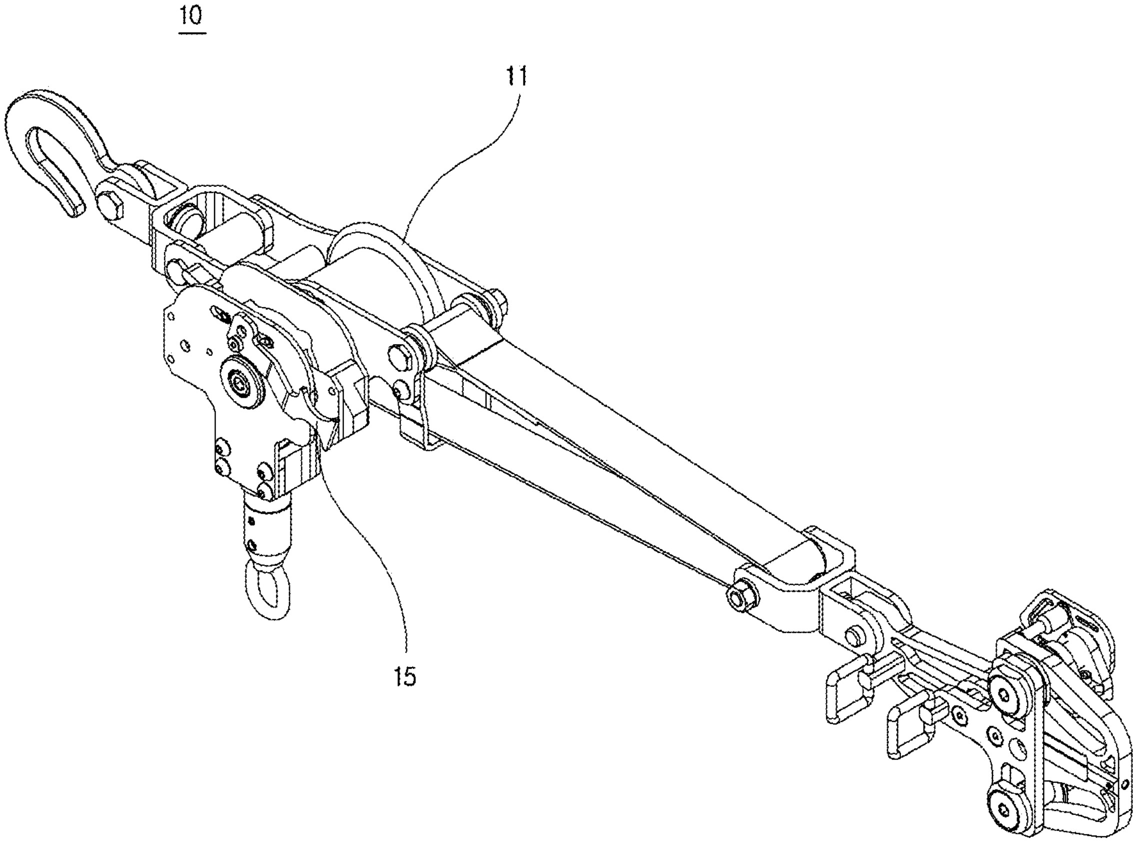
FIG. 1 is a perspective view of a conventional wire grip.
Figure 2:
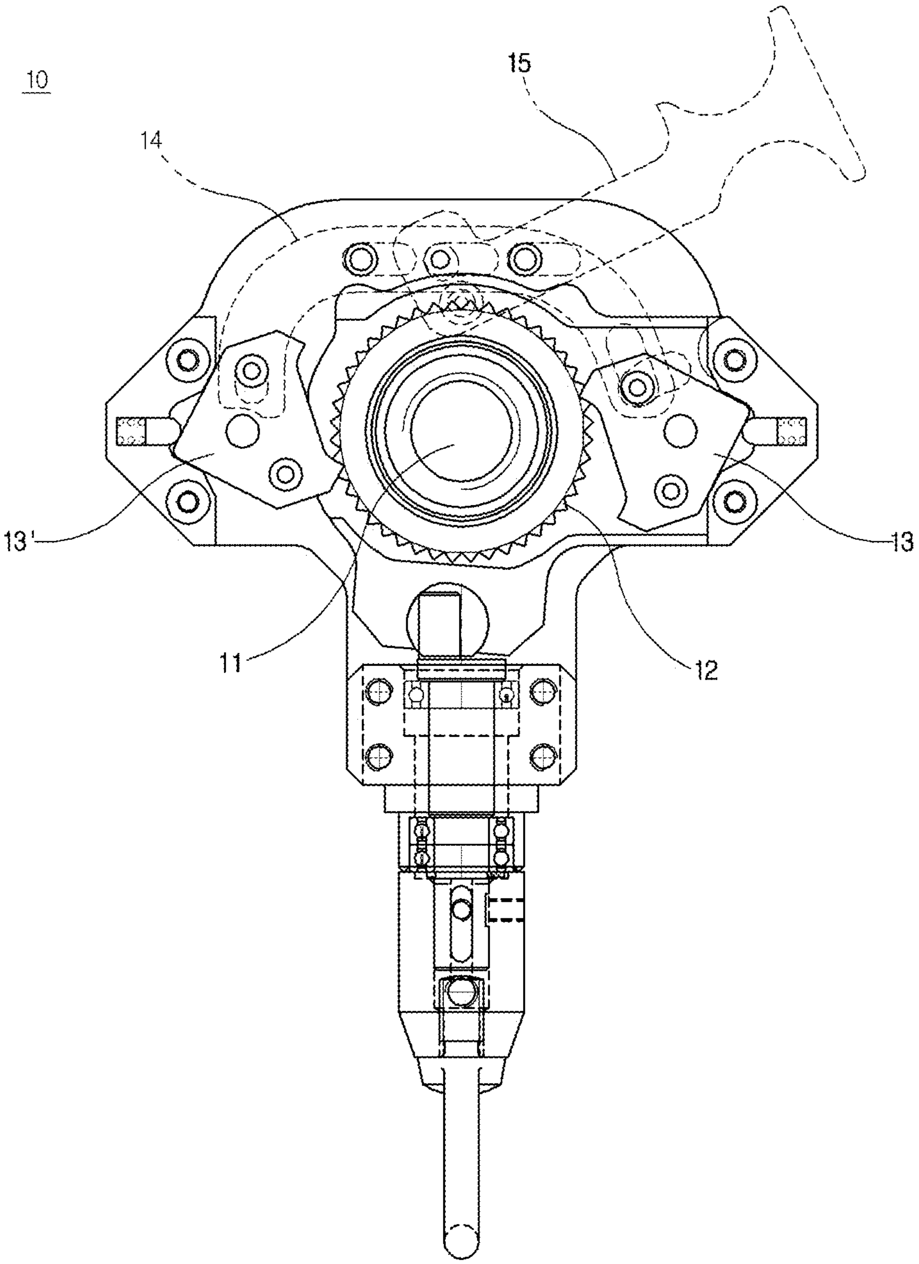
FIG. 2 is a cross-sectional view of the conventional wire grip.

20: Arm-shaped support member 21: Rope
30: Wire 31: Deadend clamp
32, 32': Suspension insulator 40: Stranded rope
100: Body 101: Hook
102: Belt fixing pin 110: Lever installation part
200: Rotary operating lever 210: Rotary operating shaft
211: Rotary ring 220: Cam
230: Rotary operating mechanism 231: Movable long hole
232: Locking protrusion 240: Buffer key
300: Drum 310: Drum shaft
400: Clutch part 401: Backstop ratchet ring
410: Outer ring 411: Inner ring mounting hole
412: Outer ring saw teeth 412_a_, 412_b_: Front and rear stepped portions
413: Stopping groove 420: Inner ring
421: Drum shaft mounting hole 422: Bundle pawl mounting groove
423: Seating protrusion 424: Finishing plate support portion
425: Finishing plate 425_a_: Through hole
430: Multi-angle bundle pawl unit 431, 432, 433: First, second, and third multi-angle bundle pawls
431_a_, 432_a_, 433_a_: First, second, and third engagement tools 431_b_, 432_b_,
433_b_: First, second, and third engagement tool saw teeth
440: Rotation control lever
500: Drum shaft operating plate 510: Saw teeth
600: Pendulum 610: Horizontal long hole
620: Automatic reversing pawl mounting groove
700: Durm shaft support plate
800: Automatic reversing pawl 801: Pawl shaft
810, 810': First and second locking protrusions 821, 821': First locking groove
822, 822': Second locking groove
830: Reversing key mounting groove 840, 840': First and second reversing pawl spring balls
900: Pawl reversing key 910, 910': First and second reversing key spring balls
1000: Drum shaft rotary lever 1100: Belt
1200: Wire clip

BEST MODE

Terms or words used in the description and claims should not be restrictively interpreted as having ordinary or dictionary meanings, but should be interpreted as having meanings and concepts conforming to the inventive concept on the basis of a principle that an inventor may properly define the concept of a term to explain his or her own invention in the best way.

Therefore, embodiments described in this specification and configurations shown in the drawings are only preferred embodiments of the present invention and do not represent the entire technical idea of the present invention. It should be understood that those skilled in the art will appreciate that various modifications, additions, and substitutions are possible, without departing from the scope and spirit of the invention as disclosed in the accompanying claims.

Hereinafter, preferred embodiments of the present invention will be described in detail with reference to the attached drawings.

Figure 3:
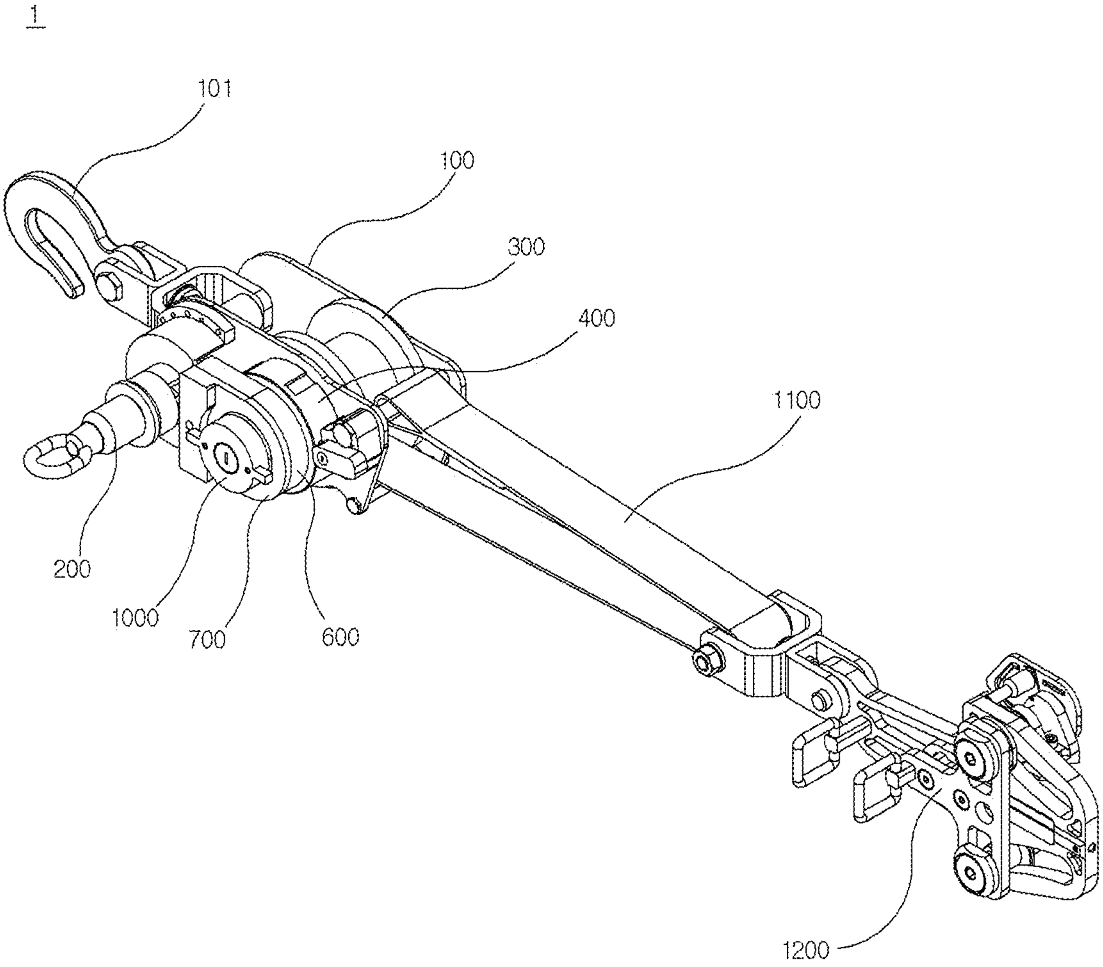
FIG. 3 is a perspective view of an automatic direction switching pendulum-type rotary drive ratchet wire grip for indirect live wire work according to the present invention.
Figure 4:
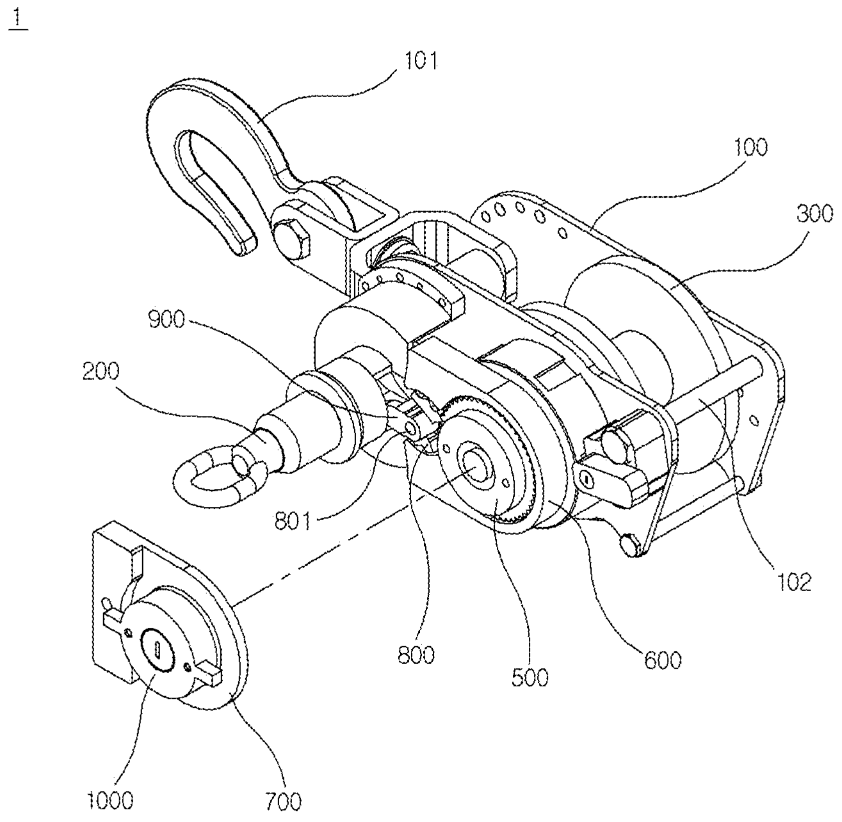
FIG. 4 is a perspective view of a main part of the automatic direction switching pendulum-type rotary drive ratchet wire grip for indirect live wire work according to the present invention.
Figure 5:
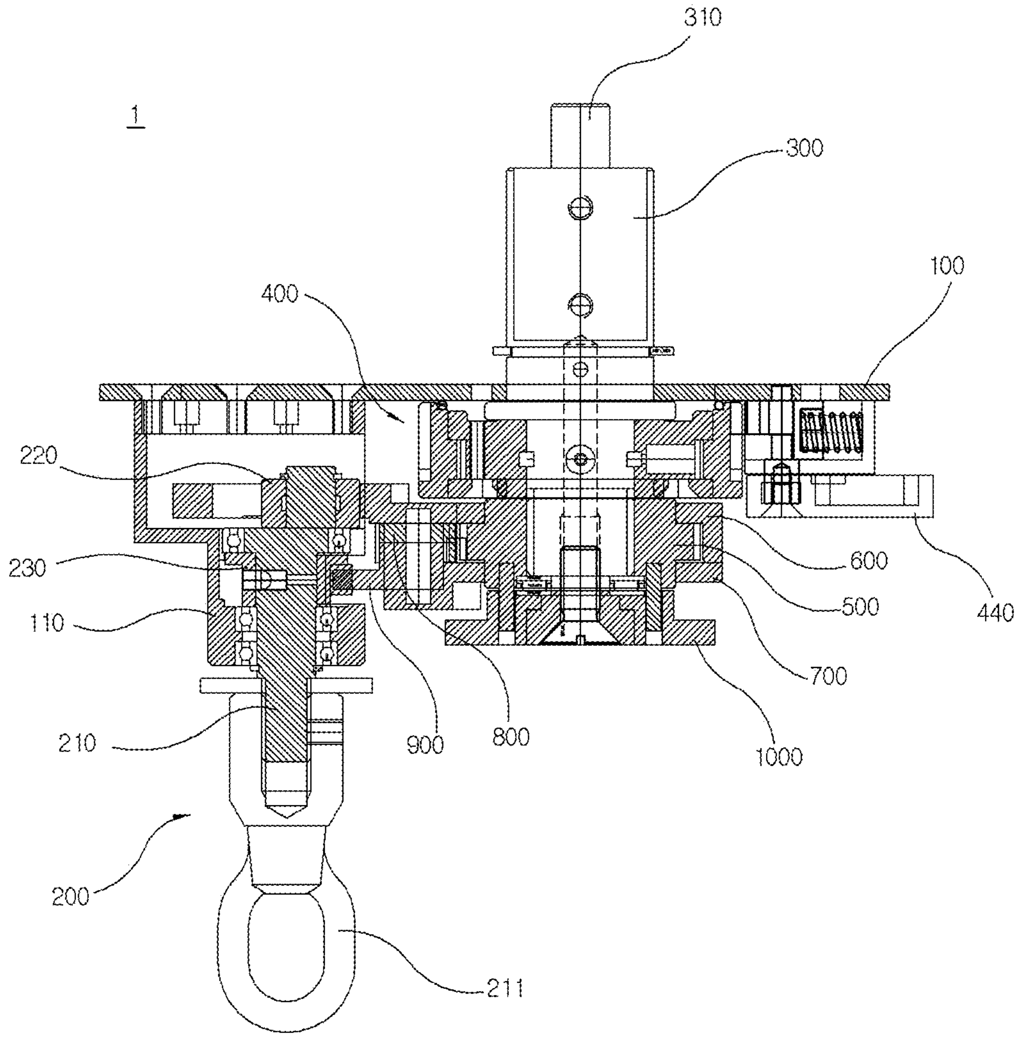
FIG. 5 is a planar cross-sectional view of the main part of the automatic direction switching pendulum-type rotary drive ratchet wire grip for indirect live wire work according to the present invention.
Figure 6:
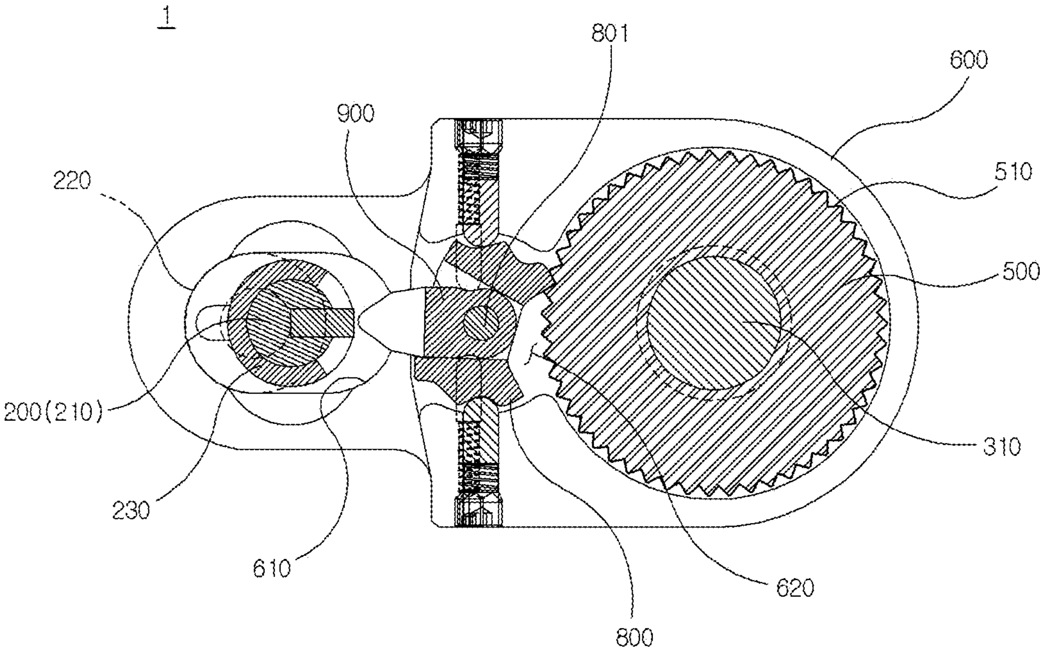
FIG. 6 is a front cross-sectional view of the main part of the automatic direction switching pendulum-type rotary drive ratchet wire grip for indirect live wire work according to the present invention.
Figure 7:
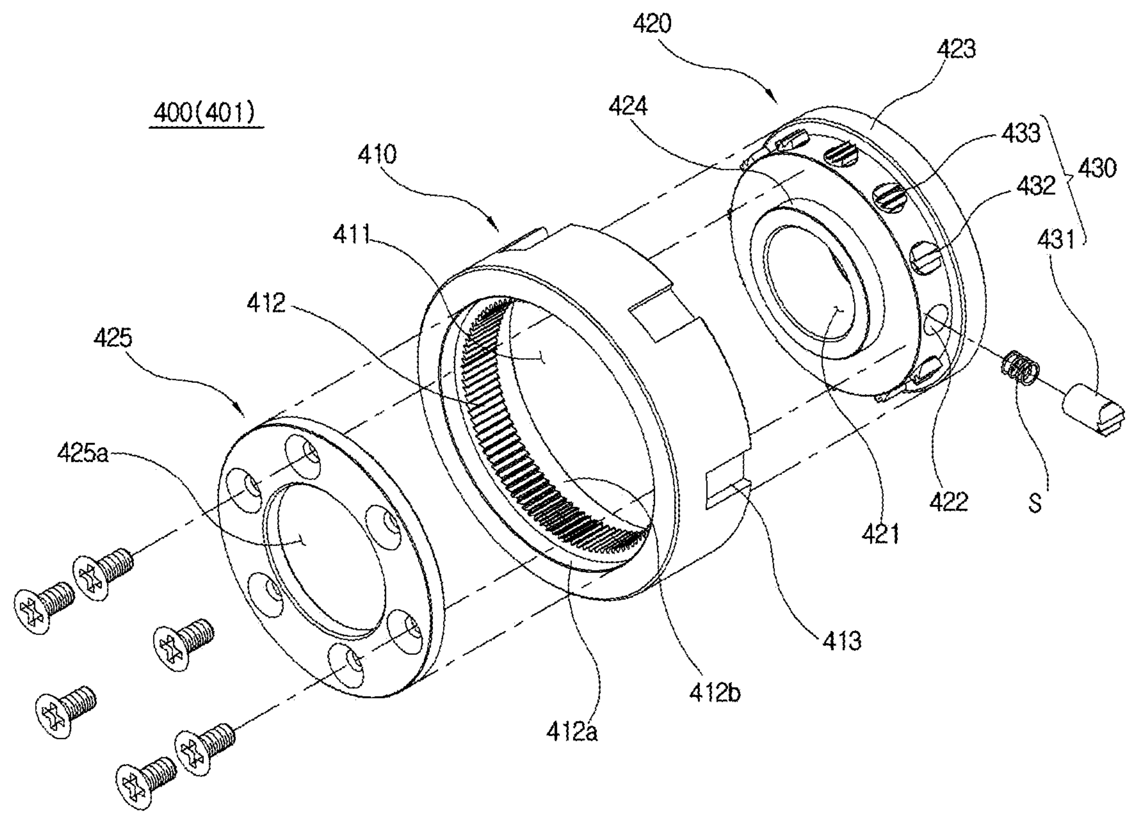
FIGS. 7 to 11 are views each showing a main part of a clutch part of the automatic direction switching pendulum-type rotary drive ratchet wire grip for indirect live wire work according to the present invention.
Figure 8:
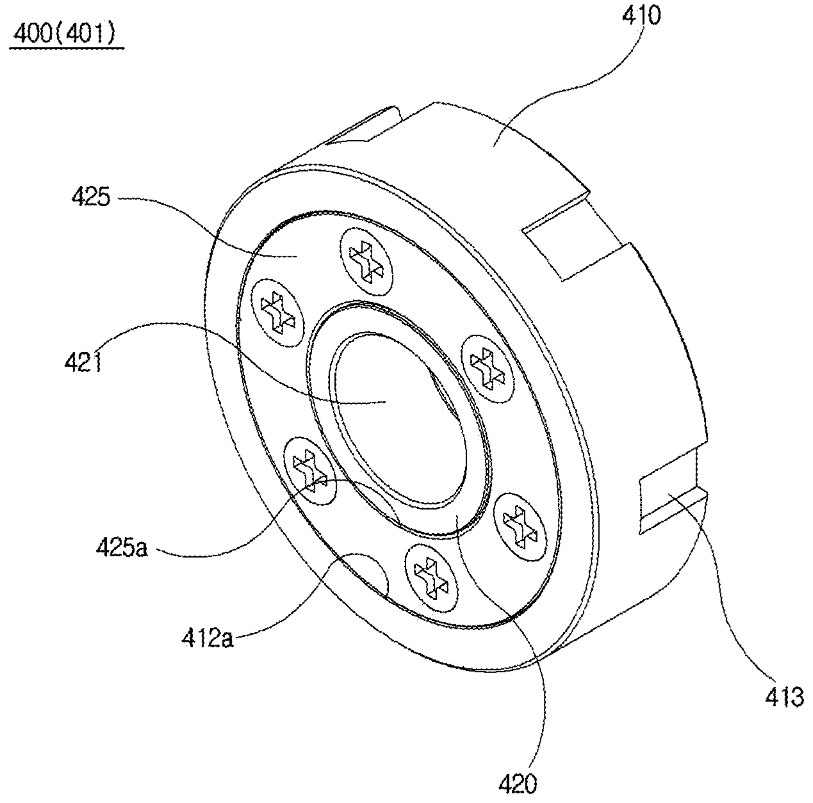
Figure 9:
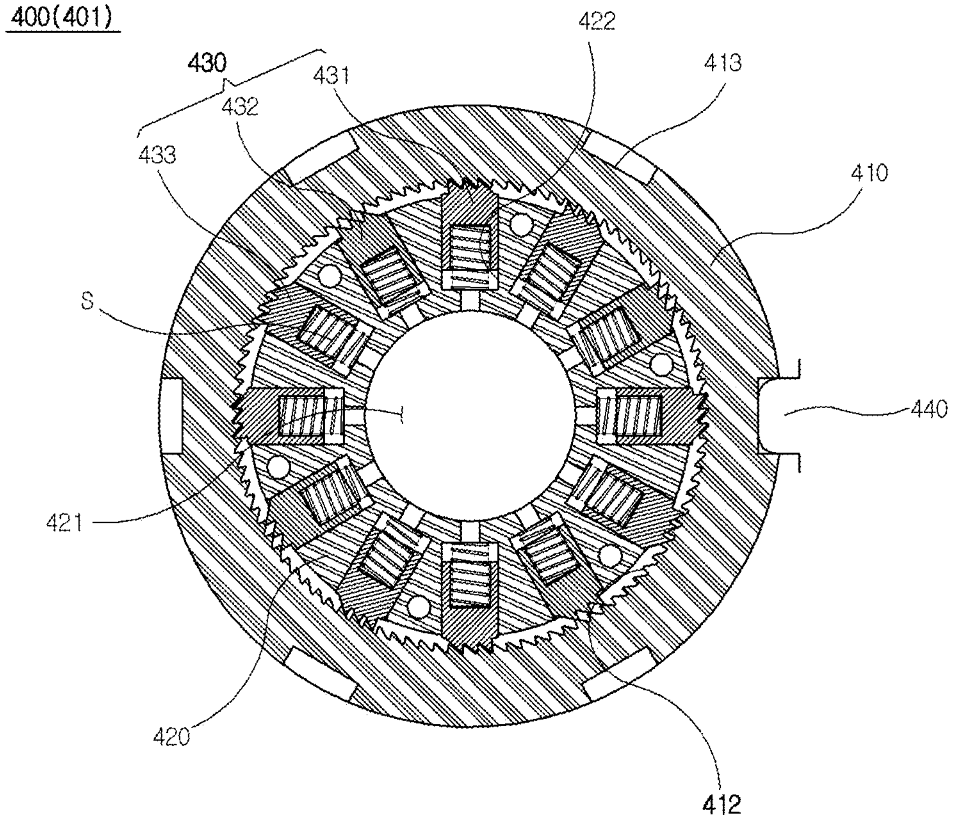
Figure 10:
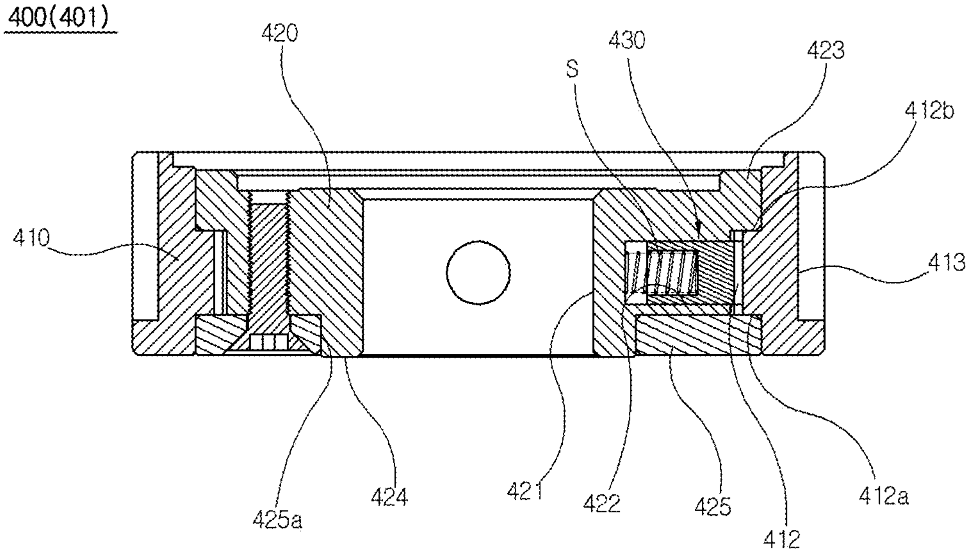
Figure 11:
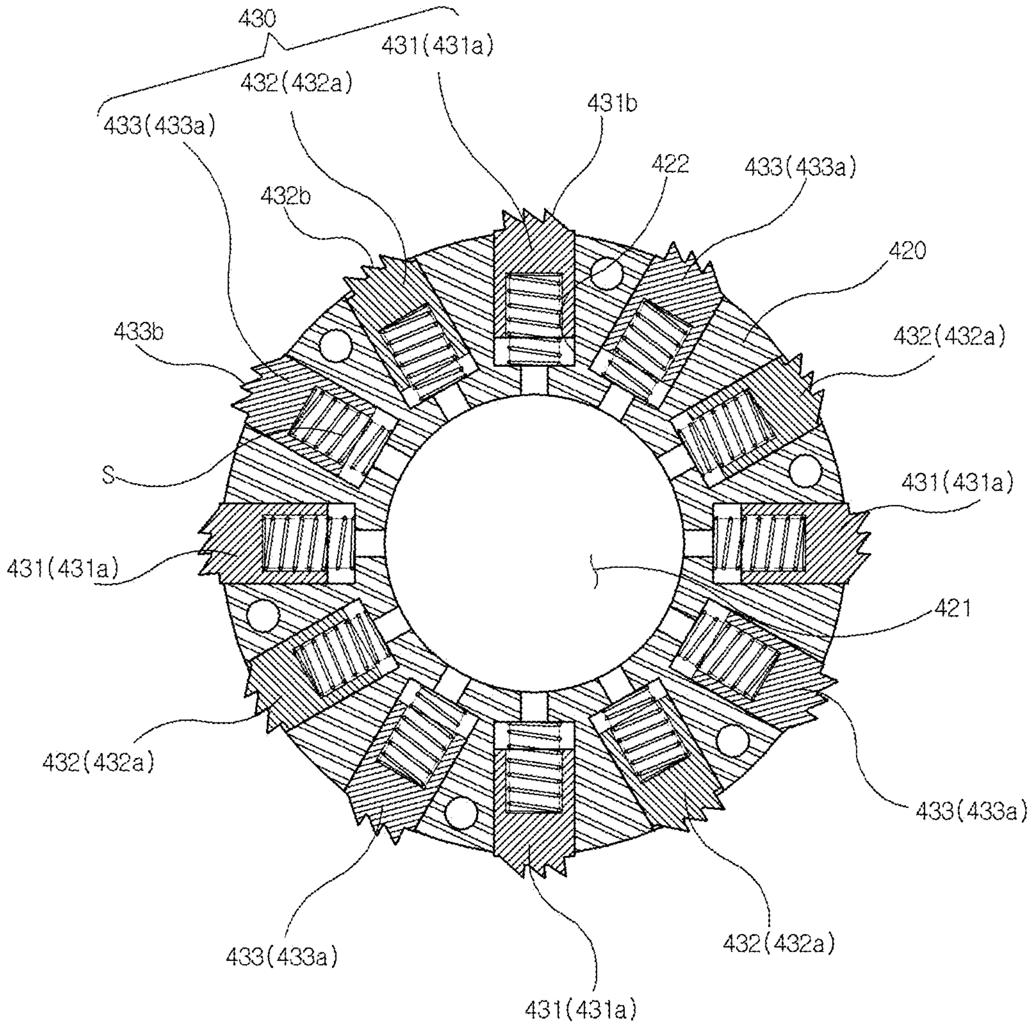

FIG. 3 is a perspective view of an automatic direction switching pendulum-type rotary drive ratchet wire grip for indirect live wire work according to the present invention, FIG. 4 is a perspective view of a main part of the automatic direction switching pendulum-type rotary drive ratchet wire grip for indirect live wire work according to the present invention, FIG. 5 is a planar cross-sectional view of the main part of the automatic direction switching pendulum-type rotary drive ratchet wire grip for indirect live wire work according to the present invention, and FIG. 6 is a front cross-sectional view of the main part of the automatic direction switching pendulum-type rotary drive ratchet wire grip for indirect live wire work according to the present invention.

As shown in FIGS. 3 to 6, an automatic direction switching pendulum-type rotary drive ratchet wire grip for indirect live wire work 1 according to the present invention includes a body 100, a rotary operating lever 200, a drum 300, a clutch part 400, a drum shaft operating plate 500, a pendulum 600, a drum shaft support plate 700, an automatic revering pawl 800, a pawl reversing key 900, a drum shaft rotary lever 1000, a belt 1100, and a wire clip 1200.

First, the body 100 is configured to form a basic structure of the automatic direction switching pendulum-type rotary drive ratchet wire grip for indirect live wire work 1 according to the present invention. Further, the body 100 is formed to have a "⊏" shape such that one side of the body 100 in plan view is open, thereby providing a space configured to allow a belt 1100 to be described later to be wound therein.

In addition, the body 100 has a hook 101 formed on the closed side thereof and configured to be installed by being hooked on an arm-shaped support member of a power distribution line through a normal rope or the like. Further, the body 100 has a belt fixing pin 102 formed on the open end side opposite to the closed side.

In addition, the body side 100 has a lever shaft part 110 provided on a front portion of one side thereof (left side in the drawing) and formed to have a hollow interior.

In the configuration of the automatic direction switching pendulum-type rotary drive ratchet wire grip for indirect live wire work 1 according to the present invention, the rotary operating lever 200 is configured to provide operating force for forward rotation of a drum shaft 310 to be described later or reverse rotation thereof.

To this end, the rotary operating lever 200 is mainly formed of a rotary operating shaft 210 horizontally installed in the lever installation part 110. Here, the front end of the rotary operating shaft 210 is located on the inner side of the lever installation part 110, and the rear end thereof protrudes toward the outer side of the lever installation part 110 so as to form a rotary ring 211.

In addition, the rotary operating lever 200 includes a cam 220 provided at a tip portion of the rotary operating shaft 210 and disposed at a location eccentric from a central portion of the tip portion to one side.

In addition, the rotary operating lever 200 includes a rotary operating mechanism 230 provided around the rotary operating shaft 210 and disposed on the rear side of the cam 220. The rotary operating mechanism 230 is configured to be slidably coupled to the rotary operating shaft 210.

In addition, a movable long hole 231 is formed on one side of the circumference of the rotary operating mechanism 230 so as to form an angle of about 110° in the circumferential direction, and a locking protrusion 232 is formed to protrude around the other side of the circumference of the rotary operating mechanism 230.

In addition, the rotary operating lever 200 includes a buffer key 240 configured to provide connecting force between the rotary operating shaft 210 and the rotary operating mechanism 230. In this case, one side of the buffer key 240 is configured to be fixed to the rotary operating shaft 210 and the other side thereof is configured to be located on the inner side of the movable long hole 231 of the rotary operating mechanism 230.

Here, when the rotary operating shaft 210 is rotated in the forward direction or reverse direction, the buffer key 240 idles for a predetermined time within the movable long hole 231. When the buffer key 240 is caught at one end of the movable long hole 231, the buffer key 240 is configured to rotate the rotary operating mechanism 230. In this operation process, it is possible to prevent shock overload on the drum shaft operating plate 500, which will be described later. Here, the shock overload is caused by sudden rotation.

In the configuration of the automatic direction switching pendulum-type rotary drive ratchet wire grip for indirect live wire work 1 according to the present invention, the drum 300 is substantially configured to provide forward or reverse rotational force so as to wind or unwind the belt 1100 to be described later.

To this end, the drum 300 has the drum shaft 310 formed on a central portion of the inner side of the body 100. In this case, the drum shaft 310 is configured to penetrate the body 100 in the forward-and-rearward direction so as to be axially installed therein and to protrude forwards from the body 100.

In the configuration of the automatic direction switching pendulum-type rotary drive ratchet wire grip for indirect live wire work 1 according to the present invention, the clutch part 400 is configured to implement forward rotation of the drum shaft 310 or reverse rotation thereof. The drum shaft 310 is configured to penetrate the body 100 from the front side of the body 100 so as to be coupled to the clutch part 400.

Meanwhile, in the present invention, the configuration of the clutch part 400 is not limited. For example, the clutch part may be configured as a cam clutch in which a cam is formed between an inner ring and an outer ring, only the inner ring is rotatable when the inner ring is rotated in the forward direction, and the inner ring and the outer ring are simultaneously rotatable when the inner ring is rotated in the reverse direction.

In addition, the clutch part 400 may be configured as a backstop ratchet ring 401 with reference to FIGS. 7 to 11. In the present invention, the backstop ratchet ring 401 includes an outer ring 410, an inner ring 420, a multi-angle bundle pawl unit 430, and a rotation control lever 440.

First, in the configuration of the backstop ratchet ring 401, the outer ring 410 is configured to output power to the outside. The outer ring 410 has an inner ring mounting hole 411 disposed at a central portion thereof and configured to allow the inner ring 420 to be described later to be mounted therein. Here, the inner ring mounting hole 411 is formed to have a circular shape in a state of penetrating the outer ring 410.

In this case, in the present invention, the outer ring 410 is configured to have outer ring saw teeth 412 formed on the inner peripheral surface of the inner ring mounting hole 411, and the outer ring saw teeth 412 are configured to have straight portions and inclined portions that are continuously formed.

Meanwhile, in the present invention, each of the straight portions forming the outer ring saw teeth 412 is configured to be caught during power transmission, and each of the inclined portions forming the outer ring saw teeth 412 is configured to guide slipping movement during idling operation.

In addition, in the present invention, the outer ring 410 may further include a plurality of stopping grooves 413 formed on the outer circumference thereof at regular intervals and configured to allow the rotation control lever 440 to be respectively caught therein or released therefrom.

In the configuration of the backstop ratchet ring 401, the inner ring 420 is configured to substantially transmit main power. Further, the inner ring 420 interferes with the outer ring 410 so as to transmit main power to the outer ring 410 or is released from the outer ring 410 so as to release the main power from the outer ring 410.

To this end, in the present invention, the inner ring 420 is configured to have a circular ring shape. Here, the inner ring 420 has a drum shaft mounting hole 421 formed to pass through a central portion thereof and configured to allow the drum shaft 310 provided to transmit rotational power to be coupled thereto. Further, the inner ring 420 is configured to be mounted in the inner ring mounting hole 411 of the outer ring 410.

In addition, the inner ring 420 has a plurality of bundle pawl mounting grooves 422 formed on the outer circumference thereof at regular intervals in the circumferential direction and configured to enable first, second, and third multi-angle bundle pawls 431, 432, and 433 to be described later to be respectively mounted therein.

Meanwhile, in the present invention, the outer ring 410 and the inner ring 420 are configured to enable close coupling therebetween. Further, sliding operation may be stably performed when the outer ring 410 and the inner ring 420 are coupled to each other.

To this end, first, each of the outer ring saw teeth 412 of the outer ring 410 is configured to protrude toward the inside of the inner ring mounting hole 411 by a predetermined amount. Accordingly, front and rear stepped portions 412*a* and 412*b* are respectively formed at the front side and the rear side of the outer ring saw teeth 412.

In addition, the inner ring 420 is configured to have a seating protrusion 423 formed to protrude from the rear circumference thereof and slidably seated on the rear stepped portion 412*b* of the outer ring 410. Further, the inner ring 420 is configured to have a finishing plate support portion 424 formed to protrude from the front side thereof so as to extend from the drum shaft mounting hole 421.

Further, the front side of the inner ring 420 is configured to be finished with a finishing plate 425. Here, the circumference of the finishing plate 425 is configured to be seated on the front stepped portion 412*a* of the outer ring 410 and to be bolted to the inner ring 420, thereby constraining the outer ring saw teeth 412. Further, the finishing plate 425 is configured to have a through hole 425*a* formed in a central portion thereof and configured to allow the finishing plate support portion 424 of the inner ring 420 to pass therethrough.

In the configuration of the backstop ratchet ring 401, the multi-angle bundle pawl unit 430 serves as a means to transmit power of the inner ring 420 to the outer ring 410 or release power of the inner ring 420 from the outer ring 410 in response to the outer ring saw teeth 412 of the outer ring 410. In the present invention, the multi-angle bundle pawl unit 430 is formed of a plurality of groups including the first, second, and third multi-angle bundle pawls 431, 432, and 433.

To this end, the first, second, and third multi-angle bundle pawls 431, 432, and 433 respectively have springs S each installed in a corresponding one of the bundle pawl mounting grooves 422, thereby allowing the first, second, and third multi-angle bundle pawls 431, 432, and 433 to protrude from the outer circumference of the inner ring 420. Further, the first, second, and third multi-angle bundle pawls 431, 432, and 433 are configured to be engaged with the outer ring saw teeth 412 of the outer ring 410, thereby providing rotational force in one direction.

In this case, in the present invention, the first, second, and third multi-angle bundle pawls 431, 432, and 433 are configured to form three groups. Here, each of the three groups may be formed of a corresponding one of first, second, and third engagement tools 431*a*, 432*a*, and 433*a*, in which each of the radially arranged (that is, arranged at 90° intervals) four first engagement tools 431*a*, four second engagement tools 432*a*, and four third engagement tools 433*a* forms one group.

In the present invention, the first, second, and third engaging tools 431*a*, 432*a*, and 433*a* corresponding to respective groups are configured to have protruding force by respectively inserting the springs S into the bundle pawl mounting grooves 422. The first, second, and third engaging tools 431*a*, 432*a*, and 433*a* have engagement tool saw teeth 431*b*, 432*b*, and 433*b* respectively provided at tip portions thereof, in which each of the engagement tool saw teeth 431*b*, 432*b*, and 433*b* is formed to have a straight portion and an inclined portion so as to be engaged with the outer ring saw teeth 412 of the outer ring 410.

Particularly, in the present invention, when the first, second, and third engagement tools 431*a*, 432*a*, and 432*a* respectively corresponding to the first, second, and third multi-angle bundle pawls 431, 432, and 433 of the respective groups are respectively mounted in the bundle pawl mounting grooves 422, the first, second, and third engagement tools 431*a*, 432*a*, and 433*a* are respectively disposed at positions where the first, second, and third engagement tools 431*a*, 432*a*, and 433*a* intersect each other. That is, the first engagement tool 431*a* of the first multi-angle bundle pawl 431, the second engagement tool 432*a* of the second multi-angle bundle pawl 432, and the third engagement tool 433*a* of the third multi-angle bundle pawl 433 are continuously and repeatedly formed in one rotational direction. In this manner, the engagement tool saw teeth 431*b*, 432*b*, and 433*b* are configured to be engaged with the outer ring saw teeth 412 at sequential positions respectively having different angles.

That is, in the present invention, any one of the first, second, and third engagement tool saw teeth 431*b*, 432*b*, and

433*b* of the first, second, and third engagement tool 431*a*, 432*a*, and 433*a* of the first, second, and third multi-angle bundle pawls 431, 432, and 433 is engaged with the outer ring saw teeth 412 of the outer ring 410. For example, when the straight portions of the engagement tool saw teeth 431*b* of the first engagement tool 431*a* are respectively in contact with the straight portions of the outer ring saw teeth 412, the straight portions of the engagement tool saw teeth 432*b* of the second engagement tool 432*a* are respectively located at the ends of the inclined portions of the outer ring saw teeth 412. As a result, the engagement tool saw teeth 432*b* are not engaged with the outer ring saw teeth 412. In addition, the straight portions of the engagement tool saw teeth 433*b* of the third engagement tool 433*a* are respectively located at the middle portions of the inclined portions of the outer ring saw teeth 412. In this manner, segmented engagement sections of the engagement tool saw teeth 431*b*, 432*b*, and 433*b* are provided within one pitch of the outer ring saw teeth 412, thereby minimizing a gap between the saw teeth.

Meanwhile, in the embodiment of the present invention, the first, second, and third multi-angle bundle pawls 431, 432, and 433 forming a plurality of groups have been described as three groups, but the present invention is not limited thereto. The first, second, and third multi-angle bundle pawls 431, 432, and 433 may be arranged in various configurations at equal intervals.

For example, the plurality of groups may be formed of four groups of multi-angle bundle pawls, and each of the four groups may be formed of four engagement tools. Alternatively, the plurality of groups may be formed of three groups of multi-angle bundle pawls, and each of the three groups may be formed of eight engagement tools. As described above, the number of groups and the number of engagement tools are adjusted, thereby making it possible to control a degree of precision depending on the purpose of use of the backstop ratchet ring 401.

In the configuration of the backstop ratchet ring 401, the rotation control lever 440 is configured to control rotation and stoppage of the outer ring 410.

To this end, the rotation control lever 440 is configured to be axially installed in the body 100 and to have a spring installed in the body 100. In this manner, the rotation control lever 440 is configured to be inserted into and removed from the stopping groove 413 of the outer ring 410 through rotational operation thereof. When the rotation control lever 440 is inserted thereinto, rotation of the outer ring 410 is blocked, and when the rotation control lever 440 is removed therefrom, rotation of the outer ring 410 is possible.

In the configuration of the automatic direction switching pendulum-type rotary drive ratchet wire grip for indirect live wire work 1 according to the present invention, the drum shaft operating plate 500 is configured to transmit rotational force to the drum shaft 310.

To this end, the drum shaft operating plate 500 is formed to have a circular plate shape with a certain thickness so as to be coupled to the circumference of the drum shaft 310 on the front side of the clutch part 400. Here, the drum shaft operating plate 500 has triangular-shaped saw teeth 510 provided on the circumference of a middle portion thereof and formed to protrude from the middle portion.

In the configuration of the automatic direction switching pendulum-type rotary drive ratchet wire grip for indirect live wire work 1 according to the present invention, the pendulum 600 is configured to control, through pendulum motion, reciprocating rotation operation of an automatic reversing pawl 800 to be described later.

To this end, the pendulum 600 is configured to penetrate the rear side of the drum shaft operating plate 500 without rotational interference. Further, the pendulum 600 protrudes from one side thereof and has a horizontal long hole 610 formed therein and configured to accommodate the cam 220 of the rotary operating lever 200. When the cam 220 is rotated, the cam 220 interferes with the horizontal long hole 610 so as to perform pendulum motion in which the pendulum 600 reciprocates relative to the drum shaft 310.

In addition, the pendulum 600 has an automatic reversing pawl mounting groove 620 formed therein and configured to allow the automatic reversing pawl 800 to be described later to be mounted on the front surface between the rotary operating shaft 210 and the drum shaft operating plate 500.

In the configuration of the automatic direction switching pendulum-type rotary drive ratchet wire grip for indirect live wire work 1 according to the present invention, the drum shaft support plate 700 is configured to allow the pawl reversing key 900 to be described later to be mounted thereon.

To this end, the drum shaft support plate 700 is configured to penetrate the front side of the drum shaft operating plate 500 without rotational interference. Further, the drum shaft support plate 700 is configured to be coupled to the pendulum 600 so as to constrain the drum shaft operating plate 500, and is formed to protrude toward the rotary operating shaft 210.

In the configuration of the automatic direction switching pendulum-type rotary drive ratchet wire grip for indirect live wire work 1 according to the present invention, the automatic reversing pawl 800 is configured to interfere with the drum shaft operating plate 500 so as to automatically perform forward rotation or reverse rotation of the drum shaft operating plate 500.

To this end, the automatic reversing pawl 800 is configured to be coupled to the automatic reversing pawl mounting groove 620 of the pendulum 600 with a pawl shaft 801, thereby enabling the drum shaft operating plate 500 to perform reciprocating pendulum motion.

Figure 12:
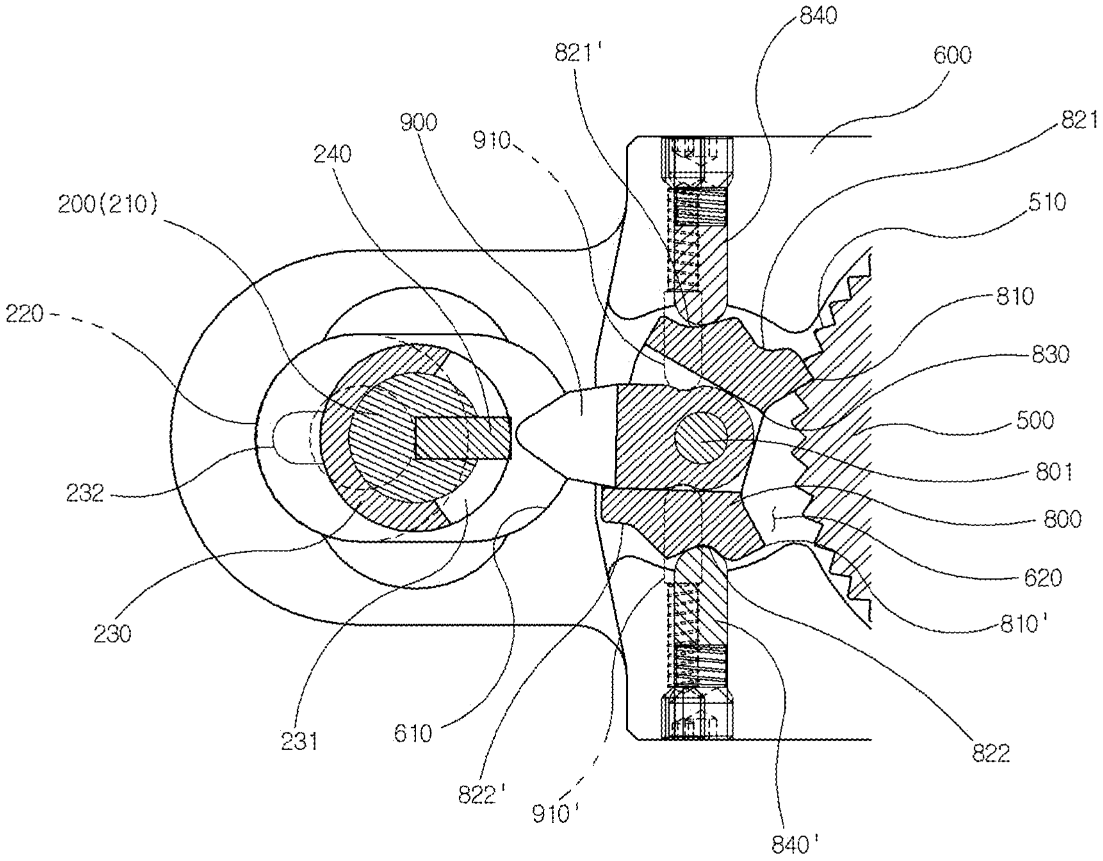
FIG. 12 is a view showing main parts including a pendulum, an automatic reversing pawl, and a pawl reversing key of the automatic direction switching pendulum-type rotary drive ratchet wire grip for indirect live wire work according to the present invention.

Meanwhile, in the present invention, referring to FIG. 12, the automatic reversing pawl 800 has first and second triangular locking protrusions 810 and 810' formed at a tip portion thereof, that is, disposed toward the side of the drum shaft operating plate 500, in which the first and second triangular locking protrusions 810 and 810' are formed to protrude symmetrically and are selectively engaged with the saw teeth 510 of the drum shaft operating plate 500.

Further, the automatic reversing pawl 800 includes first locking grooves 821 and 821' and second locking grooves 822 and 822' each formed to have a curved curvature and disposed around the automatic reversing pawl 800. In this case, the first locking grooves 821 821' and the second locking grooves 822 and 822' are configured to be symmetrical to each other so that the first locking groove 821 and the second locking groove 822 are respectively located on the first and second locking protrusions 810 and 810'.

Additionally, the automatic reversing pawl 800 has a reversing key mounting groove 830 formed at a central portion thereof and configured to allow the pawl revering key 900 to be described later to be mounted therein. The reversing key mounting groove 830 is configured to have a tapered groove shape extending from the drum shaft operating plate 500 side to the rotary operating shaft 210 side.

Meanwhile, the automatic reversing pawl 800 is configured to be installed through first and second reversing pawl spring balls 840 and 840'. The first and second reversing pawl spring balls 840 and 840' are configured to be coupled to the pendulum 600 so as to have elasticity allowing the first and second reversing pawl spring balls 840 and 840' to protrude toward the automatic reversing pawl 800.

In this case, in the present invention, the first and second reversing pawl spring balls 840 and 840' are configured to interfere with the first locking grooves 821 and 821' and the second locking grooves 822 and 822'. Here, the first reversing pawl spring ball 840 is configured to interfere with any corresponding one of the first locking grooves 821 and 821' at a location at which the first reversing pawl spring ball 840 and the corresponding one intersect each other, and the second reversing pawl spring ball 840' is configured to interfere with any corresponding one of the second locking grooves 822 and 822' at a location at which the second reversing pawl spring ball 840' and the corresponding one intersect each other.

For example, when the drum shaft operating plate 500 is rotated in the forward direction, that is, rotated clockwise, the first revering pawl spring ball 840 located on one side of the pendulum 600 is desirably caught in the first locking groove 821' located on one side of the automatic reversing pawl 800, and the first reverse pawl spring ball 840' located on the other side of the pendulum 600 is desirably caught in the second locking groove 822 located on the other side of the automatic reversing pawl 800. Conversely, when the drum shaft operating plate 500 is rotated counterclockwise, the first revering pawl spring ball 840 located on one side of the pendulum 600 is desirably caught in the first locking groove 821 located on one side of the automatic reversing pawl 800, and the first reverse pawl spring ball 840' located on the other side of the pendulum 600 is desirably caught in the second locking groove 822' located on the other side of the automatic reversing pawl 800.

In the configuration of the automatic direction switching pendulum-type rotary drive ratchet wire grip for indirect live wire work 1 according to the present invention, the pawl reversing key 900 is configured to provide reciprocating rotational force to the automatic revering pawl 800.

To this end, the pawl reversing key 900 is accommodated in the reversing key mounting groove 830 of the automatic reversing pawl 800. Further, the pawl reversing key 900 is coupled to the drum shaft support plate 700 with the same pawl shaft 801 as the automatic reversing pawl 800 and protrudes from one side thereof, that is, protrudes toward the rotary operating shaft 210. In the process of rotating the rotary operating shaft 210, the pawl reversing key 900 is configured to interfere with the locking protrusion 232 of the rotary operating mechanism 230, thereby performing reciprocating pendulum motion.

In this case, the pawl reversing key 900 is configured to have horizontal force so as to constantly maintain horizontality thereof. To this end, opposite sides of the pawl reversing key 900 are configured to be elastically installed by first and second reversing key spring balls 910 and 910' respectively formed on opposite sides of the drum shaft support plate 700 relative to the pawl shaft 801.

In the configuration of the automatic direction switching pendulum-type rotary drive ratchet wire grip for indirect live wire work 1 according to the present invention, the drum shaft rotary lever 1000 is configured to transmit rotational force of the drum shaft operating plate 500 to the drum shaft 310.

To this end, the drum shaft rotary lever 1000 is configured to be coupled to the front side of the drum shaft 310 and the drum shaft operating plate 500. Further, the drum shaft rotary lever 1000 is configured to rotate in conjunction with the drum shaft 310 and the drum shaft operating plate 500.

In the configuration of the automatic direction switching pendulum-type rotary drive ratchet wire grip for indirect live wire work 1 according to the present invention, the belt 1100 is configured to be wound around the drum shaft 310. Here, the belt 1100 may be wound around the drum 300 or may be unwound therefrom during forward rotation of the drum shaft 310 or reverse rotation thereof.

To this end, the belt 1100 is configured in such a manner that one side of the belt 1100 is fixed to and wound around the drum 300 inside the body 100, and the other side thereof is fixed to the belt fixing pin 102 formed in the body 100.

In the configuration of the automatic direction switching pendulum-type rotary drive ratchet wire grip for indirect live wire work 1 according to the present invention, the wire clip 1200 is configured to allow the belt 1100 to pass therethrough and to be caught thereby. Further, the wire clip 1200 enables the wire to be gripped and fixed thereto during normal wiring work.

In this case, the wire clip 1200 in the present invention may not be newly implemented. For example, a normal clamp capable of gripping a wire may be applied to the wire clip 1200.

In particular, the wire clip 1200 in the present invention may use a wire clip applied to an automatic direction switching pendulum-type rotary drive ratchet wire grip for indirect live wire work 1 capable of gripping a wire during indirect live line work, which was invented by the applicant of the present invention and disclosed in Korean Patent No. 10-2161405.

Hereinafter, the operation of the automatic direction switching pendulum-type rotary drive ratchet wire grip for indirect live wire work according to the present invention having the above configuration will be described in detail with reference to the attached drawings.

With reference to FIGS. 3 to 12, the automatic direction switching pendulum-type rotary drive ratchet wire grip for indirect live wire work 1 according to the present invention is configured to apply forward or reverse rotational force to the drum shaft 310 so as to wind the belt 1100 around the drum 300 or unwind the belt 1100 therefrom, thereby adjusting tension of the wire. In this case, even if a separate direction switching lever is not operated, by using a stick for live wire work equipped with an electric mechanism and the like, it is possible to perform forward or reverse rotation of the drum shaft 310 by simply adjusting the rotation direction of the rotary operating shaft 210 during indirect live wire work in a state in which a safe distance is secured between a worker and a distribution line.

Here, in the automatic direction switching pendulum-type rotary drive ratchet wire grip for indirect live wire work 1 according to the present invention, first, in order to apply tension to the wire, the belt 1100 is wound around the drum. In this case, the drum shaft 310 is rotatably driven clockwise, that is, in the forward direction. Hereinafter, the above-described operating state will be described.

Figure 13:
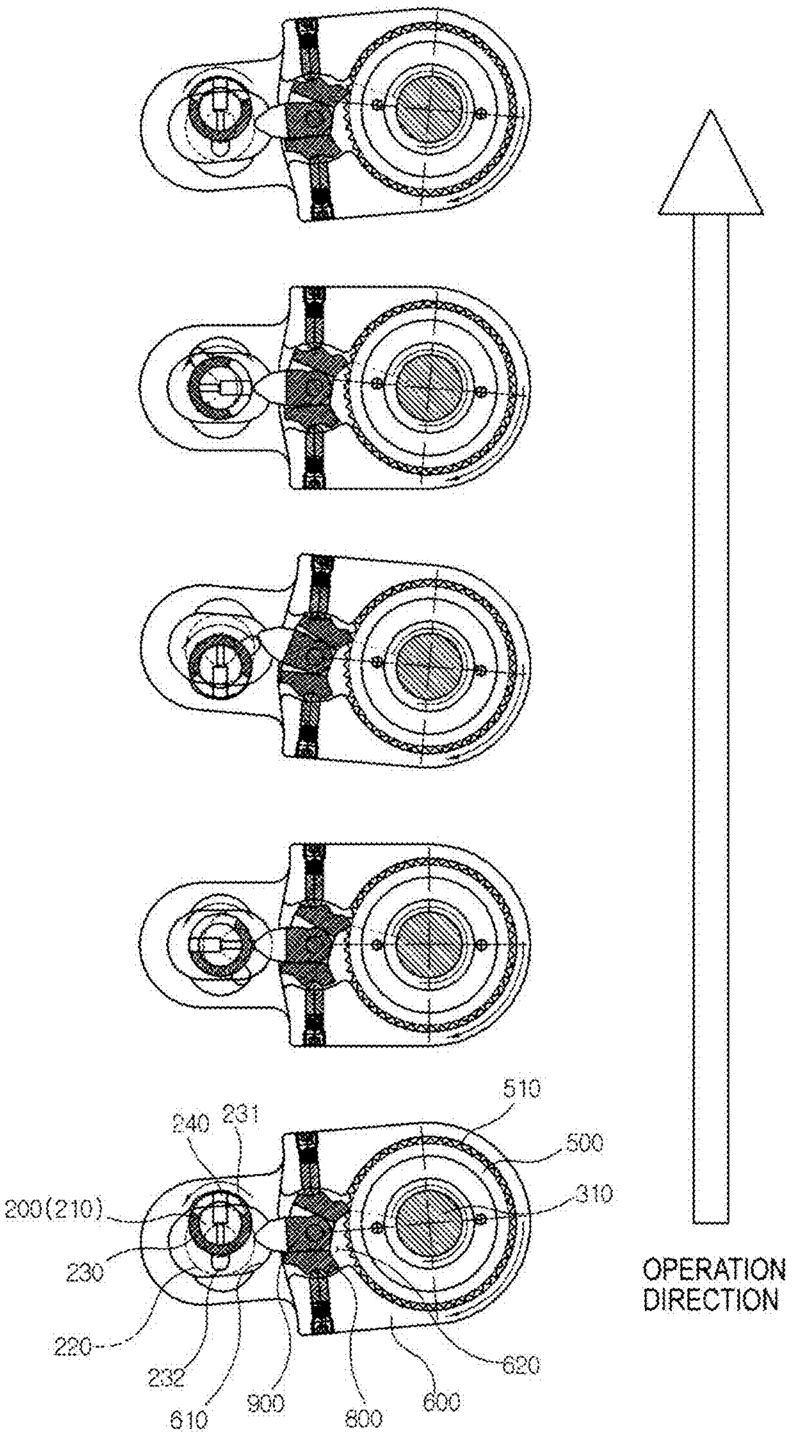
FIG. 13 is a view showing a forward direction operation state of the automatic direction switching pendulum-type rotary drive ratchet wire grip for indirect live wire work according to the present invention.

To this end, referring to FIG. 13, the rotary operating lever 200 is simply rotated counterclockwise. At this time, the rotation control lever 440 is inserted into any one of the stopping grooves 413 of the outer ring 410 so as to prevent rotation of the outer ring 410.

Accordingly, when the rotary operating lever 200 is operated to rotate the rotary operating shaft 210 counterclockwise, the cam 220 is rotated within the horizontal long hole 610 of the pendulum 600. In this process, the pendulum 600 is subjected to reciprocating pendulum motion relative to the drum shaft 310.

Simultaneously, the locking protrusion 232 of the rotary operating mechanism 230 formed on the rotary operating shaft 210 turns the pawl reversing key 900 toward the first locking grooves 821 and 821'. Accordingly, the pawl reversing key 900 pushes the automatic revering pawl 800 in the direction of the first locking grooves 821 and 821' and rotates the same clockwise around the pawl shaft 801. In this case, the first locking protrusion 810 on the first locking groove 821 side is engaged with the saw teeth 510 of the drum shaft operating plate 500.

Accordingly, when the rotary operating shaft 210 is continuously rotated, the pendulum 600 performs reciprocating pendulum motion by operation of the cam 220 and the horizontal long hole 610. In this process, the pawl reversing key 900 rotated in the rotation direction due to interference with the locking protrusion 232 of the rotary operating mechanism 230 supports the first locking grooves 821 and 821' side of the automatic reversing pawl 800 and rotatably pushes the drum shaft operating plate 500 that is engaged with the automatic reversing pawl 800 and performs reciprocating pendulum motion with the pendulum 600. In this case, the drum shaft 310 is rotated in conjunction with forward rotation of the drum shaft operating plate 500, thereby winding the belt 1100 around the drum 300.

Meanwhile, in the present invention, as described above, reverse rotation of the drum shaft 310 is prevented when rotation of the drum shaft 310 is performed to obtain tension, which is made possible by the clutch part 400.

Here, in the present invention, the clutch part 400 is formed of the backstop ratchet ring 401. Reverse rotation is prevented by the backstop ratchet ring 401, and an operation process of the backstop ratchet ring 401 will be described below.

Figure 14:
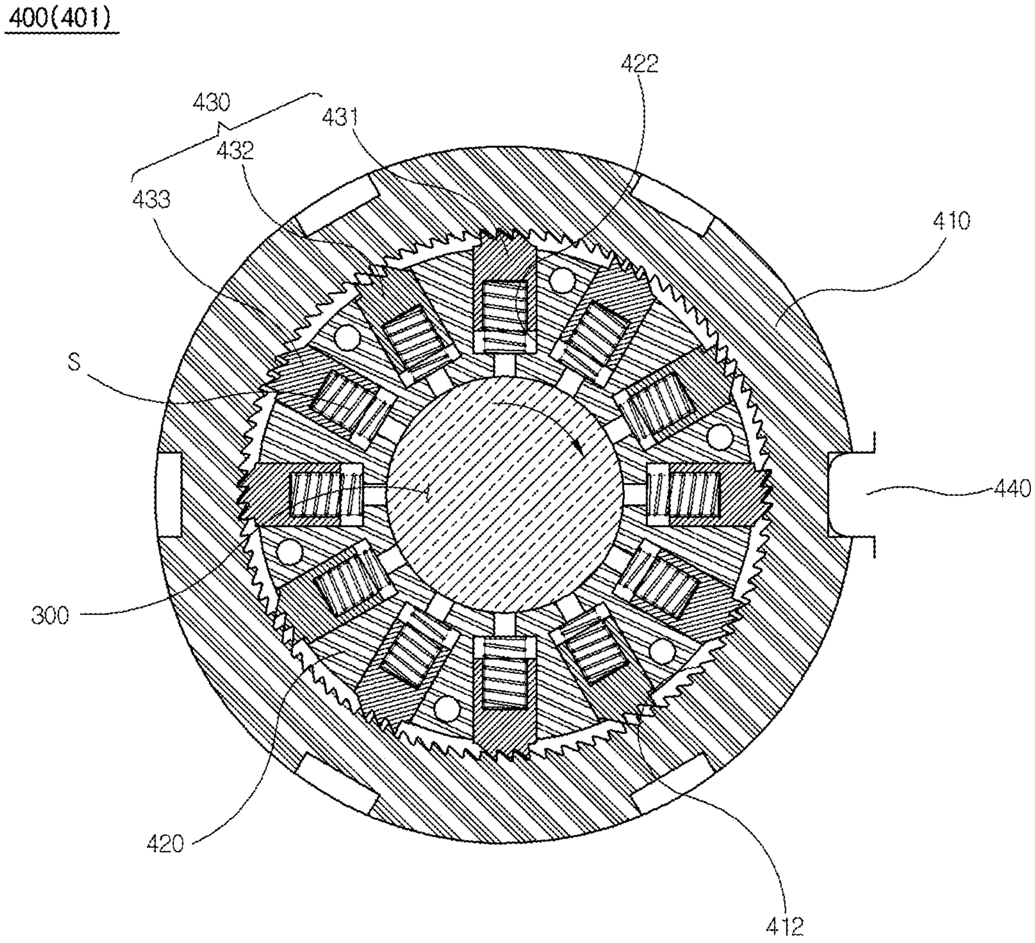
FIG. 14 is a view showing a forward direction operation state of a backstop ratchet ring of the automatic direction switching pendulum-type rotary drive ratchet wire grip for indirect live wire work according to the present invention.

Referring to FIG. 14, when the inner ring 420 coupled to the drum shaft 310 is rotated in the forward direction, the inclined portions of the engagement tool saw teeth 431*b*, 432*b*, and 433*b* of the first, second, and third engagement tools 431*a*, 432*a*, and 433*a* respectively forming the first, second, and third multi-angle bundle pawls 431, 432, and 433 pass over the inclined portions of the outer ring saw teeth 412 of the outer ring 410.

That is, since the springs S are respectively installed in the first, second, and third engagement tools 431*a*, 432*a*, and 433*a* of the inner ring 420, the engagement tool saw teeth 431*b*, 432*b*, and 433*b* that pass over the outer ring saw teeth 412 are pushed rearwards by compressive force of the springs S, and simultaneously, the inclined portions of the outer ring saw teeth 412 and the inclined portions of the engagement tool saw teeth 431*b*, 432*b*, and 433*b* slide and move over each other.

Meanwhile, in a state in which the forward drive as described above is stopped, rotational force causing the inner ring 420 to be rotated in the reverse direction may be generated by tension of the belt 1100. In this case, in the backstop ratchet ring 401, any one of the engagement tool saw teeth 431*b*, 432*b*, and 433*b* respectively formed on the first, second, and third engagement tools 431*a*, 432*a*, and 433*a* of the first, second, and third multi-angle bundle pawls 431, 432, and 433 is engaged with the outer ring saw teeth 412, thereby preventing the reverse rotation of the inner ring 420. Accordingly, it is possible to stably wind the belt 1100 and to reliably apply tension to the belt 1100.

Conversely, when the belt 1100 is unwound from the drum 300 so as to release tension of the belt 1100, the drum shaft 310 is rotated counterclockwise, that is, in the reverse direction. The above-described operating state of the drum shaft 310 will be described below.

Figure 15:
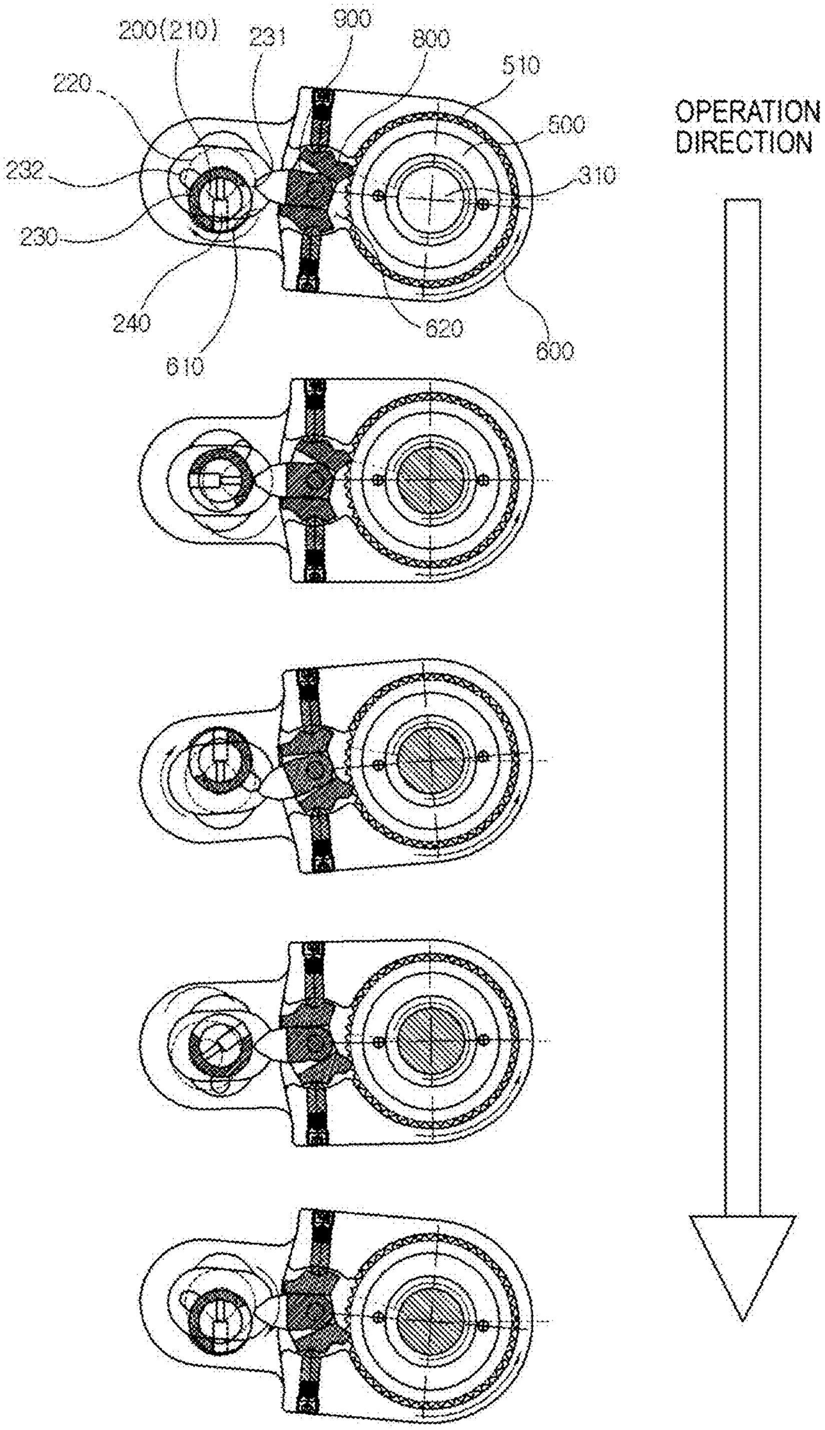
FIG. 15 is a view showing a reverse direction operation state of the automatic direction switching pendulum-type rotary drive ratchet wire grip for indirect live wire work according to the present invention.

Accordingly, referring to FIG. 15, when the rotary operating lever 200 is operated to rotate the rotary operating shaft 210 clockwise, the cam 220 is rotated within the horizontal long hole 610 of the pendulum 600. In this process, the pendulum 600 is subjected to reciprocating pendulum motion relative to the drum shaft 310.

In this case, the locking protrusion 232 of the rotary operating mechanism 230 formed on the rotary operating shaft 210 rotatably pushes the pawl reversing key 900 toward the second locking grooves 822 and 822'. Accordingly, the pawl reversing key 900 pushes the automatic reversing pawl 800 in the direction of the second locking grooves 822 and 822' so as to rotate the automatic reversing pawl 800 counterclockwise around the pawl shaft 801. At this time, the second locking protrusion 810' on the second locking groove 822 side of the automatic reversing pawl 800 is engaged with the saw teeth 510 of the drum shaft operating plate 500.

Accordingly, when the rotary operating shaft 210 is continuously rotated, the pendulum 600 performs reciprocating pendulum motion by operation of the cam 220 and the horizontal long hole 610. In this process, the pawl reversing key 900 rotated in the rotation direction due to interference with the locking protrusion 232 of the rotary operating mechanism 230 supports the second locking groove 822' side of the automatic reversing pawl 800 and rotatably pushes the drum shaft operating plate 500 that is engaged with the automatic reversing pawl 800 and performs reciprocating pendulum motion with the pendulum 600. In this case, the drum shaft 310 is rotated in conjunction with reverse rotation of the drum shaft operating plate 500, thereby unwinding the belt 1100 from the drum 300.

Meanwhile, in the present invention, as described above, when the outer ring 410 is driven by the reverse operation of the inner ring 420, backlash (backward movement) of the inner ring 420 is maximally reduced so that possibility of backlash is close to zero, thereby making it possible to prevent impact during power transmission.

The above-described operation may be performed by the multi-angle bundle pawl unit 430 configured to transmit rotational power of the inner ring 420 to the outer ring 410.

Figure 16:
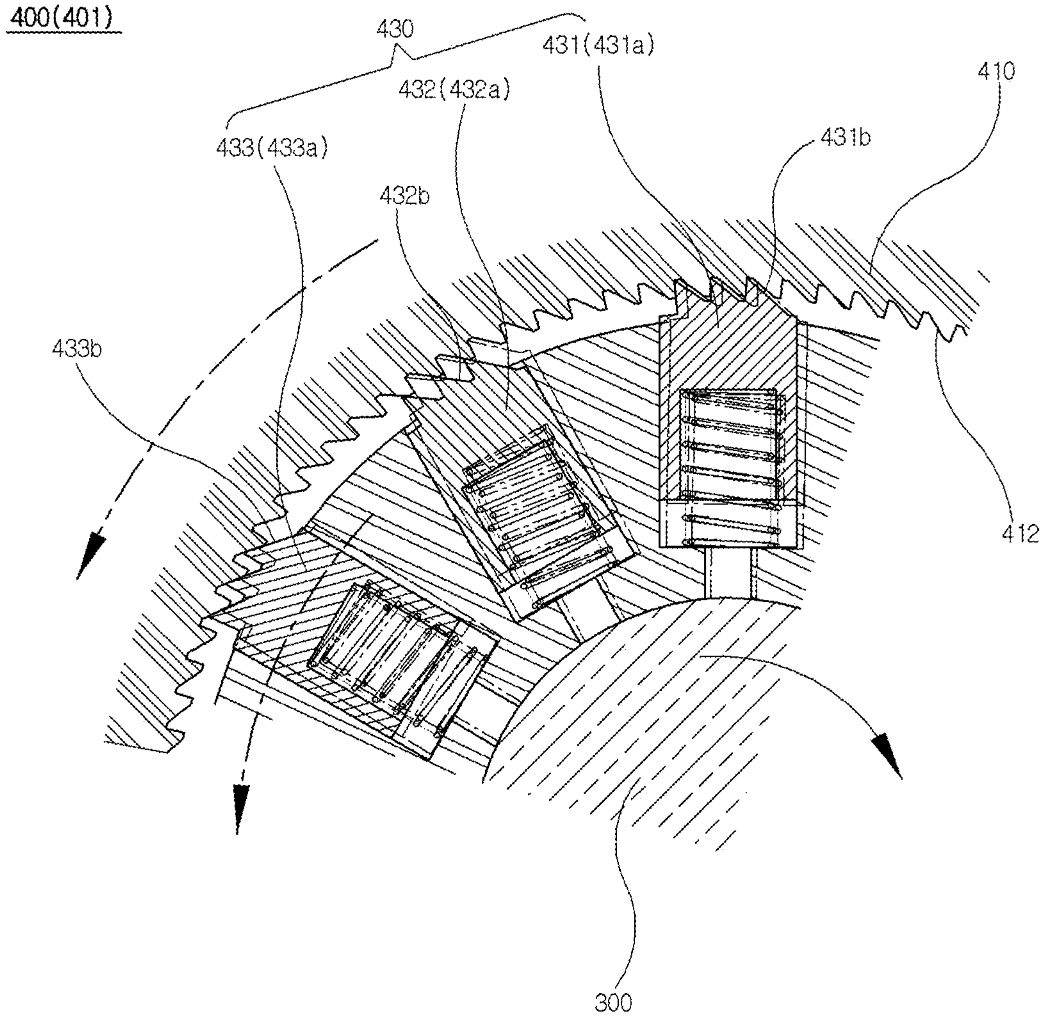
FIG. 16 is a view showing a reverse direction operation state of the backstop ratchet ring of the automatic direction switching pendulum-type rotary drive ratchet wire grip for indirect live wire work according to the present invention.

That is, with reference to FIG. 16, in the present invention, the first, second, and third engagement tool saw teeth 431*b*, 432*b*, and 433*b* of the first, second, and third engagement tool 431*a*, 432*a*, and 433*a* of the first, second, and third multi-angle bundle pawls 431, 432, and 433 are sequentially engaged with the outer ring saw teeth 412 of the outer ring 410.

For example, when the straight portions of the engagement tool saw teeth 431*b* of the first engagement tool 431*a* are respectively in contact with the straight portions of the outer ring saw teeth 412 so as to enter the engagement state therebetween, the straight portions of the engagement tool saw teeth 432*b* of the second engagement tool 432*a* are respectively located at the ends of the inclined portions of the outer ring saw teeth 412. In this manner, the engagement tool saw teeth 432*b* are not engaged with the outer ring saw teeth 412. In addition, the straight portions of the engagement tool saw teeth 433*b* of the third engagement tool 433*a* are respectively located at the middle portions of the inclined portions of the outer ring saw teeth 412. Accordingly, when the inner ring 420 is rotated, the first, second, and third engagement tools 431*a*, 432*a*, and 433*a* sequentially apply engagement force to the outer ring saw teeth 412. As a result, the multi-angle bundle pawl unit 430 is constantly engaged with the outer ring saw teeth 412 in a sequential manner.

That is, in the backstop ratchet ring 401, segmented engagement sections of the engagement tool saw teeth 431*b*, 432*b*, and 433*b* are provided within one pitch of the outer ring saw teeth 412. Accordingly, even if slight rotation occurs, engagement force is achieved at sequential positions respectively having different angles in a sequential manner. As a result, when reverse power is transmitted, precise power transmission may be performed without backlash occurrence.

Figure 17:
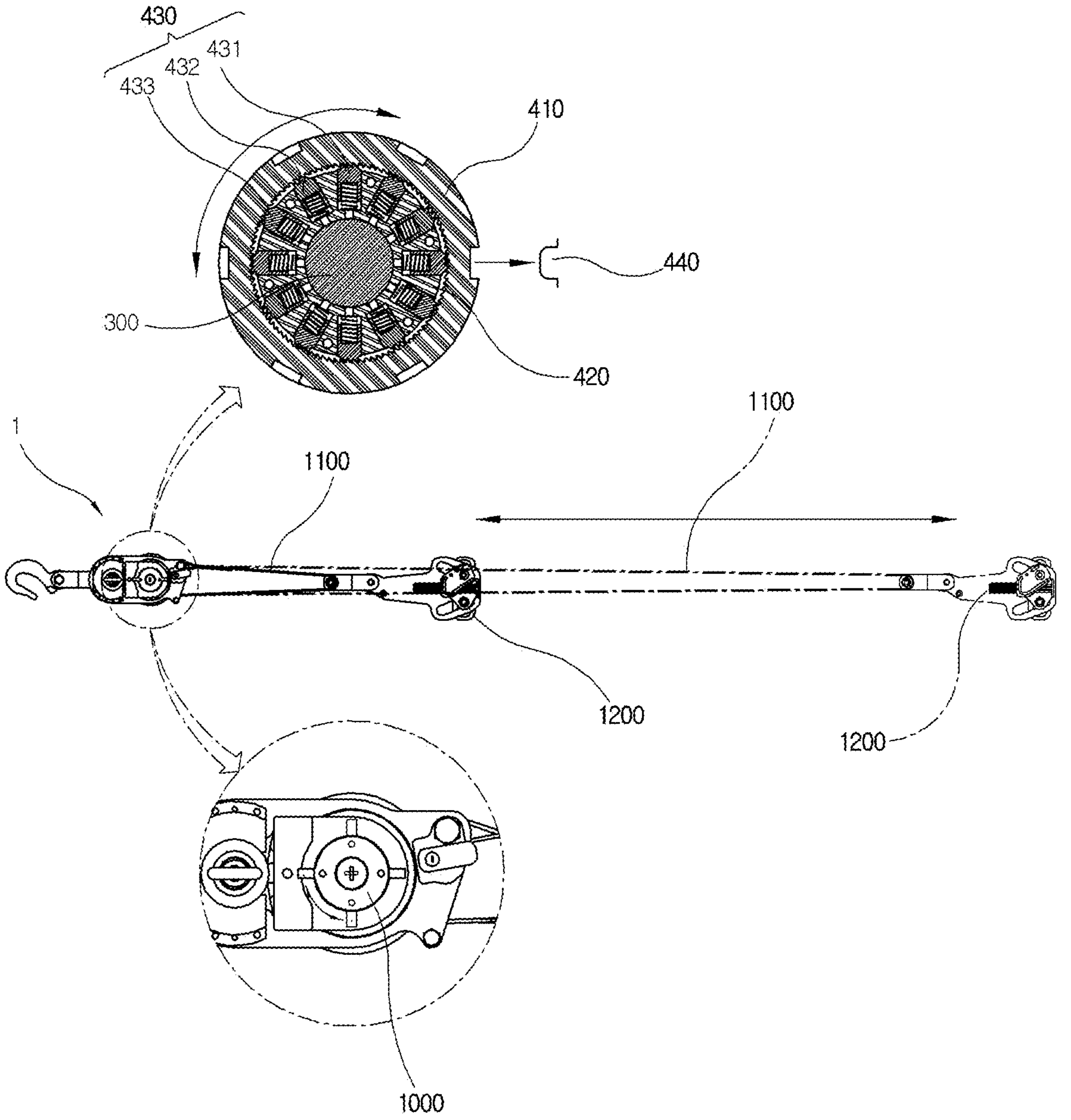
FIG. 17 is a view showing an operation state of manual winding and unwinding of a belt of the automatic direction switching pendulum-type rotary drive ratchet wire grip for indirect live wire work according to the present invention.
Figure 18:
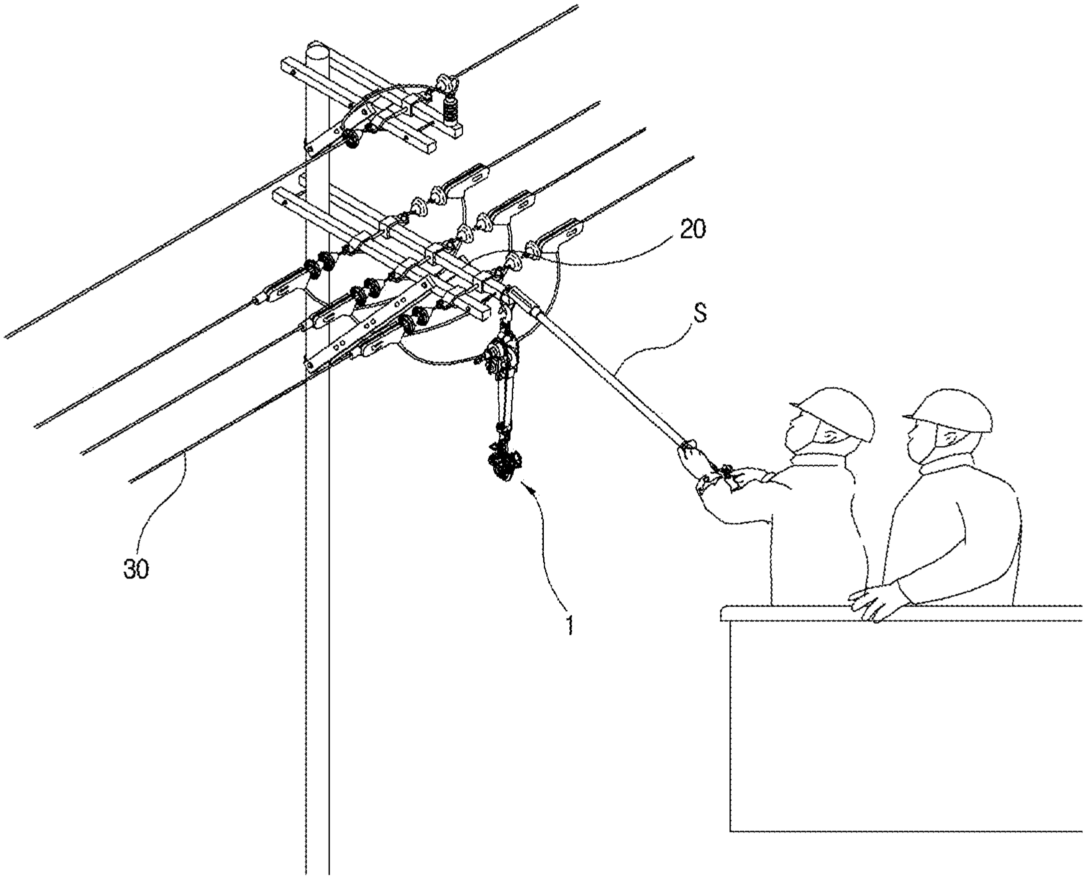

Meanwhile, referring to FIG. 17, when a worker wants to sufficiently wind or unwind the belt 1100 during work preparation time before or after using the automatic direction switching pendulum-type rotary drive ratchet wire grip for indirect live wire work 1 according to the present invention or during work preparation and arrangement time, it is possible to simply perform manual rotation of the drum shaft 310 without operation of the rotary operating lever 200. Accordingly, the belt 1100 may be reliably wound or unwound by controlling manual rotation of the drum shaft rotary lever 1000 connected to the drum shaft 310 in a state in which the rotation control lever 440 is separated from the stopping groove 413 of the outer ring 410.

Hereinafter, a method of performing indirect live wiring using the automatic direction switching pendulum-type rotary drive ratchet wire grip for indirect live wire work according to the present invention having the above-described configuration will be described in detail with reference to the attached drawings.

Referring to FIGS. 3 to 17, the method of performing indirect live wiring using the automatic direction switching pendulum-type rotary drive ratchet wire grip for indirect live wire work is capable of performing various steps such as a step of adjusting a dip of a wire, a step of pulling a wire to obtain an appropriate dip of the wire and installing the wire on an electric pole, a step of performing suspension insulator replacement work, and a step of separating and removing the wire from the electric pole.

Meanwhile, a stick for live wire work applied to the method of performing indirect live wiring using the automatic direction switching pendulum-type rotary drive ratchet wire grip for indirect live wire work is not limited. The stick for live wire work may be configured in various ways. For example, it is possible to employ various sticks such as a normal stick for live wire work, a plier stick invented by the applicant of the present invention and disclosed in Korean Patent No. 10-2021001, Korean Patent No. 10-1963537, Korean Patent No. 10-1963539, and a rotary grip-all clamp stick disclosed in Korean Patent No. 10-2028010.

First Embodiment

Referring to FIGS. 18 to 23, a description will be given as to a state of dip adjustment in the method of performing indirect live wiring using the automatic direction switching pendulum-type rotary drive ratchet wire grip for indirect live wire work.

When a wire 30 installed on both electric poles sags or is excessively tensioned, it is necessary to appropriately adjust a dip of the wire 30 using the automatic direction switching pendulum-type rotary drive ratchet wire grip for indirect live wire work 1. In this case, it is required to perform a step of installing a wire grip, a step of adjusting a dip of a wire, a step of installing the wire, and a step of removing the wire grip. To this end, referring to FIG. 18, a worker uses a bucket for live wire work and approaches the wire 30 installed on an electric pole while securing a safe distance between the wire 30 and the bucket. When approaching the wire 30, the worker prepares the automatic direction switching pendulum-type rotary drive ratchet wire grip for indirect live wire work 1 and a stick S for live wire work.

Thereafter, a step of installing the wire grip is performed as follows.

In the method of performing indirect live wiring using the automatic direction switching pendulum-type rotary drive ratchet wire grip for indirect live wire work, when dip adjustment is performed, the automatic direction switching pendulum-type rotary drive ratchet wire grip for indirect live wire work 1 may be installed on a rope 21 installed on an arm-shaped support member 20 of the electric pole or a deadend clamp 31.

Figure 19A:
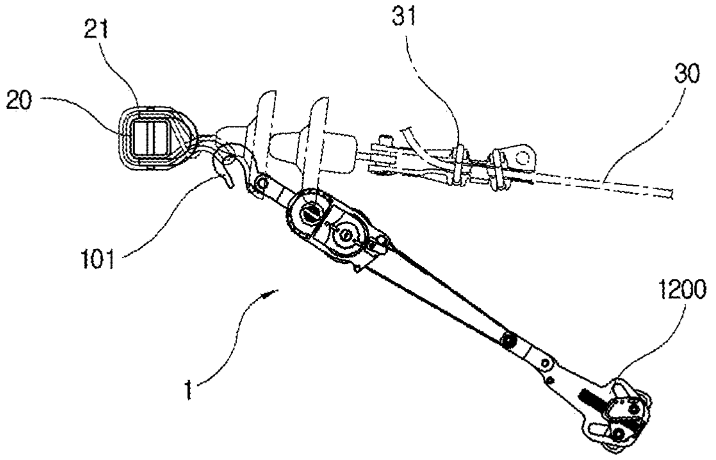
Figure 19B:
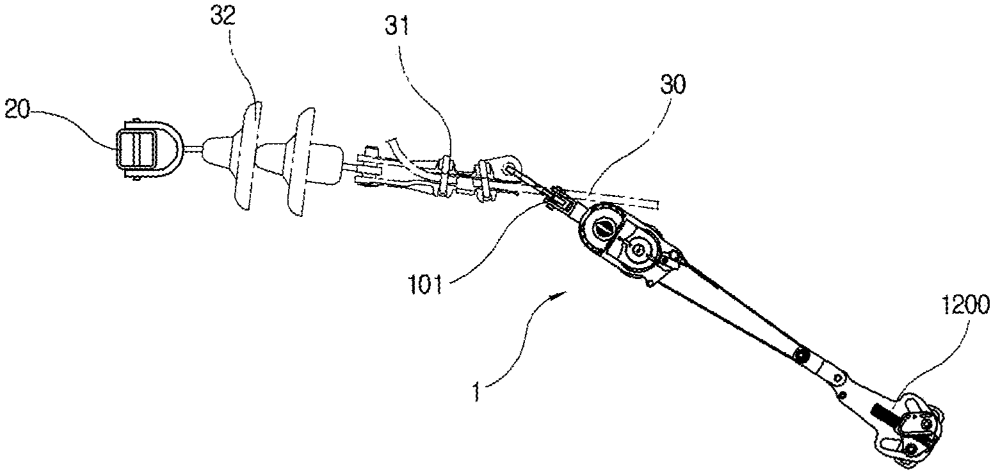

To this end, referring to FIGS. 19A and 19B, the wire grip 1 may be installed by being hooked on the rope 21 using a hook 101 provided on the wire grip 1, as shown in FIG. 19A, or may be installed on the rope 21 by being hooked on the deadend clamp 31 using the hook 101 provided on the wire grip 1, as shown in FIG. 19B. This hooking work may be performed from a distance using the stick for live wire work S.

Thereafter, a step of fixing the wire is performed as follows.

Figure 20A:
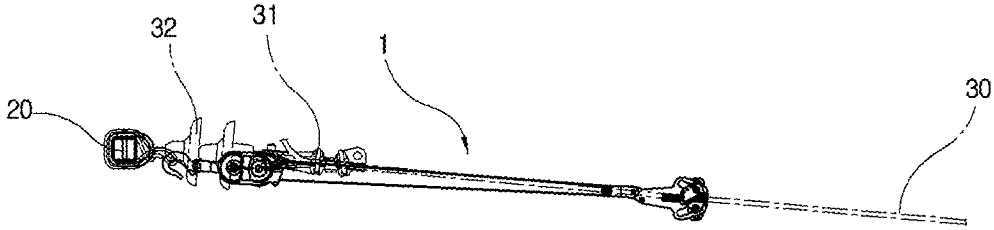
Figure 20B:
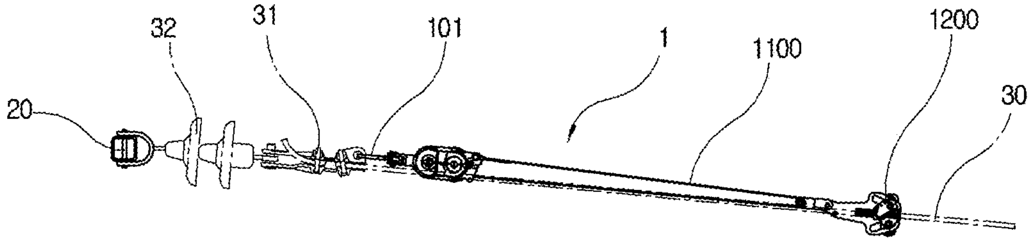

In the method of performing indirect live wiring using the automatic direction switching pendulum-type rotary drive ratchet wire grip for indirect live wire work, when the step of adjusting the dip is performed, as shown in FIGS. 20A and 20B, the automatic direction switching pendulum-type rotary drive ratchet wire grip for indirect live wire work 1 may be fixed to the previously installed wire 30 by causing the wire clip 1200 to fixedly hold the previously installed wire 30.

Thereafter, the step of adjusting the dip is performed as follows.

Figure 21A:
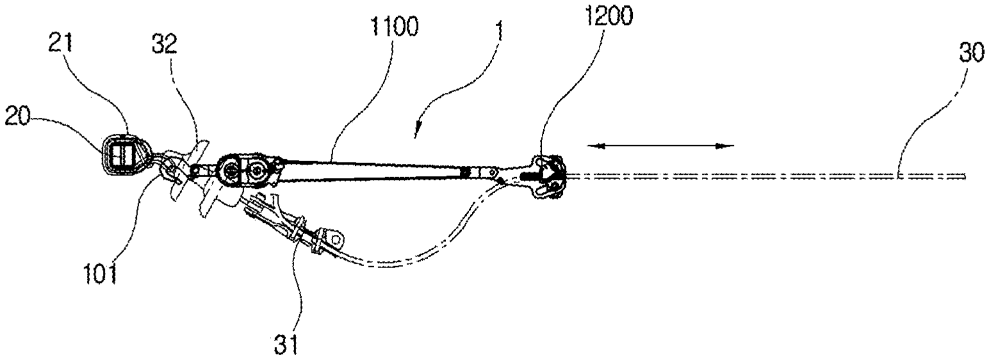
Figure 21B:
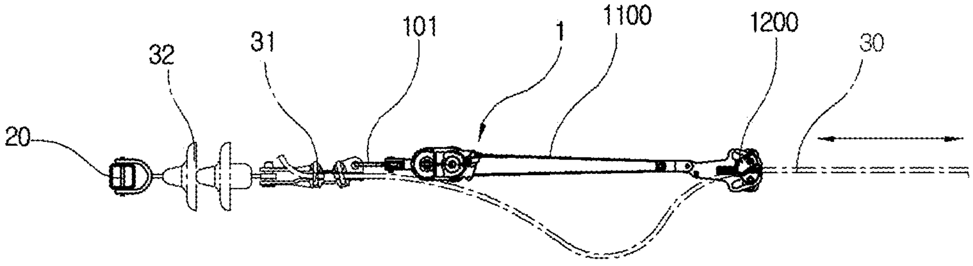

In the method of performing indirect live wiring using the automatic direction switching pendulum-type rotary drive ratchet wire grip for indirect live wire work, when dip adjustment is performed, referring to FIGS. 21A and 21B, tension of the wire 30 corresponding to this work may be adjusted to obtain an appropriate dip of the wire 30. Here, dip adjustment is performed by pulling or releasing the wire 30 so as to adjust tension of the wire 30 through an operation of rotating the rotary operating lever 200 of the wire grip 1 in the forward or reverse direction to cause the pendulum 600 to perform pendulum motion, an operation of rotating the automatic reversing pawl 800, and an operation of rotating the drum shaft 310 connected to the drum shaft operating plate 500 in the forward or reverse direction so as to wind the belt 1100 around the drum 300 or unwind the belt 1100 therefrom.

At this time, in order to adjust tension of the wire 30, it is possible to stop the outer ring 410 or control rotation thereof by attachment and detachment operation of the rotation control lever 440.

In order to wind the belt 1100 around the drum 300 and apply tension to the wire, the rotation control lever 440 needs to be operated in a state of being fitted into the stopping groove 413 of the outer ring 410.

Thereafter, the rotary operating lever 200 is rotated counterclockwise using the stick for live wire work in a state in which a safe distance is secured between the wire and the worker. Accordingly, the drum shaft 310 pulls the belt 1100 through the clockwise rotation thereof, thereby applying tension to the wire 30.

Meanwhile, in the present invention, as described above, referring to FIGS. 13 and 14, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to wind the belt 1100 around the drum. Since this operation has been described above, a detailed description thereof is omitted.

Thereafter, conversely, in order to release tension of the wire, it is required to rotate the rotary operating lever 200 clockwise using the stick for live wire work in a state in which a safe distance is secured between the wire and the worker. Here, the drum shaft 310 unwinds the belt 1100 from the drum through counterclockwise rotation thereof, thereby releasing tension of the wire 30.

Meanwhile, in the present invention, as described above, referring to FIGS. 15 and 16, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to unwind the belt 1100 from the drum. Since this operation has been described above, a detailed description thereof is omitted.

That is, in the step of adjusting the dip, as described above, forward or reverse rotation of the drum shaft 310 is performed by adjusting forward or reverse direction of the rotary operating lever 200. Accordingly, the belt 1100 may be wound around or unwound from the drum 300, thereby making it possible not only to adjust tension of the wire 30, but also to adjust the dip of the wire 30.

Thereafter, a step of installing the wire is performed as follows.

In the method of performing indirect live wiring using the automatic direction switching pendulum-type rotary drive ratchet wire grip for indirect live wire work, when dip adjustment is performed, as described above, the wire 30 may be fixed in a state in which dip of the wire 30 is adjusted.

Figure 22A:
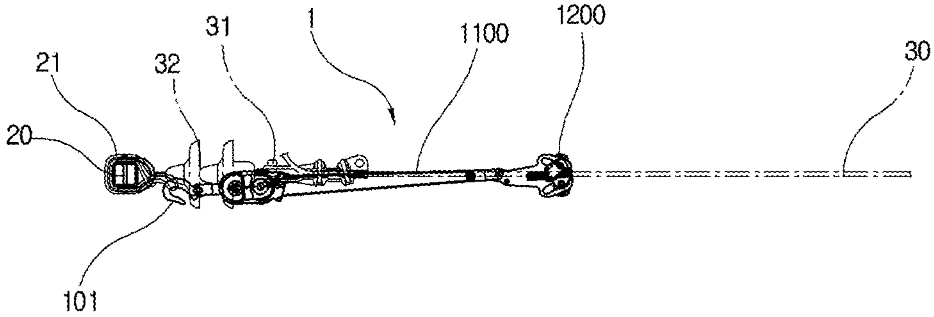
Figure 22B:
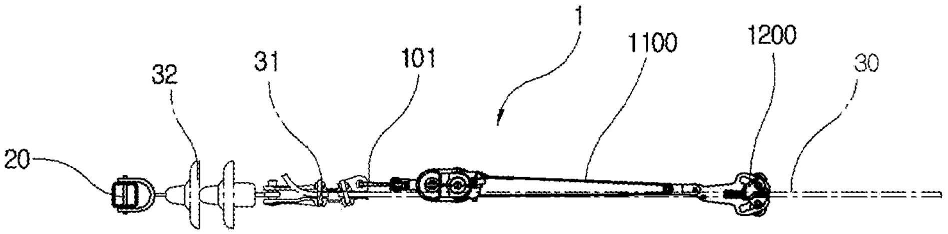

To this end, referring to FIGS. 22A and 22B, the wire 30 is separated from the deadend clamp 31 in a state in which the dip is adjusted. Then, the separated wire 30 is adjusted to an appropriate position at which the dip is adjusted again and is fixed to the deadend clamp 31 in a state in which the dip is adjusted, thereby making it possible to install the wire 30.

Thereafter, a step of removing the wire grip is performed as follows.

In the method of performing indirect live wiring using the automatic direction switching pendulum-type rotary drive ratchet wire grip for indirect live wire work, when dip adjustment is performed, the installed automatic direction switching pendulum-type rotary drive ratchet wire grip for indirect live wire work 1 may be removed.

Figure 23A:
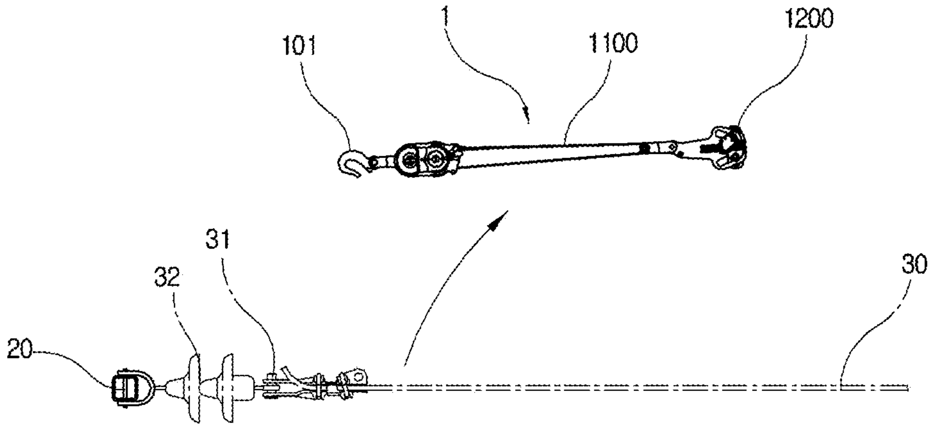
Figure 23B:
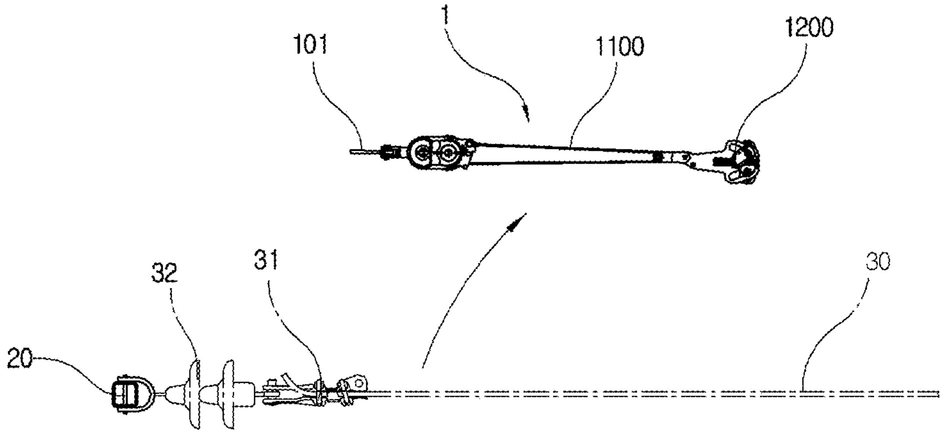

To this end, referring to FIGS. 23A and 23B, the wire grip may be removed by performing, in reverse order, the step of installing the wire grip and the step of fixing the wire. First, the wire clip 1200 is disconnected from the wire 30 in the reverse order of connecting the clip 1200 to the wire 30 using the stick for live wire work S, and the hook 101 is separated from the rope 21 in the reverse order of installing the hook 101 on the rope 21, thereby making it possible to remove, from the wire, the automatic direction switching pendulum-type rotary drive ratchet wire grip for indirect live wire work 1.

As described above, in the method of performing indirect live wiring using the automatic direction switching pendulum-type rotary drive ratchet wire grip for indirect live wire work, it is possible to easily adjust, through the series of steps as described above, the dip of the wire 30 in a state in which a safe distance is secured between the wire 30 and the worker.

Second Example

Referring to FIGS. 24 to 29, a description will be given as to a state of wire installation work in which a wire is installed between electric poles by the method of performing indirect live wiring using the automatic direction switching pendulum-type rotary drive ratchet wire grip for indirect live wire work.

In the wire installation work, the automatic direction switching pendulum-type rotary drive ratchet wire grip 1 is used to remove a wire installed on both poles, to replace an old wire with a new wire, or to newly install a wire on new poles. In this case, it is required to perform a step of spreading and stretching a wire, a step of installing a wire grip, a step of fixing the wire, a step of installing the wire, and a step of removing the wire.

Figure 24:
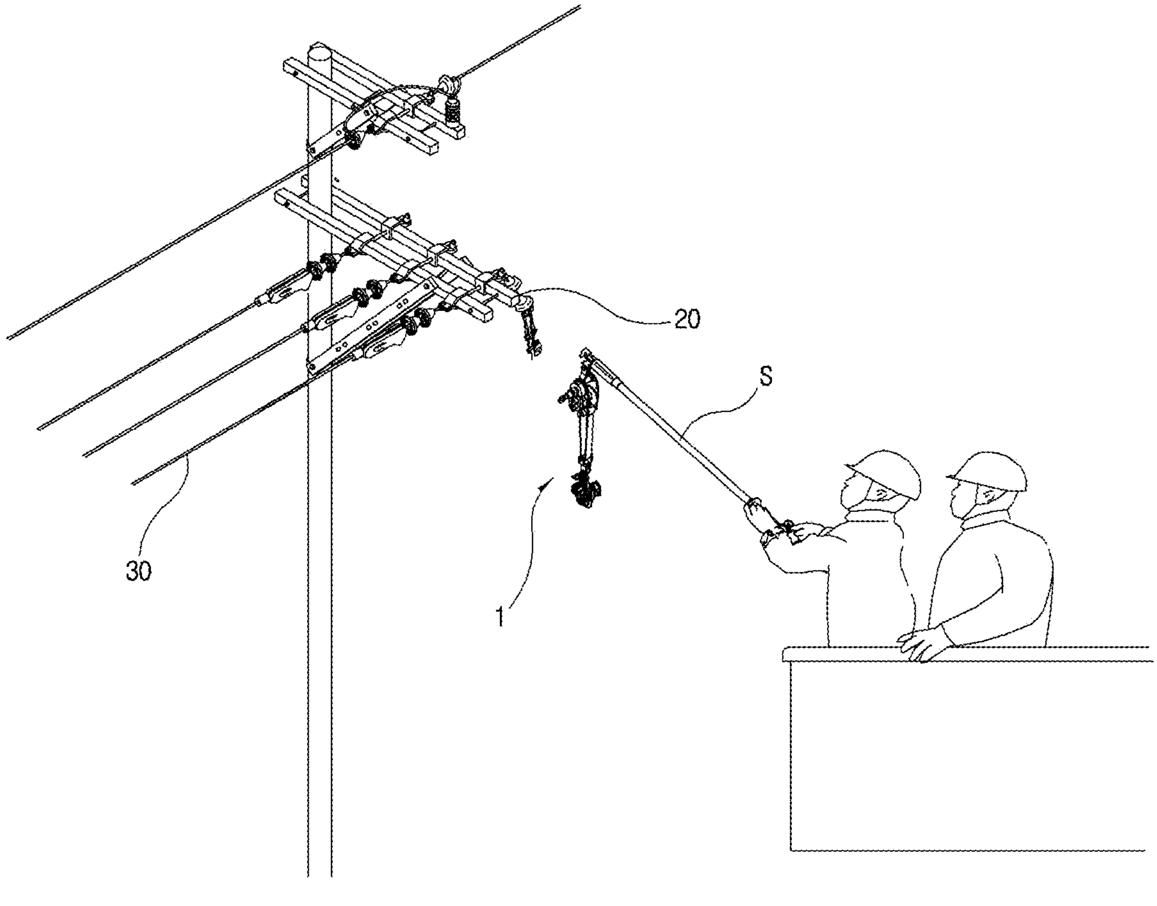
FIGS. 24 to 29 are views each showing a step of pulling the wire to obtain an appropriate dip of the wire and installing the wire on an electric pole in the method of performing indirect live wiring using the automatic direction switching pendulum-type rotary drive ratchet wire grip for indirect live wire work according to the present invention.
Figure 25:
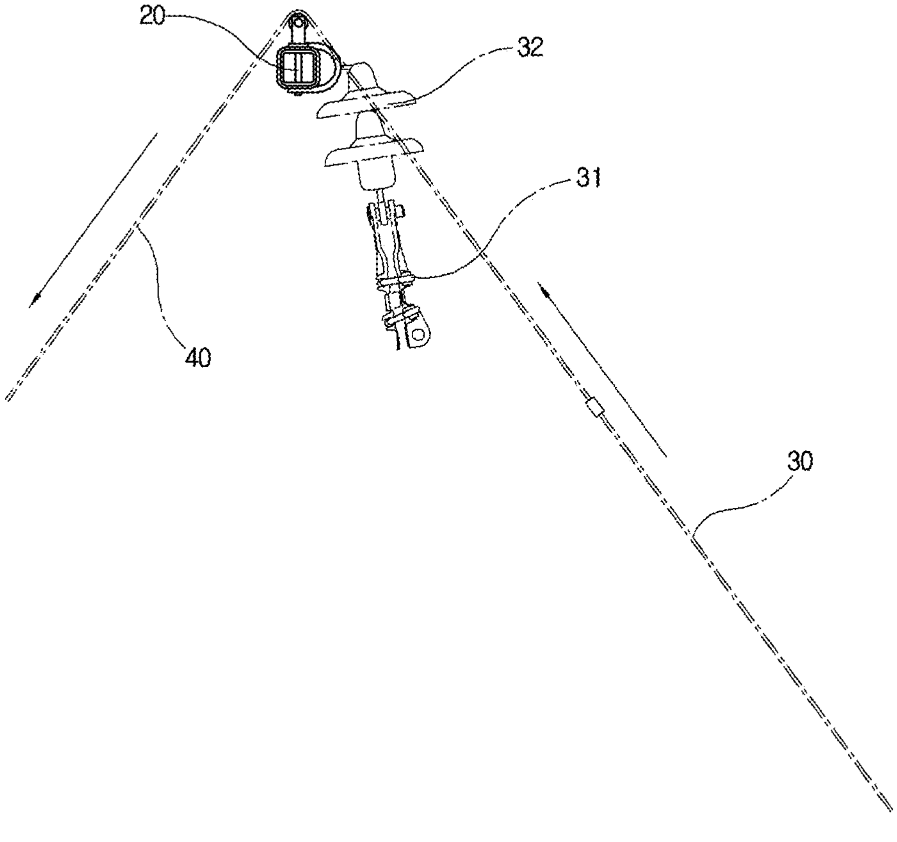

Here, in the method of performing indirect live wiring using the automatic direction switching pendulum-type rotary drive ratchet wire grip for indirect live wire work, referring to FIG. 24, in order to perform a step of pulling a wire to obtain an appropriate dip of the wire, a worker approaches an upper portion of an electric pole while securing a safe distance between the wire and the worker. When approaching the wire, the worker needs to prepare the wire grip 1 and the stick for live wire work S of the present invention.

In this case, a step of spreading and stretching the wire is performed as follows.

According to the present invention, in the method of performing indirect live wiring using the automatic direction switching pendulum-type rotary drive ratchet wire grip for indirect live wire work, when a wire is pulled to obtain an appropriate dip of the wire and then is installed on an electric pole, the wire 30 to be installed on the electric pole may be raised toward the electric pole, that is, an installation position of the electric pole.

At this time, in the present invention, the step of spreading and stretching the wire is not newly implemented and is applicable to a conventional method. For example, referring to FIG. 25, a worker uses a stranded rope 40 to allow the wire to pass through an upper portion of a stranded roller (not shown in the drawing) installed on the arm-shaped support member 20. Thereafter, the wire may be pulled manually or using a winch, thereby making it possible to raise the wire 30 toward the installation position of the electric pole.

Thereafter, a step of installing the wire grip is performed as follows.

According to the present invention, in the method of performing indirect live wiring using the automatic direction switching pendulum-type rotary drive ratchet wire grip for indirect live wire work, when a wire is pulled to obtain an appropriate dip of the wire and then is installed on an electric pole, the automatic direction switching pendulum-type rotary drive ratchet wire grip for indirect live wire work 1 may be installed on the arm-shaped support member 20 of the electric pole. Alternatively, first, the deadend clamp 31 and a suspension insulator 32 are installed on the arm-shaped support member 20, and then the wire grip 1 is installed on the installed deadend clamp 31.

Figure 26:
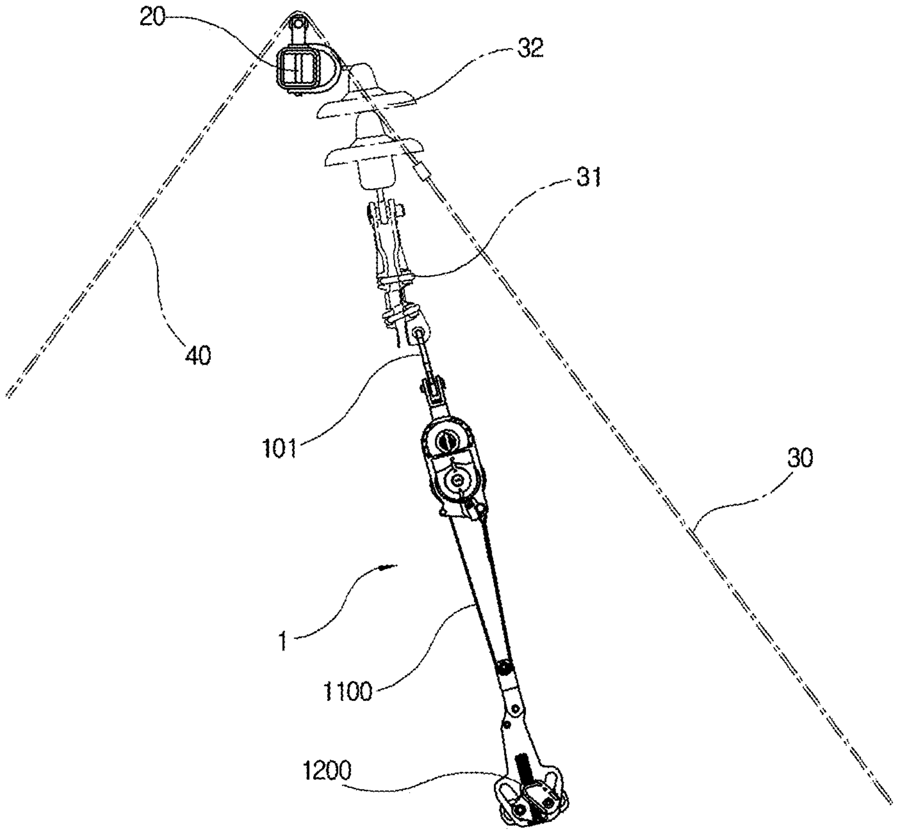

To this end, as shown in FIG. 26, the wire grip 1 may be installed by being hooked on the deadend clamp 31 using the hook 101 provided on the wire grip 1. This hooking work may be performed from a distance using the stick for live line work S.

Thereafter, a step of fixing the wire is performed as follows.

Figure 27:
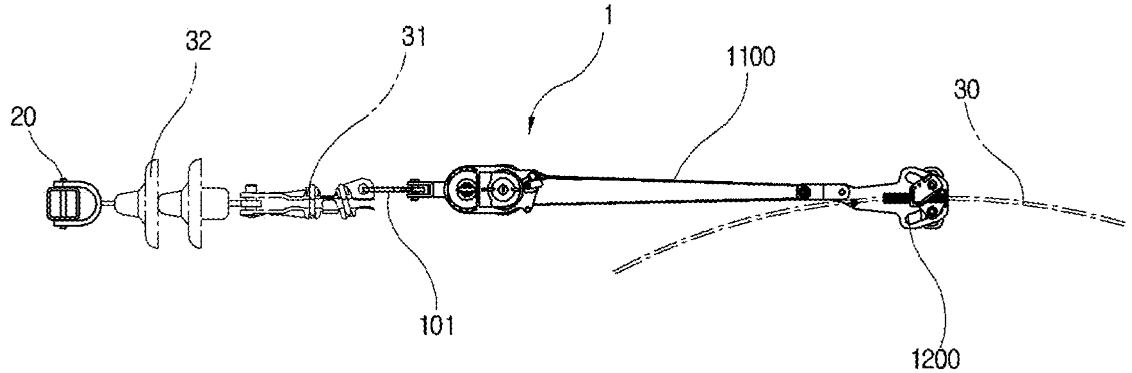

According to the present invention, in the method of performing indirect live wiring using the automatic direction switching pendulum-type rotary drive ratchet wire grip for indirect live wire work, when the wire is pulled, referring to FIG. 27, the automatic direction switching pendulum-type rotary drive ratchet wire grip for indirect live wire work 1 may be fixed to the stretched wire 30 using the wire clip 1200.

Thereafter, a step of installing the wire is performed as follows.

Figure 28:
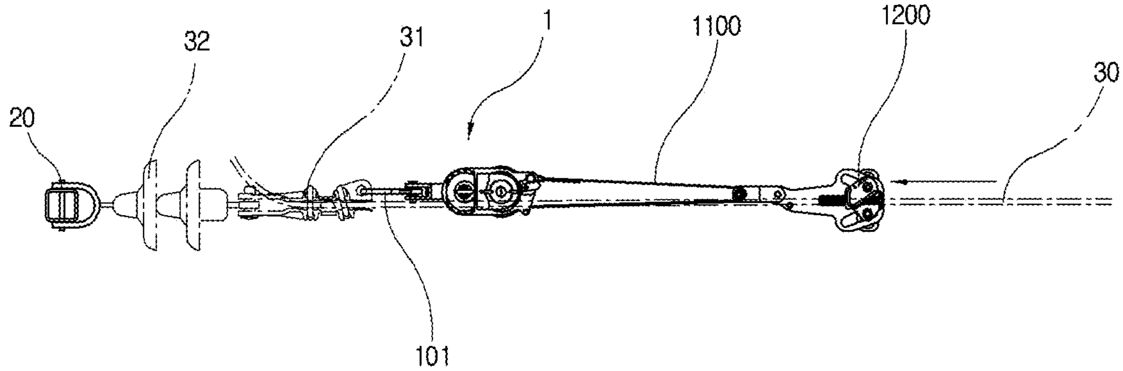

In the method of performing indirect live wiring using the automatic direction switching pendulum-type rotary drive ratchet wire grip for indirect live wire work, when a wire is pulled to obtain an appropriate dip of the wire and then is installed on an electric pole, referring to FIG. 28, the wire 30 corresponding to this work may be connected to the arm-shaped support member 20. Here, this connection work is performed by pulling or releasing the wire 30 so as to adjust tension of the wire 30 through an operation of rotating the rotary operating lever 200 of the wire grip 1 in the forward or reverse direction to cause the pendulum 600 to perform pendulum motion, an operation of rotating the automatic reversing pawl 800, and an operation of rotating the drum shaft 310 connected to the drum shaft operating plate 500 in the forward or reverse direction so as to wind the belt 1100 around the drum 300 or unwind the belt 1100 therefrom.

In this case, in order to adjust tension of the wire 30, it is possible to stop or adjust rotation of the outer ring 410 by attachment/detachment operation of the rotation control lever 440.

Therefore, in order to wind the belt 1100 around the drum 300 and apply tension to the wire, work may be performed in a state in which the rotation control lever 440 is fitted into the stopping groove 413 of the outer ring 410.

Thereafter, the rotary operating lever 200 is rotated counterclockwise using the stick for live wire work in a state in which a safe distance is secured between the wire and the worker. Accordingly, the drum shaft 310 pulls the belt 1100 through the clockwise rotation thereof, thereby applying tension to the wire 30.

Meanwhile, in the present invention, as described above, referring to FIGS. 13 and 14, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to wind the belt 1100 around the drum. Since this operation has been described above, a detailed description thereof is omitted.

Thereafter, conversely, in order to release tension, it is required to rotate the rotary operating lever 200 clockwise using the stick for live wire work in a state in which a safe distance is secured between the wire and the worker. Here, the drum shaft 310 unwinds the belt 1100 from the drum through counterclockwise rotation thereof, thereby releasing tension of the wire 30.

Meanwhile, in the present invention, as described above, referring to FIGS. 15 and 16, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to unwind the belt 1100 from the drum. Since this operation has been described above, a detailed description thereof is omitted.

That is, in the step of installing the wire, as described above, forward or reverse rotation of the drum shaft 310 is performed by adjusting forward or reverse direction of the rotary operating lever 200. Accordingly, the belt 1100 may be wound around the drum or may be unwound therefrom, thereby adjusting tension of the wire 30.

Accordingly, through the step of pulling a wire to obtain an appropriate dip of the wire and installing the wire on an electric pole, it is possible to adjust tension of the wire 30 and to adjust a gap between the wire 30 and the arm-shaped support member 20. Preferably, the end of the wire 30 becomes loose, so that the wire 30 may be easily installed in the deadend clamp 31.

Thereafter, a step of removing the wire grip is performed as follows.

In the method of performing indirect live wiring using the automatic direction switching pendulum-type rotary drive ratchet wire grip for indirect live wire work, when a wire is pulled to obtain an appropriate dip of the wire and then is installed on an electric pole, the installed automatic direction switching pendulum-type rotary drive ratchet wire grip for indirect live wire work 1 may be removed from the wire.

Figure 29:
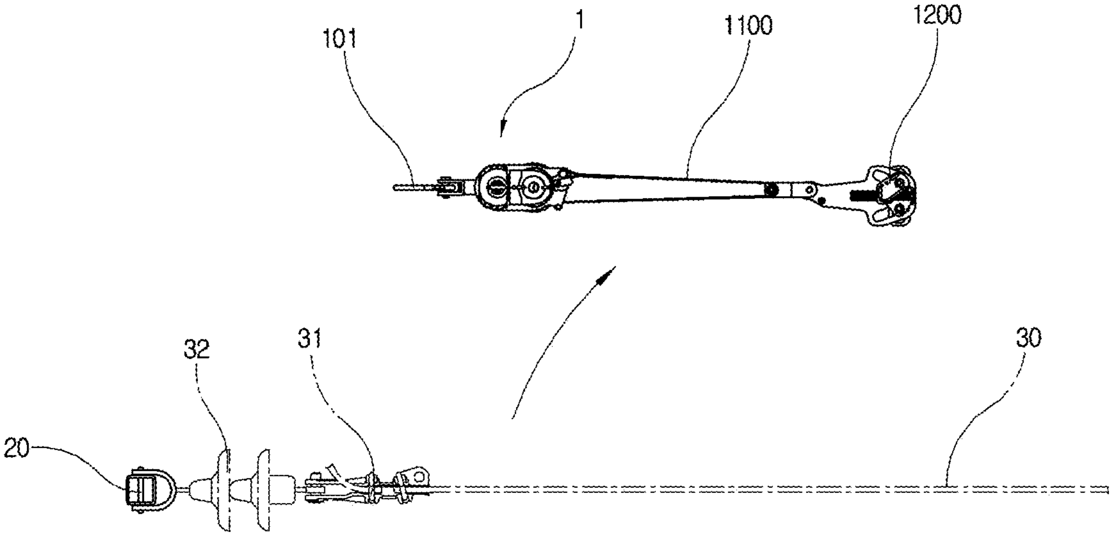

To this end, referring to FIG. 29, the wire grip may be removed from the wire by performing, in the reverse order, the step of installing the wire grip and the step of fixing the wire. First, the wire clip 1200 is disconnected from the wire 30 in the reverse order of connecting the clip 1200 to the wire 30 using the stick for live wire work S, and the hook 101 is separated from the rope 21 in the reverse order of installing the hook 101 on the rope 21, thereby making it possible to remove, from the wire, the automatic direction switching pendulum-type rotary drive ratchet wire grip for indirect live wire work 1.

In the method of performing indirect live wiring using the automatic direction switching pendulum-type rotary drive ratchet wire grip for indirect live wire work, when a wire is pulled to obtain an appropriate dip of the wire and then is installed on an electric pole, it is required to perform each of the steps separately when indirect live wire work is performed on both poles.

As described above, in the method of performing indirect live wiring using the automatic direction switching pendulum-type rotary drive ratchet wire grip for indirect live wire work, it is possible to reliably perform, through the series of steps as described above, the step of pulling a wire to obtain an appropriate dip of the wire and installing the wire on an electric pole in a state in which a safe distance is secured between the wire 30 and the worker.

Third Embodiment

Referring to FIGS. 30 to 36A and 36B, a description will be given as to a state of suspension insulator replacement work in the method of performing indirect live wiring using the automatic direction switching pendulum-type rotary drive ratchet wire grip for indirect live wire work.

Figure 31A:
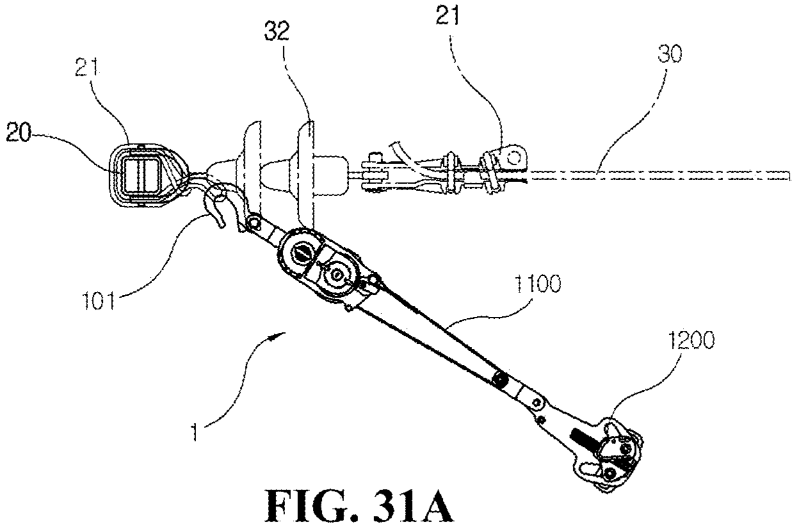
Figure 31B:
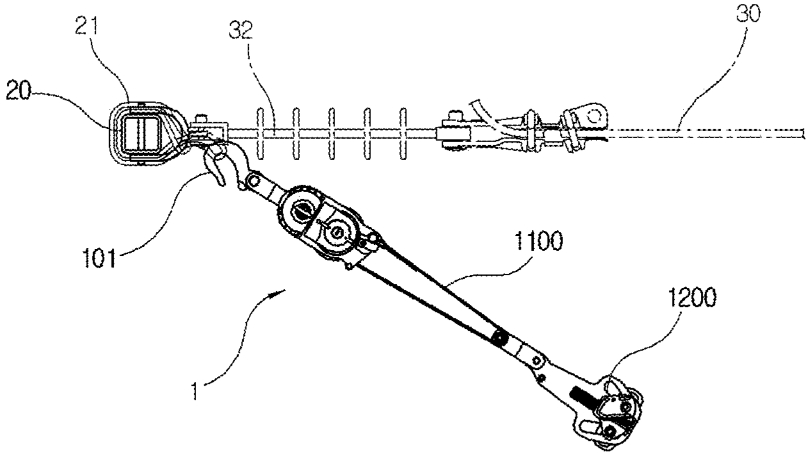

In the suspension insulator replacement work, the automatic direction switching pendulum-type rotary drive ratchet wire grip 1 is used to remove the suspension insulator 32 previously installed on one pole and to replace the suspension insulator 32 with a new suspension insulator 32'. In this case, it is required to performing a step of installing a wire grip, a step of fixing a wire, a step of pulling the wire, a step of performing suspension insulator replacement, a step of unwinding the wire, and a step of removing the wire grip. Here, the suspension insulator 32 to be replaced may be formed by connecting a plurality of suspension insulators to each other, as shown in FIG. 31A, or may be formed as a polymer suspension insulator in which the plural suspension insulators are formed to be integrated with each other, as shown in FIG. 31B.

Figure 30:
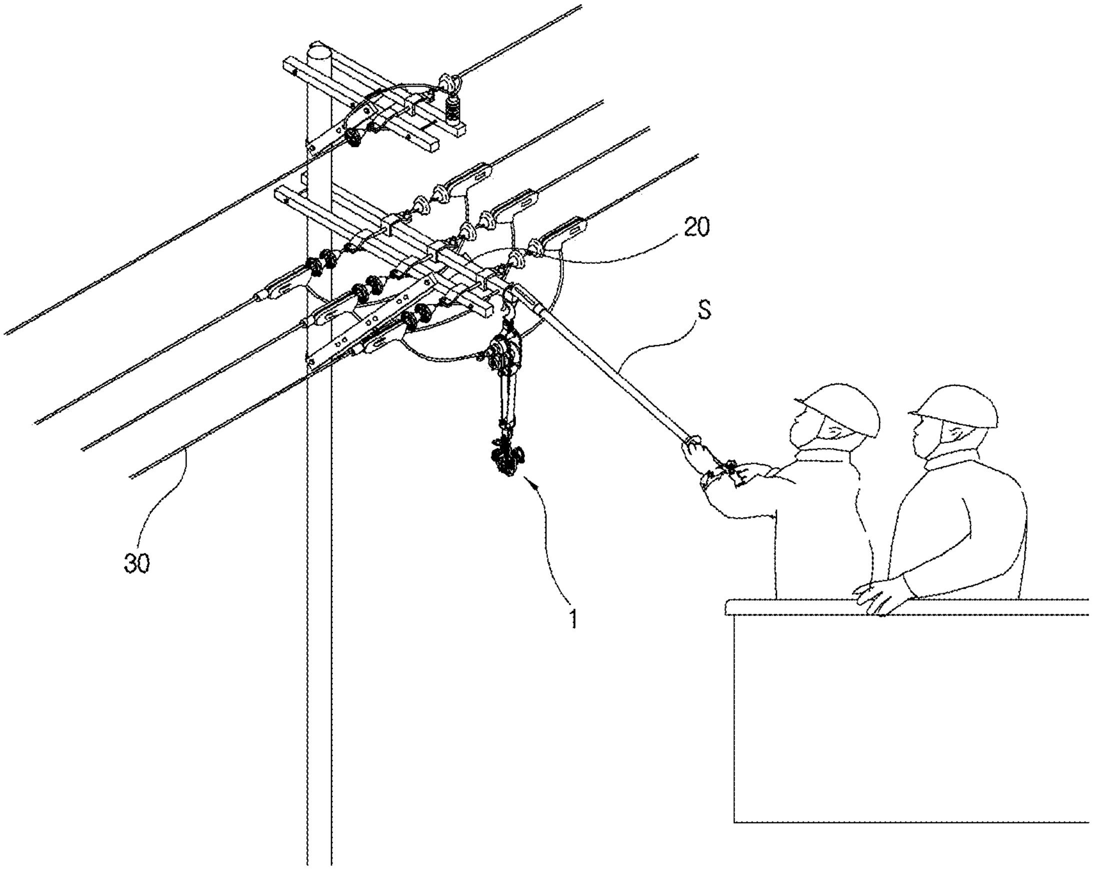

In the method of performing indirect live wiring using the automatic direction switching pendulum-type rotary drive ratchet wire grip for indirect live wire work, in order to perform suspension insulator replacement work, a worker uses a bucket for live wire work and approaches an upper portion of an electric pole while securing a safe distance between the wire and the worker, as shown in FIG. 30. When approaching the electric pole, the worker needs to prepare the wire grip 1 and the stick for live wire work S of the present invention.

In this case, a step of installing the wire grip is performed as follows.

In the method of performing indirect live wiring using the automatic direction switching pendulum-type rotary drive ratchet wire grip for indirect live wire work, when suspension insulator replacement work is performed, the automatic direction switching pendulum-type rotary drive ratchet wire grip for indirect live wire work 1 may be installed on the rope 21 installed on the arm-shaped support member 20 of the electric pole.

To this end, referring to FIGS. 31A and 31B, the wire grip 1 may be installed on the rope 21 by being hooked on the rope 21 using the hook 101 provided on the wire grip 1. This hooking work may be performed from a distance using the stick for live line work S, thereby performing indirect live wire work.

Thereafter, a step of fixing the wire is performed as follows.

Figure 32A:
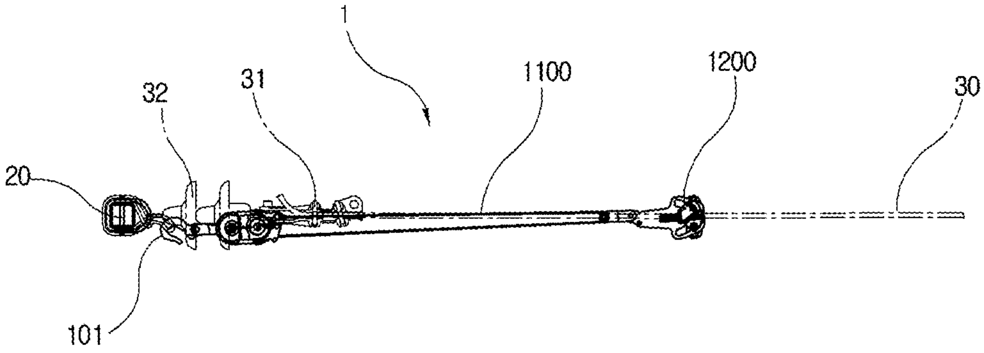
Figure 32B:
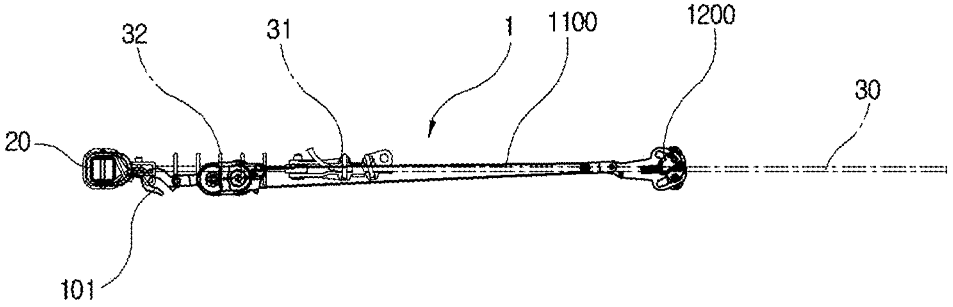

In the method of performing indirect live wiring using the automatic direction switching pendulum-type rotary drive ratchet wire grip for indirect live wire work, when suspension insulator replacement work is performed, referring to FIGS. 32A and 32B, the automatic direction switching pendulum-type rotary drive ratchet wire grip for indirect live wire work 1 may be fixed to the previously installed wire 30 by causing the wire clip 1200 to fixedly hold the previously installed wire 30.

Thereafter, a step of pulling the wire is performed as follows.

Figure 33A:
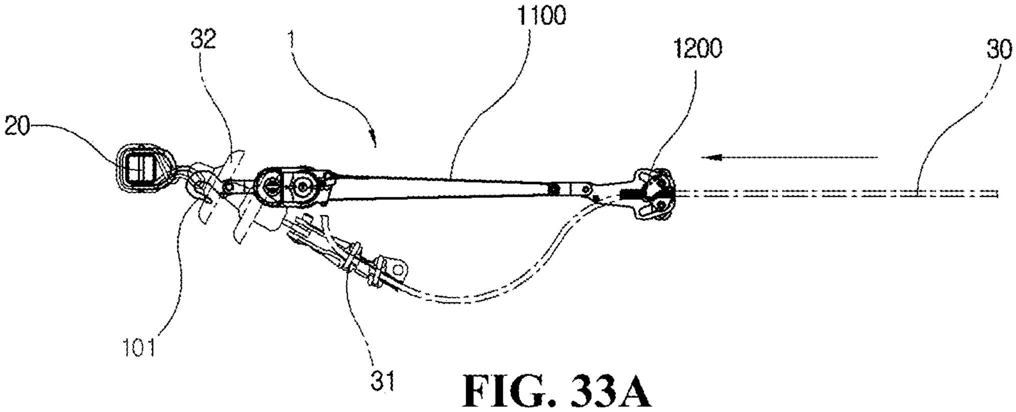
Figure 33B:
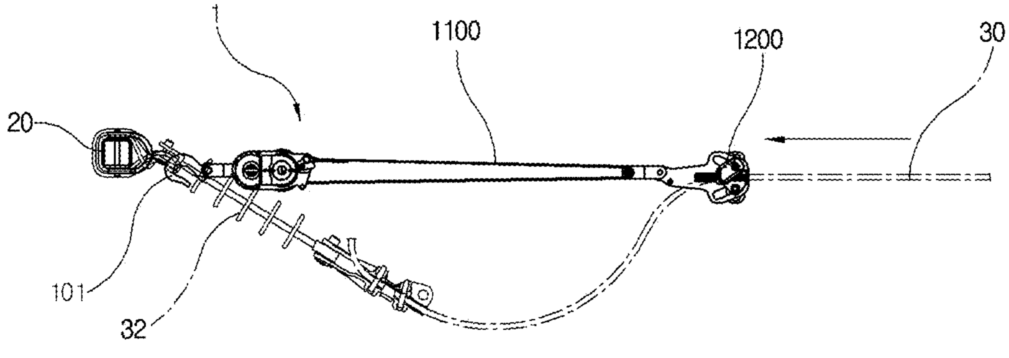
Figure 34A:
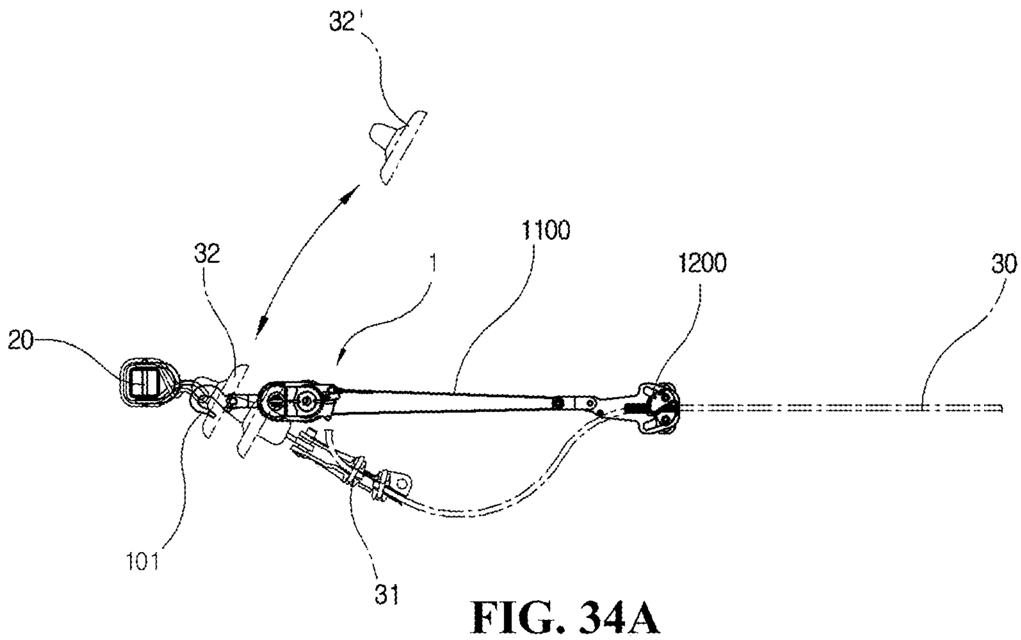
Figure 34B:
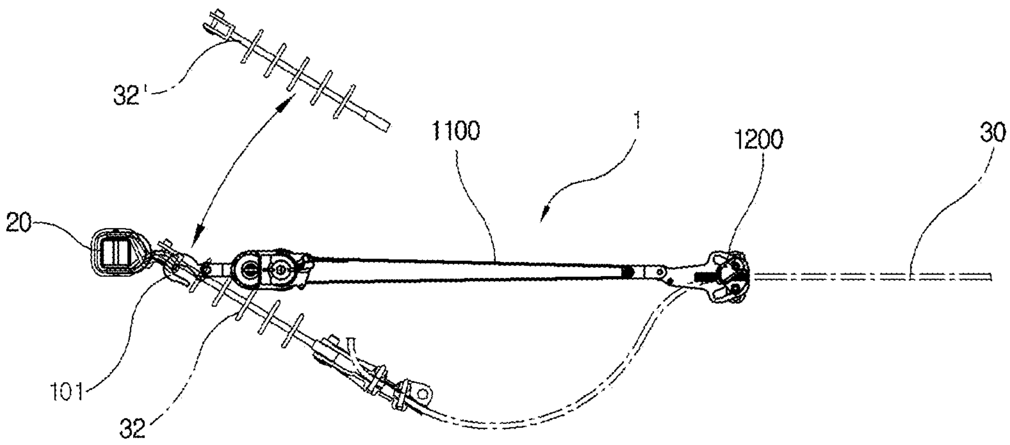

In the method of performing indirect live wiring using the automatic direction switching pendulum-type rotary drive ratchet wire grip for indirect live wire work, when suspension insulator replacement work is performed, referring to FIGS. 33A and 33B, tension of the wire 30 may be adjusted so as to separate the previously installed suspension insulator 32 and install the new suspension insulator 32'.

To this end, the rotary operating lever 200 of the wire grip 1 is rotatably operated in a state in which the rotation control lever 440 is inserted and fitted into the stopping groove 413 of the outer ring 410, thereby causing the pendulum 600 to perform pendulum motion. Then, the wire 30 is pulled to apply tension thereto, in which the tension is appropriately adjusted through a step of winding the belt 1100 around the drum 300 by performing an operation of rotating the automatic reversing pawl 800 and an operation of rotating the drum shaft 310 connected to the drum shaft operating plate 500.

Thereafter, the rotary operating lever 200 is rotated counterclockwise using the stick for live wire work in a state in which a safe distance is secured between the wire and the worker. Accordingly, the drum shaft 310 pulls the belt 1100 through the clockwise rotation thereof, thereby applying tension to the wire 30. At this time, the wire 30 becomes loose at the inner side thereof fixed with the wire clip 1200, that is, a connection portion with the deadend clamp 31.

Meanwhile, in the present invention, as described above, referring to FIGS. 13 and 14, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to wind the belt 1100 around the drum. Since this operation has been described above, a detailed description thereof is omitted.

That is, in the step of pulling the wire, as described above, by adjusting counterclockwise rotation of the rotary operating lever 200, the drum shaft 310 is rotated clockwise and, as such, the belt 1100 is wound around the drum so as to pull the wire 30, thereby applying tension to the wire 30.

Thereafter, a step of performing suspension insulator replacement is performed as follows.

In the method of performing indirect live wiring using the automatic direction switching pendulum-type rotary drive ratchet wire grip for indirect live wire work, when suspension insulator replacement work is performed, the previously installed suspension insulator 32 may be separated from the arm-shaped support member, and the new suspension insulator 32' may be installed thereon.

To this end, first, the wire 30 is separated from the suspension insulator 32. Specifically, the deadend clamp 31 of the wire 30 is separated from the suspension insulator 32, and the suspension insulator 32 is continuously separated from the arm-shaped support member 20.

Meanwhile, in performing separation of the suspension insulator 32 from the arm-shaped support member as described above, when the suspension insulator 32 is formed of a plurality of suspension insulators, only the suspension insulator to be replaced may be separated from the arm-shaped support member. When the when the suspension insulator 32 is formed as a polymer suspension insulator in which the plural suspension insulators are formed to be integrated with each other, the polymer suspension insulator may be separated from the deadend clamp 31 and the arm-shaped support member 20.

Then, the new suspension insulator 32' may be installed. Here, the new suspension insulator 32' may be installed on the arm-shaped support member 20 in the reverse order of separating the suspension insulator 32 from the arm-shaped support member 20.

Thereafter, the separated wire 30 may be connected to the new suspension insulator 32'. Here, the wire 30 may be connected to the new suspension insulator 32' using the deadend clamp 31.

In this case, according to the present invention, the above-described method of separating and installing the deadend clamp 31 and the above-described method of separating and installing the suspension insulator 32 are not limited. These methods may be applied in various ways through a conventional distribution line construction method.

Thereafter, a step of unwinding the wire is performed as follows.

Figure 35A:
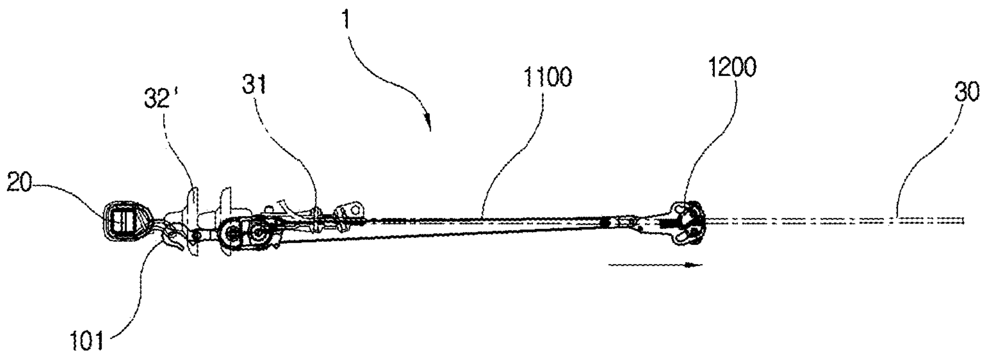
Figure 35B:
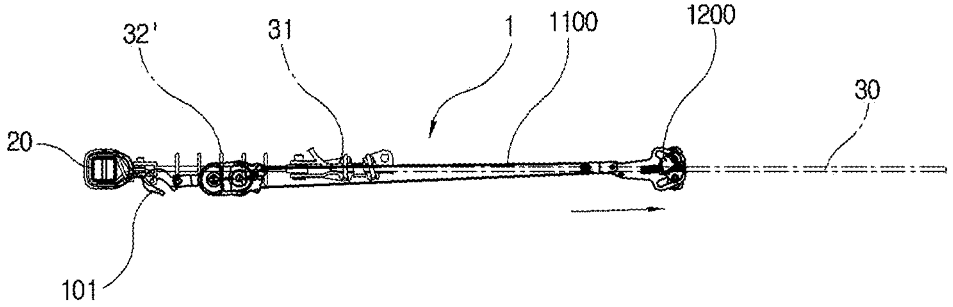

In the method of performing indirect live wiring using the automatic direction switching pendulum-type rotary drive ratchet wire grip for indirect live wire work, when suspension insulator replacement work is performed, referring to FIGS. 35A and 35B, the wire 30 pulled in the step of pulling the wire may be released.

To this end, the rotary operating lever 200 of the wire grip 1 is rotatably operated to cause the pendulum 600 to perform pendulum motion. Then, the wire 30 becomes loose through a step of unwinding the belt 1100 from the drum 300 by performing an operation of rotating the automatic reversing pawl 800 and an operation of rotating the drum shaft 310 connected to the drum shaft operating plate 500, thereby releasing tension of the wire 30.

Thereafter, the rotary operating lever 200 is rotated clockwise using the stick for live wire work in a state in which a safe distance is secured between the wire and the worker. Here, the drum shaft 310 unwinds the belt 1100 from the drum through counterclockwise rotation thereof, thereby releasing tension of the wire 30.

Meanwhile, in the present invention, as described above, referring to FIGS. 15 and 16, regarding the counterclockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to unwind the belt 1100 from the drum. Since this operation has been described above, a detailed description thereof is omitted.

That is, in the step of unwinding the wire, as described above, by adjusting clockwise rotation of the rotary operating lever 200, the drum shaft 310 is rotated counterclockwise and, as such, the belt 1100 is unwound from the drum so as to release tension of the wire 30.

Thereafter, a step of removing the wire grip is performed as follows.

In the method of performing indirect live wiring using the automatic direction switching pendulum-type rotary drive ratchet wire grip for indirect live wire work, when suspension insulator replacement work is performed, the installed automatic direction switching pendulum-type rotary drive ratchet wire grip for indirect live wire work 1 may be removed.

Figure 36A:
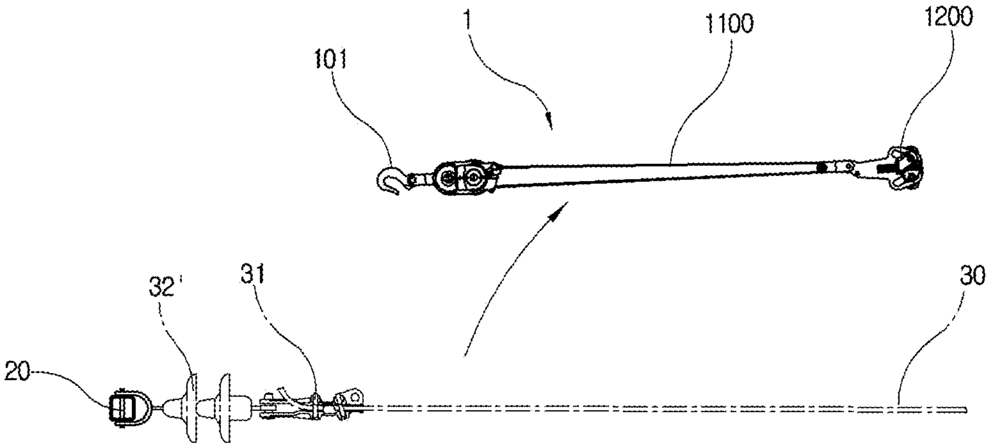
Figure 36B:
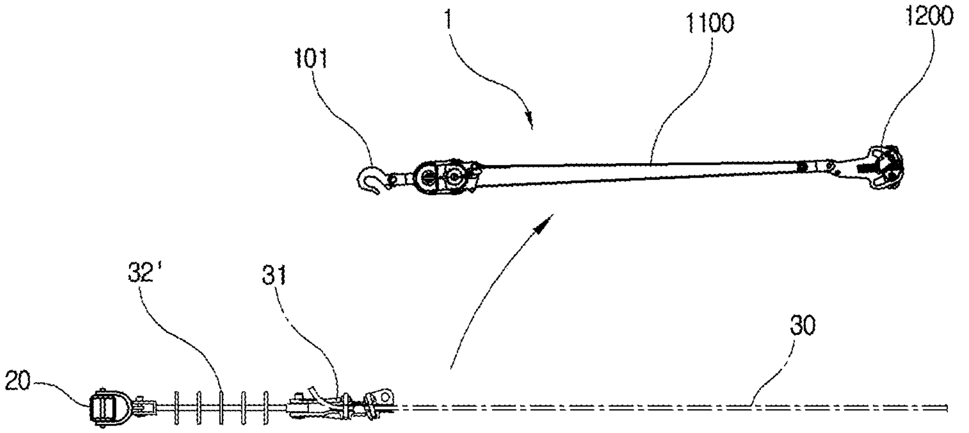
Figure 37:
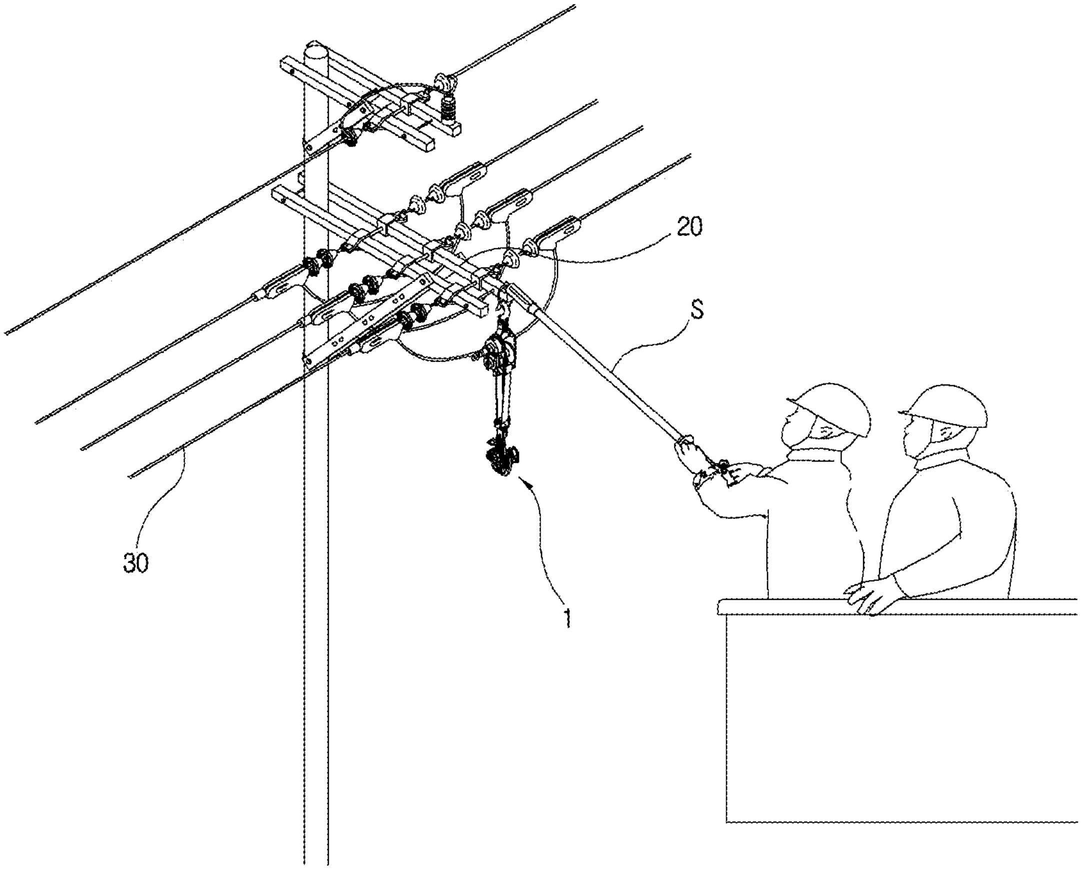
FIGS. 37 to 43 are views each showing a step of removing a previously installed wire in the method of performing indirect live wiring using the automatic direction switching pendulum-type rotary drive ratchet wire grip for indirect live wire work according to the present invention.
Figure 38A:
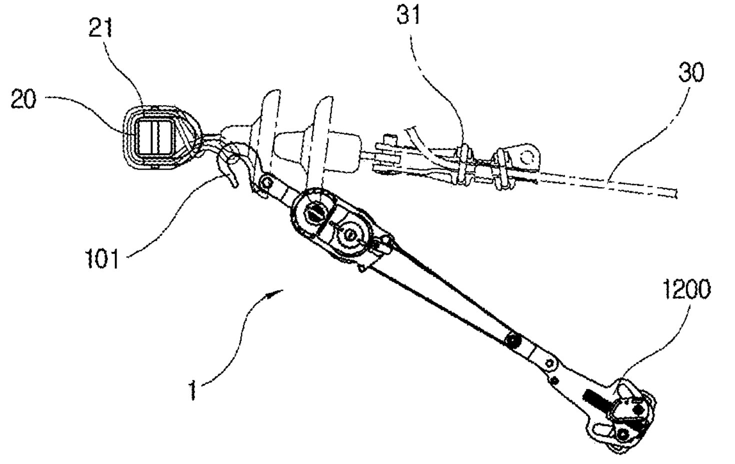
Figure 38B:
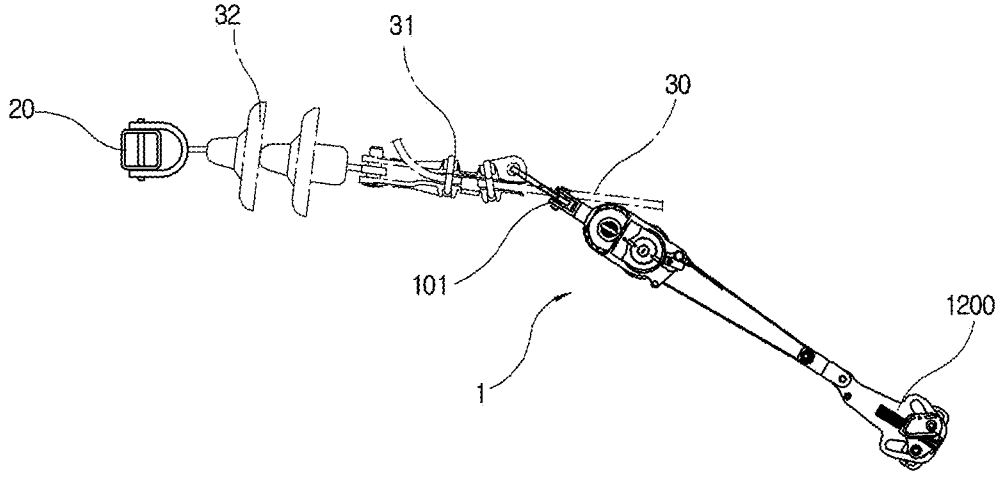

To this end, referring to FIGS. 36A and 36B, the wire grip may be removed by performing, in the reverse order, the step of installing the wire grip and the step of fixing the wire. First, the wire clip 1200 is disconnected from the wire 30 in the reverse order of connecting the clip 1200 to the wire 30 using the stick for live wire work S, and the hook 101 is separated from the rope 21 in the reverse order of installing the hook 101 on the rope 21, thereby making it possible to remove the automatic direction switching pendulum-type rotary drive ratchet wire grip for indirect live wire work 1.

As described above, in the method of performing indirect live wiring using the automatic direction switching pendulum-type rotary drive ratchet wire grip for indirect live wire work, it is possible to reliably perform, through the series of steps as described above, suspension insulator replacement work in a state in which a safe distance is secured between the wire 30 and the worker.

Fourth Embodiment

Referring to FIGS. 37 to 43, a description will be given as to a state of removing a previously installed wire in the method of performing indirect live wiring using the automatic direction switching pendulum-type rotary drive ratchet wire grip for indirect live wire work.

In this case, the wire 30 previously installed on an electric pole is removed using the automatic direction switching pendulum-type rotary drive ratchet wire grip for indirect live wire work 1. Here, it is required to perform a step of installing a wire grip, a step of fixing the wire grip, a step of pulling a wire, a step of separating the wire, and a step of removing the wire. To this end, referring to FIG. 37, a worker uses a bucket for live wire work and approaches the wire 30 of the electric pole while securing a safe distance between the wire 30 and the bucket. When approaching the wire 30, the worker prepares the automatic direction switching pendulum-type rotary drive ratchet wire grip for indirect live wire work 1 and the stick S for live wire work.

Thereafter, a step of installing the wire grip is performed as follows.

In the method of performing indirect live wiring using the automatic direction switching pendulum-type rotary drive ratchet wire grip for indirect live wire work, when the previously installed wire is removed, the automatic direction switching pendulum-type rotary drive ratchet wire grip for indirect live wire work 1 may be installed on the rope 21 installed on the arm-shaped support member 20 of the electric pole or the deadend clamp 31.

To this end, referring to FIGS. 19A and 19B, the wire grip 1 may be installed by being hooked on the rope 21 using the hook 101 provided on the wire grip 1, as shown in FIG. 19A, or may be installed on the rope 21 by being hooked on the deadend clamp 31 using the hook 101 provided on the wire grip 1, as shown in FIG. 19B. This hooking work may be performed from a distance using the stick for live wire work S.

Thereafter, a step of fixing the grip wire is performed as follows.

Figure 39A:
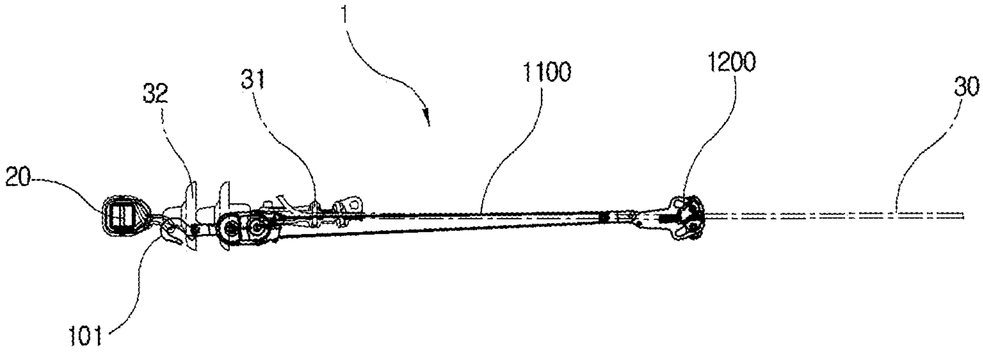
Figure 39B:
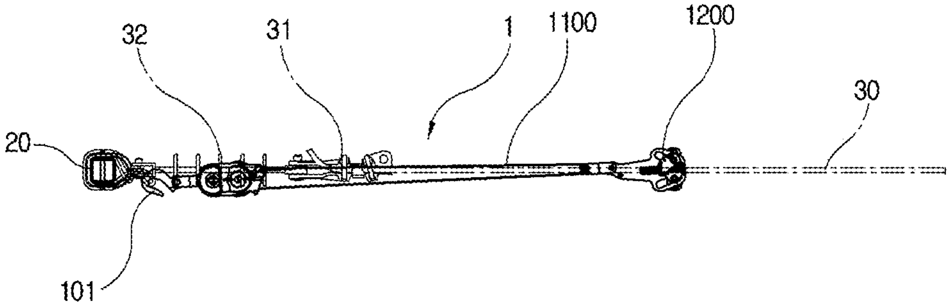

In the method of performing indirect live wiring using the automatic direction switching pendulum-type rotary drive ratchet wire grip for indirect live wire work, when the previously installed wire is removed, referring to FIGS. 39A and 39B, the automatic direction switching pendulum-type rotary drive ratchet wire grip for indirect live wire work 1 may be fixed to the previously installed wire 30 by causing the wire clip 1200 to fixedly hold the previously installed wire 30.

Thereafter, a step of pulling the wire is performed as follows.

Figure 40A:
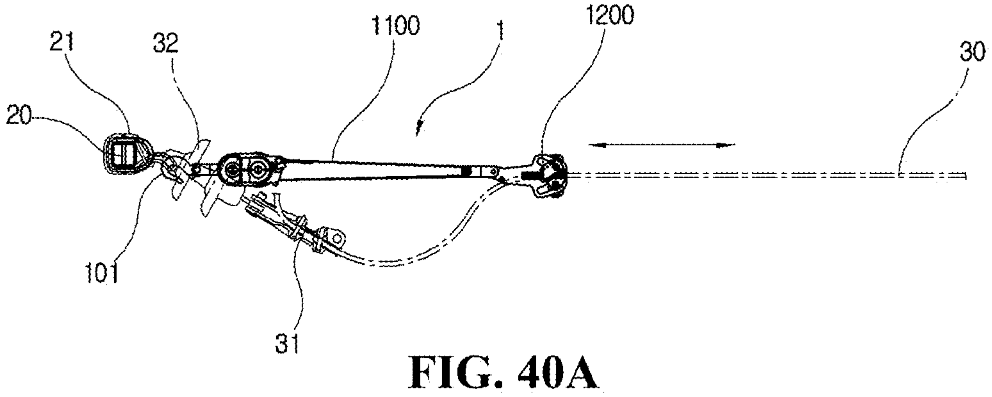
Figure 40B:
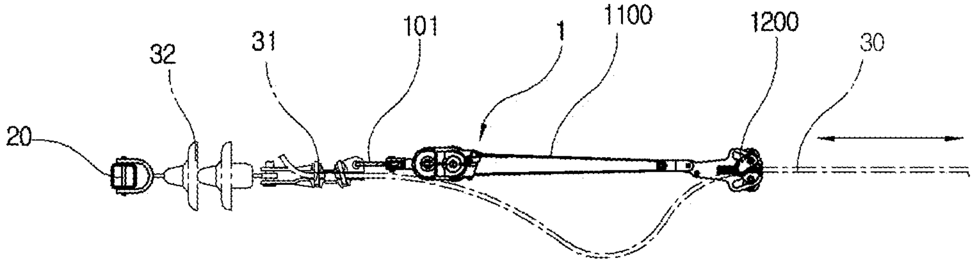

In the method of performing indirect live wiring using the automatic direction switching pendulum-type rotary drive ratchet wire grip for indirect live wire work, when the previously installed wire is removed, referring to FIGS. 40A and 40B, the wire 30 may be pulled to apply tension thereto, the tension being appropriately adjusted by dip adjustment, in order to separate the previously installed wire 30 from the arm-shaped support member 20 or the suspension insulator 32.

To this end, the rotary operating lever 200 of the wire grip 1 is rotatably operated in a state in which the rotation control lever 440 is inserted and fitted into the stopping groove 413 of the outer ring 410, thereby causing the pendulum 600 to perform pendulum motion. Then, the wire 30 is pulled to apply tension thereto, the tension being appropriately adjusted by dip adjustment, through a step of winding the belt 1100 around the drum 300 by performing an operation of rotating the automatic reversing pawl 800 and an operation of rotating the drum shaft 310 connected to the drum shaft operating plate 500.

Thereafter, the rotary operating lever 200 is rotated in the forward direction using the stick for live wire work in a state in which a safe distance is secured between the wire and the worker. Accordingly, the drum shaft 310 pulls the belt 1100 through the clockwise rotation thereof, thereby applying tension to the wire 30. At this time, the wire 30 becomes loose at the inner side thereof fixed with the wire clip 1200, that is, a connection portion with the deadend clamp 31.

Meanwhile, in the present invention, as described above, referring to FIGS. 13 and 14, regarding the clockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to wind the belt 1100 around the drum. Since this operation has been described above, a detailed description thereof is omitted.

That is, in the step of pulling the wire, as described above, by adjusting counterclockwise rotation of the rotary operating lever 200, the drum shaft 310 is rotated clockwise and, as such, the belt 1100 is wound around the drum so as to pull the wire 30, thereby applying tension to the wire 30.

Thereafter, a step of separating the wire is performed as follows.

Figure 41:
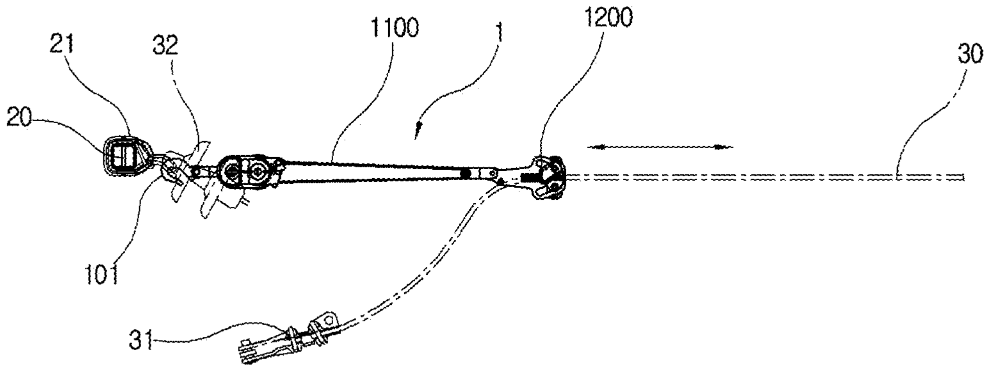

In the method of performing indirect live wiring using the automatic direction switching pendulum-type rotary drive ratchet wire grip for indirect live wire work, when the previously installed wire is removed, referring to FIG. 41, the previously installed wire 30 may be separated from an electric pole.

To this end, first, the wire 30 is separated from the arm-shaped support member 20 or the suspension insulator 32, and the deadend clamp 31 of the wire 30 is separated from the arm-shaped support member 20 or the suspension insulator 32.

Here, a method of separating the deadend clamp 31 in the present invention is not limited. The method may be applied in various ways through a conventional distribution line construction method.

Thereafter, a step of removing the wire is performed as follows.

Figure 42:
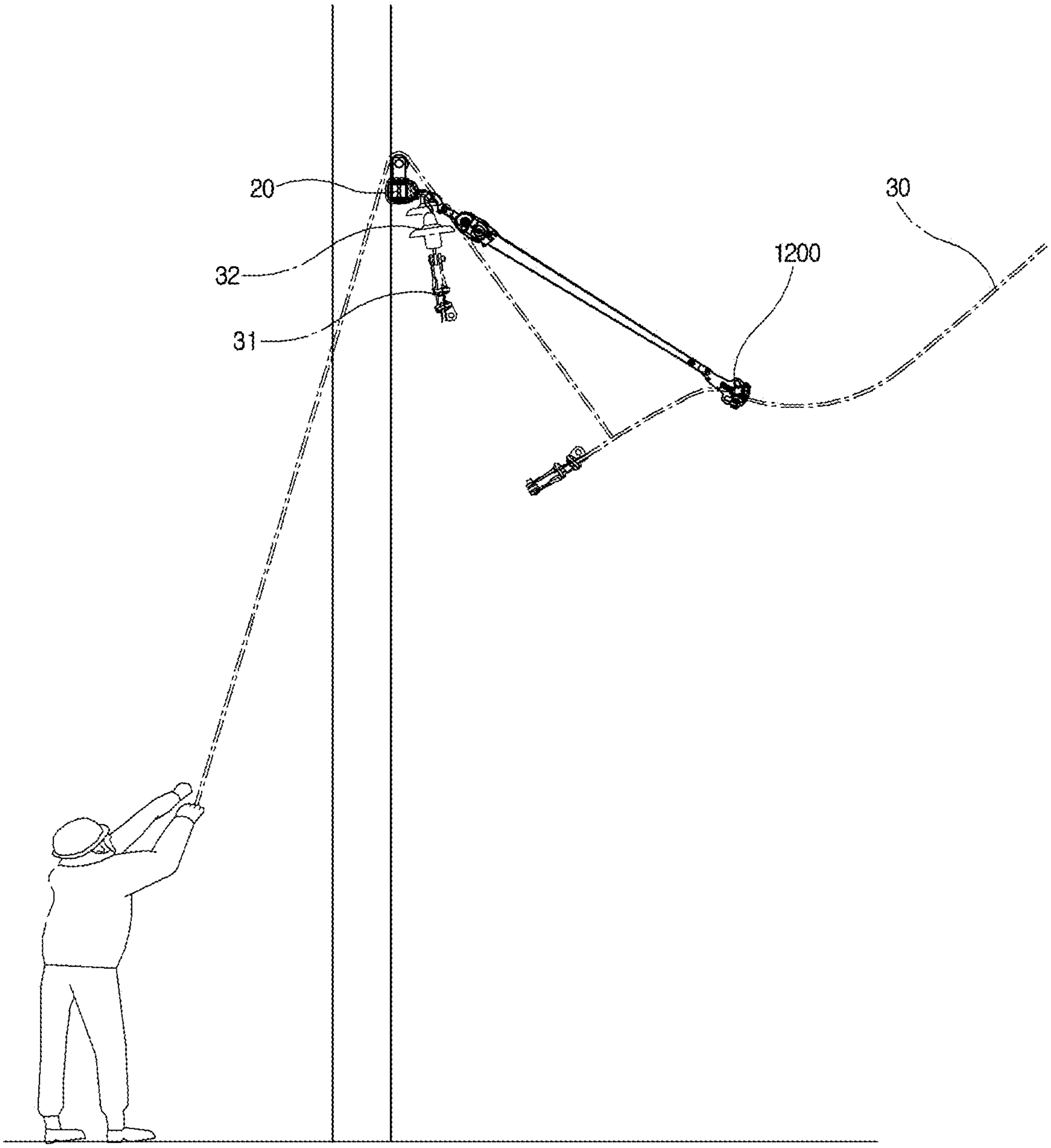

In the method of performing indirect live wiring using the automatic direction switching pendulum-type rotary drive ratchet wire grip for indirect live wire work, when the previously installed wire is removed, referring to FIG. 42, the wire 30 separated in the step of separating the wire is lowered and placed on the ground and is removed from an electric pole.

To this end, the rotary operating lever 200 of the wire grip 1 is rotatably operated to cause the pendulum 600 to perform pendulum motion. Then, the wire 30 becomes loose through a step of unwinding the belt 1100 from the drum 300 by performing an operation of rotating the automatic reversing pawl 800 and an operation of rotating the drum shaft 310 connected to the drum shaft operating plate 500, thereby releasing tension of the wire 30. Thereafter, the wire 30 may be lowered and placed on the ground.

Thereafter, the rotary operating lever 200 is rotated clockwise using the stick for live wire work in a state in which a safe distance is secured between the wire and the worker. Here, the drum shaft 310 unwinds the belt 1100 from the drum through counterclockwise rotation thereof, thereby releasing tension of the wire 30.

Meanwhile, in the present invention, as described above, referring to FIGS. 15 and 16, regarding the counterclockwise rotation adjustment of the drum shaft 310, the drum shaft operating plate 500 is rotated through pendulum motion of the pendulum 600 by operation of the rotary operating lever 200 and interlocking operation of the pawl reversing key 900 and the automatic reversing pawl 800 linked to the pendulum 600, thereby making it possible to unwind the belt 1100 from the drum. Since this operation has been described above, a detailed description thereof is omitted.

That is, in the step of unwinding the wire, as described above, by adjusting clockwise rotation of the rotary operating lever 200, the drum shaft 310 is rotated counterclockwise and, as such, the belt 1100 is unwound from the drum so as to release tension of the wire 30. Then, the wire 30 is slowly lowered and placed on the ground and is removed from an electric pole.

Meanwhile, in the present invention, as described above, in the step of lowering and placing the wire 30 on the ground, the wire 30 may be connected to a rope or the like so as to prevent the wire 30 from scattering to the surroundings. Alternatively, a worker may hold the rope so as to reliably lower and place the wire 30 on the ground or may use a stick for live work so as to grip the wire 30 to be lowered and safely remove the wire 30 from the electric pole.

Thereafter, a step of removing the wire grip is performed as follows.

In the method of performing indirect live wiring using the automatic direction switching pendulum-type rotary drive ratchet wire grip for indirect live wire work, when the previously installed wire is removed, the automatic direction switching pendulum-type rotary drive ratchet wire grip for indirect live wire work 1 may be removed.

Figure 43:
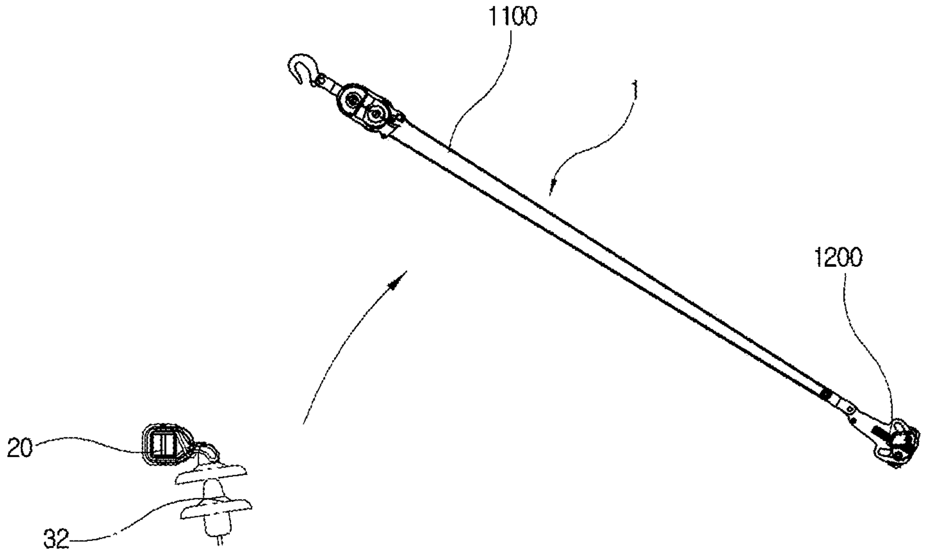

To this end, referring to FIG. 43, the wire grip may be removed by performing, in the reverse order, the step of installing the wire grip and the step of fixing the wire. First, the wire clip 1200 is disconnected from the wire 30 in the reverse order of connecting the clip 1200 to the wire 30 using the stick for live wire work S, and the hook 101 is separated from the rope 21 in the reverse order of installing the hook 101 on the rope 21, thereby making it possible to remove the automatic direction switching pendulum-type rotary drive ratchet wire grip for indirect live wire work 1.

As described above, in the method of performing indirect live wiring using the automatic direction switching pendulum-type rotary drive ratchet wire grip for indirect live wire work, it is possible to reliably remove, through the series of steps as described above, the previously installed wire in a state in which a safe distance is secured between the wire 30 and the worker.

As described above, in the method of performing indirect live wiring using the automatic direction switching pendulum-type rotary drive ratchet wire grip for indirect live wire work, it is possible to reliably secure operational convenience and efficiency by structurally improving the automatic direction switching pendulum-type rotary drive ratchet wire grip for indirect live wire work. Furthermore, it is possible to quickly and conveniently perform indirect live wiring using the automatic direction switching pendulum-type rotary drive ratchet wire grip for indirect live wire work according to the present invention.

INDUSTRIAL APPLICABILITY

According to an automatic direction switching pendulum-type rotary drive ratchet wire grip for indirect live wire work and a method of performing indirect live wiring using the same, it is possible to automatically wind or unwind, without performing a separate rotation direction switching operation, a belt through forward rotation or reverse rotation of a drum shaft by simply conducting the indirect live wire work. Accordingly, while the indirect live wire work is conducted from a long distance from a wire in a state in which power transmission is continuously performed through the wire, a dip of the wire may be appropriately adjusted, the wire may be appropriately pulled to obtain the appropriate dip of the wire and may be fixedly installed on an electric pole, the wire may be removed from the electric pole, and suspension insulator replacement work may be reliably performed, thereby having an effect of stably performing wiring work. Additionally, a backstop ratchet ring is capable of preventing reverse rotation of the drum shaft, preventing backlash occurrence when the drum shaft is driven in the reverse direction, and constantly performing bidirectional rotation in a reliable manner, thereby having an effect of securing stability and durability of a device.

The invention claimed is:

1. An automatic direction switching pendulum-type rotary drive ratchet wire grip for indirect live wire work, the automatic direction switching pendulum-type rotary drive ratchet wire grip comprising:

a body having a hook formed on one side thereof and a belt fixing pin formed on the other side thereof, wherein the other side is open, and the one side has a lever installation part formed on a front side thereof;

a rotary operating lever comprising a rotary operating shaft, a cam, a rotary operating mechanism, and a buffer key, wherein the rotary operating shaft is axially installed in the lever installation part and has a rotating ring, wherein the cam is disposed at a tip portion of the rotary operating shaft and is formed at a location eccentric from a central portion of the tip portion, wherein the rotary operating mechanism is rotatably coupled to the rotary operating shaft at a rear side of the cam, has a movable elongated hole formed in a circumferential direction thereof, and has a locking protrusion formed to protrude from a circumference thereof, and wherein the buffer key connects the rotary operating shaft to the rotary operating mechanism;

a drum having a drum shaft formed to penetrate a front side and a rear side of the body and axially installed in the body, wherein the drum shaft protrudes forwards from the body;

a clutch disposed on the front side of the body and coupled to a circumference of the drum shaft, wherein the clutch prevents reverse rotation of an inner ring and conducts forward or reverse rotation of the drum shaft through simultaneous reverse rotation of the inner ring and an outer ring;

a drum shaft operating plate disposed on a front side of the clutch and coupled to the circumference of the drum shaft, wherein the drum shaft operating plate has saw teeth formed on a circumference of a middle portion thereof;

a pendulum coupled to a rear side of the drum shaft operating plate and formed to protrude toward one side thereof so as to have a horizontal elongated hole configured to accommodate the cam therein, wherein the pendulum performs reciprocating pendulum motion relative to the drum shaft by operation of the cam and has an automatic reversing pawl mounting groove formed in a front surface thereof and disposed between the rotary operating shaft and the drum shaft operating plate;

a drum shaft support plate formed to penetrate a front circumference of the drum shaft operating plate and coupled to the pendulum, wherein the drum shaft support plate is formed to protrude toward one side thereof;

an automatic reversing pawl having a pawl shaft coupled to the automatic reversing pawl mounting groove, wherein the automatic reversing pawl interferes with the drum shaft operating plate and performs reciprocating motion thereof so as to provide forward or reverse rotational force of the drum shaft operating plate;

a pawl reversing key coupled to the pawl shaft with the automatic reversing pawl and formed to protrude from the drum shaft support plate toward one side thereof, wherein the pawl reversing key interferes with the locking protrusion during rotation of the rotary operating mechanism so as to provide reciprocating rotational force of the automatic reversing pawl, and wherein the pawl reversing key has first and second reversing key spring balls and installed thereon so as to constantly maintain horizontality thereof, wherein the first and second reversing key spring balls and are formed to be symmetrical relative to the pawl shaft;

a drum shaft rotary lever disposed on a front side of the drum shaft operating plate and coupled to the drum shaft and the drum shaft operating plate;

a belt having one side fixedly wound around the drum inside the body, the belt having the other side fixed to the belt fixing pin; and a wire clip (1200) formed to allow the belt (1100) to pass therethrough and configured to grip a wire.

2. The automatic direction switching pendulum-type rotary drive ratchet wire grip according to claim 1, wherein:

the buffer key has one side fixed to the rotary operating shaft and the other side located in the movable elongated hole of the rotary operating mechanism, the buffer key is configured to perform, when rotating the rotary operating shaft in a forward or reverse direction, idle rotation for a predetermined period of time within the movable elongated hole, and the buffer key is configured to rotate, when caught at one end of the movable elongated hole, the rotary operating mechanism.

3. The automatic direction switching pendulum-type rotary drive ratchet wire grip according to claim 1, wherein:

the clutch is formed as a backstop ratchet ring, the backstop ratchet ring comprises:

an outer ring having an inner ring mounting hole formed to penetrate a central portion thereof, wherein the inner ring mounting hole has outer ring saw teeth formed on an inner peripheral surface thereof, wherein the outer ring saw teeth have straight portions and inclined portions continuously formed in a circumferential direction, wherein the outer ring has stopping grooves formed on an outer circumference thereof and disposed at regular intervals;

a circular ring-shaped inner ring having a drum shaft mounting hole formed to penetrate a central portion thereof and configured to allow the drum shaft to be coupled thereto, wherein the inner ring is mounted in the inner ring mounting hole of the outer ring and has a plurality of bundle pawl mounting grooves formed on a circumference thereof and disposed at regular intervals;

a multi-angle bundle pawl unit having springs each installed in a corresponding one of the bundle pawl mounting grooves, wherein the multi-angle bundle pawl unit is operated to protrude outwards by spring elasticity of the spring and is engaged with the outer ring saw teeth of the outer ring so as to provide rotational force in one direction; and a rotation control lever formed on the body and configured to interfere with a corresponding one of the stopping grooves of the outer ring or to be released therefrom so as to control rotation and stoppage of the outer ring, and the multi-angle bundle pawl unit is formed of plural groups of first, second, and third multi-angle bundle pawls and wherein the respective first, second, and third multi-angle bundle pawls and are configured to be engaged with the outer ring saw teeth of the outer ring at sequential positions respectively having different angles.

4. The automatic direction switching pendulum-type rotary drive ratchet wire grip according to claim 3, wherein:

the outer ring saw teeth of the outer ring are formed to protrude inwards so as to have front and rear stepped portions and respectively formed at a front side of the outer ring saw teeth and a rear side thereof, the inner ring has a seating protrusion and a finishing plate support portion, wherein the seating protrusion is formed on a rear circumference of the inner ring and is seated on the rear stepped portion of the outer ring, and wherein the finishing plate support portion is formed to protrude from a front side of the inner ring so as to extend from the drum shaft mounting hole, and the finishing plate support portion formed on the front side of the inner ring penetrates a finishing plate having a through hole formed therein, wherein the finishing plate is seated on and coupled to the front stepped portion so as to constrain the outer ring.

5. The automatic direction switching pendulum-type rotary drive ratchet wire grip according to claim 3, wherein:

the first, second, and third multi-angle bundle pawls and are configured to form three groups, wherein each of the three groups is formed of a corresponding one of first, second, and third engagement tools and wherein each of the radially arranged four first engagement tools, four second engagement tools, and four third engagement tools forms one group, each of the first, second, and third engagement tools and has a corresponding one of the springs respectively installed in the bundle pawl mounting grooves so as to have protruding force, wherein the first, second, and third engagement tools and are positioned to intersect each other, and the first, second, and third engagement tools and have engagement tool saw teeth and respectively formed at tip portions thereof, wherein each of the engagement tool saw teeth and has straight portions and inclined portions formed to be engaged with the outer ring saw teeth of the outer ring, and when the inner ring is rotated in one direction, the engagement tool saw teeth and of the first, second, and third multi-angle bundle pawls and move over the inclined portions of the outer ring saw teeth, thereby permitting idling rotation of the inner ring, and when the inner ring is rotated in the other direction, the engagement tool saw teeth and of the first, second, and third multi-angle bundle pawls and are sequentially engaged with the outer ring saw teeth, thereby preventing the reverse rotation of the inner ring.

6. The automatic direction switching pendulum-type rotary drive ratchet wire grip according to claim 1, wherein:

the automatic reversing pawl has a pair of first and second locking protrusions and formed on one side thereof and configured to be selectively engaged with the saw teeth of the drum shaft operating plate, the automatic reversing pawl has first locking grooves and second locking grooves and provided around a circumference thereof and formed to be symmetrical with each other, the automatic reversing pawl has a tapered reversing key mounting groove provided at a central portion thereof and formed to extend from the drum shaft operating plate to the rotary operating shaft 210, wherein the reversing key mounting groove is configured to allow the pawl reversing key to be coupled to the pawl shaft with the automatic reversing pawl, the pendulum has first and second reversing pawl spring balls and elastically installed therein and configured to control a reciprocating rotation direction of the automatic reversing pawl, and the first reversing pawl spring ball is configured to be caught in any one of the first locking grooves and so as to intersect the any one of the first locking grooves and the second reversing pawl spring ball is configured to be caught in any one of the second locking grooves and so as to intersect the any one of the second locking grooves and.

7. A method of performing indirect live wiring using an automatic direction switching pendulum-type rotary drive ratchet wire grip for indirect live wire work, wherein the automatic direction switching pendulum-type rotary drive ratchet wire grip according to claim 1 is used to adjust a dip of a previously installed wire, the method comprising the steps of:

installing the wire grip using a hook of the automatic direction switching pendulum-type rotary drive ratchet wire grip for indirect live wire work, wherein the hook is hooked on an installation member including a rope installed on an arm-shaped support member or a deadend clamp;

fixing the wire by fixedly holding the previously installed wire using a wire clip of the automatic direction switching pendulum-type rotary drive ratchet wire grip for indirect live wire work;

adjusting the dip by winding a belt around a drum or unwinding the belt therefrom so as to adjust tension of the wire, wherein the belt is wound around or unwound from the drum through an operation of rotating a rotary operating lever in a forward or reverse direction to cause a pendulum to perform pendulum motion, an operation of rotating an automatic reversing pawl, and an operation of rotating a drum shaft connected to a drum shaft operating plate in the forward or reverse direction;

fixedly installing the wire having the adjusted dip, wherein the dip of the wire is adjusted by separating the wire from the deadend clamp and reinstalling the deadend clamp at a location allowing the wire to obtain the adjusted dip; and separating and removing, from the wire having the adjusted dip and the installation member, the automatic direction switching pendulum-type rotary drive ratchet wire grip for indirect live wire work.

8. The method according to claim 7, wherein, in the step of adjusting the dip, stoppage or rotation of an outer ring is controlled by attachment/detachment operation of a rotation control lever, the rotary operating lever is rotated counterclockwise in a state of causing the rotation control lever to be fitted into a stopping groove of the outer ring, thereby rotating an inner ring clockwise and winding the belt around the drum, the rotary operating lever is rotated clockwise in a state of causing the rotation control lever to be separated from the stopping groove of the outer ring, thereby rotating the inner ring and the outer ring counterclockwise and unwinding the belt from the drum, and the dip is adjusted by controlling the tension of the wire, wherein the tension is adjusted by rotating, in a state of securing a safe distance from the wire, the rotary operating lever in the forward or reverse direction using a stick for live wire work and rotating the drum so as to pull or release the wire.

9. A method of performing indirect live wiring using an automatic direction switching pendulum-type rotary drive ratchet wire grip for indirect live wire work, wherein the automatic direction switching pendulum-type rotary drive ratchet wire grip according to claim 1 is used to pull a wire installed on opposite electric poles so as to adjust a dip of the wire and to install the wire having the adjusted dip on the opposite electric poles, the method comprising the steps of:

stretching the wire using the electric poles each allowing the wire to be installed thereon;

installing the wire grip using a hook of the automatic direction switching pendulum-type rotary drive ratchet wire grip for indirect live wire work, wherein the hook is hooked on an installation member including a rope installed on an arm-shaped support member or a deadend clamp;

fixing the wire by fixedly holding the stretched wire using a wire clip of the automatic direction switching pendulum-type rotary drive ratchet wire grip for indirect live wire work;

installing the wire in the deadend clamp while adjusting tension of the wire by winding a belt around a drum or unwinding the belt therefrom, wherein the belt is wound around or unwound from the drum through an operation of rotating a rotary operating lever in a forward or reverse direction to cause a pendulum to perform pendulum motion, an operation of rotating an automatic reversing pawl, and an operation of rotating a drum shaft connected to a drum shaft operating plate in the forward or reverse direction; and separating and removing, from the installed wire and the installation member, the automatic direction switching pendulum-type rotary drive ratchet wire grip for indirect live wire work.

10. The method according to claim 9, wherein, in the step of installing the wire, stoppage or rotation of an outer ring is controlled by attachment/detachment operation of a rotation control lever, the rotary operating lever is rotated counterclockwise using a stick for live wire work in a state of causing the rotation control lever to be fitted into a stopping groove of the outer ring and securing a safe distance from the wire, thereby rotating an inner ring clockwise and winding the belt around the drum, the rotary operating lever is rotated clockwise, thereby rotating the inner ring counterclockwise and unwinding the belt from the drum, and the dip is adjusted by controlling the tension of the wire, and the wire is fixed to the deadend clamp, wherein the tension is adjusted by rotating, in the state of securing the safe distance from the wire, the rotary operating lever in the forward or reverse direction using the stick for live wire work and rotating the drum so as to pull or release the wire.

11. A method of performing indirect live wiring using an automatic direction switching pendulum-type rotary drive ratchet wire grip for indirect live wire work, wherein the automatic direction switching pendulum-type rotary drive ratchet wire grip according to claim 1 is used to replace a previously installed suspension insulator, the method comprising the steps of:

installing the wire grip using a hook of the automatic direction switching pendulum-type rotary drive ratchet wire grip for indirect live wire work, wherein the hook is hooked on an installation member including a rope installed on an arm-shaped support member;

fixing a wire by fixedly holding the previously installed wire using a wire clip of the automatic direction switching pendulum-type rotary drive ratchet wire grip for indirect live wire work;

pulling the wire to put the suspension insulator in a tension-free state by winding a belt around a drum so as to pull the wire and apply tension to the wire, wherein the belt is wound around the drum through an operation of rotating a rotary operating lever to cause a pendulum to perform pendulum motion, an operation of rotating an automatic reversing pawl, and an operation of rotating a drum shaft connected to a drum shaft operating plate;

replacing the suspension insulator by separating, in a state of pulling the wire, the suspension insulator and a deadend clamp of the wire, removing the suspension insulator and installing a new suspension insulator, re-installing the separated deadend clamp on the wire, and fixing the pulled wire to the new suspension insulator;

releasing the wire to release a pulled state of the wire and the tension of the wire by unwinding the belt from the drum, wherein the belt is unwound from the drum through an operation of rotating the rotary operating lever in a reverse direction to cause the pendulum to perform the pendulum motion, an operation of rotating the automatic reversing pawl, and an operation of rotating the drum shaft connected to the drum shaft operating plate; and separating and removing, from the wire fixed to the newly replaced suspension insulator and the installation member, the automatic direction switching pendulum-type rotary drive ratchet wire grip for indirect live wire work.

12. The method according to claim 11, wherein, in the step of pulling the wire, stoppage of an outer ring is controlled by attachment/detachment operation of a rotation control lever, the rotary operating lever is rotated counterclockwise using a stick for live wire work in a state of causing the rotation control lever to be fitted into a stopping groove of the outer ring and securing a safe distance from the wire, thereby rotating an inner ring clockwise and winding the belt around the drum, and the rotary operating lever is rotated using the stick for live wire work in the state of securing the safe distance from the wire so as to rotate the drum shaft and wind the belt around the drum, thereby pulling the wire and applying the tension to the wire.

13. The method according to claim 11, wherein, in the step of releasing the wire, a rotation control lever is fixedly fitted into a stopping groove of an outer ring, and the rotary operating lever is rotated clockwise using a stick for live wire work in a state of securing a safe distance from the wire so as to rotate the drum shaft and unwind the belt from the drum, thereby releasing the tension of the wire.

14. A method of performing indirect live wiring using an automatic direction switching pendulum-type rotary drive ratchet wire grip for indirect live wire work, wherein the automatic direction switching pendulum-type rotary drive ratchet wire grip according to claim 1 is used to remove a previously installed wire, the method comprising the steps of:

installing the wire grip using a hook of the automatic direction switching pendulum-type rotary drive ratchet wire grip for indirect live wire work, wherein the hook is hooked on an installation member including a rope installed on an arm-shaped support member or a dead-end clamp;

fixing the wire by fixedly holding the previously installed wire using a wire clip of the automatic direction switching pendulum-type rotary drive ratchet wire grip for indirect live wire work;

pulling the wire by winding a belt around a drum so as to pull the wire and apply tension to the wire, wherein the belt is wound around the drum through an operation of rotating a rotary operating lever to cause a pendulum to perform pendulum motion, an operation of rotating an automatic reversing pawl, and an operation of rotating a drum shaft connected to a drum shaft operating plate;

separating the wire in a pulled state from the arm-shaped support member or a suspension insulator;

removing the wire by slowly lowering and placing the wire on a ground while releasing the tension of the wire by unwinding the belt from the drum, wherein the belt is unwound from the drum through an operation of rotating the rotary operating lever in a reverse direction to cause the pendulum to perform the pendulum motion, an operation of rotating the automatic reversing pawl, and an operation of rotating the drum shaft connected to the drum shaft operating plate; and separating and removing, from the wire and the installation member, the automatic direction switching pendulum-type rotary drive ratchet wire grip for indirect live wire work.

15. The method according to claim 14, wherein, in the step of pulling the wire, stoppage of an outer ring is controlled by attachment/detachment operation of a rotation control lever, the rotary operating lever is rotated counterclockwise using a stick for live wire work in a state of causing the rotation control lever to be fitted into a stopping groove of the outer ring and securing a safe distance from the wire, thereby rotating an inner ring clockwise and winding the belt around the drum, and the rotary operating lever is rotated using the stick for live wire work in the state of securing the safe distance from the wire so as to rotate the drum shaft and wind the belt around the drum, thereby pulling the wire and applying the tension to the wire.

16. The method according to claim 14, wherein, in the step of removing the wire, a rotation control lever is fixedly fitted into a stopping groove of an outer ring, and the rotary operating lever is rotated clockwise using a stick for live wire work in a state of securing a safe distance from the wire so as to rotate the drum shaft and unwind the belt from the drum, thereby releasing the tension of the wire and slowly lowering and placing the wire on the ground.

* * * * *